United States Patent
Ohashi et al.

(10) Patent No.: US 8,036,376 B2
(45) Date of Patent: Oct. 11, 2011

(54) ECHO PREVENTION CIRCUIT HAVING ADAPTIVE DIGITAL FILTER

(75) Inventors: Hideki Ohashi, Gunma (JP); Kozo Okuda, Osaka (JP); Takeo Inoue, Osaka (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1001 days.

(21) Appl. No.: 11/277,210

(22) Filed: Mar. 22, 2006

(65) Prior Publication Data
US 2006/0218215 A1   Sep. 28, 2006

(30) Foreign Application Priority Data

Mar. 23, 2005 (JP) ................. 2005-084964
Jan. 17, 2006 (JP) ................. 2006-009065

(51) Int. Cl.
*H04M 9/08* (2006.01)
(52) U.S. Cl. ................ 379/406.01; 381/74
(58) Field of Classification Search .......... 381/74, 381/94.1, 94.7, 111, 122, 375, 384; 379/406.01
See application file for complete search history.

(56) References Cited

U.S. PATENT DOCUMENTS

| 5,757,933 | A | * | 5/1998 | Preves et al. ................. 381/313 |
| 6,147,979 | A | * | 11/2000 | Michel et al. ................. 370/292 |
| 2007/0133442 | A1 | * | 6/2007 | Masuda et al. ................. 370/286 |

FOREIGN PATENT DOCUMENTS

| JP | 58-060835 | 4/1983 |
| JP | 2001-060895 | 3/2001 |

OTHER PUBLICATIONS

Alan v. Oppenheim et al., Discrete-Time Signal Processing (Second Edition, 1999).*
Isshiki & Co., Office Action dated Jan. 25, 2011 for Application No. JP 2006-009065, (5 pages).

* cited by examiner

*Primary Examiner* — Walter F Briney, III

(57) ABSTRACT

An echo prevention circuit comprises a first and second FIR filters into which a first input signal is input through an input terminal; an input/output terminal to which an output signal of the first FIR filter is output and the output signal reflected is input or a second input signal is input; a first subtracter that subtracts an output signal of the second FIR filter from a combined signal of the output signal of the first FIR filter and the second input signal; an adaptive digital filter into which the output signal of the first FIR filter is input; a second subtracter that subtracts the output of the adaptive digital filter from the output of the first subtracter. The adaptive digital filter has such filter coefficients that based on the output of the second subtracter, the output signal from the output terminal is the output from the first subtracter that has had the other than the second input signal removed.

27 Claims, 47 Drawing Sheets

(a)

(b)

ECHO PREVENTION CIRCUIT HAVING ADAPTIVE DIGITAL FILTER

CROSS-REFERENCE TO RELATED APPLICATIONS

The present application claims priority from Japanese Patent Applications Nos. 2005-84964 and 2006-9065 filed on Mar. 23, 2005 and Jan. 17, 2006 respectively, which are herein incorporated by reference.

BACKGROUND OF THE INVENTION

1. Field of the Invention

The present invention relates to an echo prevention circuit, a digital signal processing circuit, a method of setting filter coefficients of the echo prevention circuit, a method of setting filter coefficients of the digital signal processing circuit, a recording medium storing a program for setting filter coefficients of the echo prevention circuit, and a recording medium storing a program for setting filter coefficients of the digital signal processing circuit.

2. Description of the Related Art

In these years, among communication apparatuses such as cellular telephones and hand-free telephones to which, e.g., an earphone microphone is connectable are ones having incorporated therein an echo prevention circuit for preventing echoes that occur due to acoustic coupling from a speaker around to a microphone, electrical reflection in circuits, and the like.

FIG. 48 is a diagram showing, e.g., a two-to-four line converter having an echo prevention circuit incorporated therein. An input signal from a microphone 104 is output via an amplifier 101 to a telephone line, and transmitted through the telephone line to a communication partner. Thus, voice can be transmitted. However, the input signal that is transmitted via the amplifier 101 may be output to not only a telephone line but also to a speaker 106 via an amplifier 105 due to electrical reflection or the like in the two-to-four line converter as indicated by the dashed line in FIG. 48. As a result, an echo of the input signal is generated from the speaker 106. Accordingly, to cancel such an echo, an echo prevention circuit is provided in which the input signal from the microphone 104 forks in front of the amplifier 101 to an inverting amplifier 107, which inverts and amplifies the input signal. A signal output from the inverting amplifier 107 is adjusted in gain and phase by a gain phase adjusting circuit (G/P) 108. A signal that is opposite in phase to and has the same amplitude level as the input signal being transmitted as indicated by the dashed line in FIG. 48 is generated. As a result, the input signal transmitted as indicated by the dashed line in FIG. 48 and the signal transmitted as indicated by the solid line in FIG. 48 cancel out thereby preventing an echo. (Refer to Japanese Patent No. 3293029.)

However, the amount of echo cancellation by the above echo prevention circuit is about −30 dB. This is because, although for the echo prevention circuit to cancel an echo highly accurately, circuit constants of its circuit elements need to be set highly accurately, in reality it is not easy to set the circuit constants of the circuit elements highly accurately. Thus, there is the problem that if the circuit constants deviate from desired values, the amount of echo cancellation decreases. Furthermore, there is the problem that due to errors in adjusting gain and phase by the gain phase adjusting circuit 108, it is difficult to generate a signal to cancel out the input signal transmitted as indicated by the dashed line in FIG. 48.

As a result, the amount of echo cancellation by the above echo prevention circuit is about −30 dB.

Moreover, even if a voice signal over the telephone line is weak, the amplifier 105 of FIG. 48 amplifies the voice signal to have a given amplitude level so as to make voice from the weak voice signal audible. However, since the amplifier 105 is provided, there is the problem that echoes due to the amplified output of the amplifier 105 cannot be prevented. Accordingly, there is a demand for an echo prevention circuit to effectively prevent such echoes.

SUMMARY OF THE INVENTION

Accordingly, an object of the present invention is to provide an echo prevention circuit, a digital signal processing circuit, a method of setting filter coefficients of the echo prevention circuit, a method of setting filter coefficients of the digital signal processing circuit, a program for setting filter coefficients of the echo prevention circuit, and a program for setting filter coefficients of the digital signal processing circuit, which are able to prevent echoes effectively.

According to the invention to solve the above problem, there is provided an echo prevention circuit comprising an input terminal to which a first input signal is input; a first FIR filter into which the first input signal is input through the input terminal; a second FIR filter into which the first input signal is input at the same time as into the first FIR filter; an input/output terminal to which an output signal of the first FIR filter is output or a second input signal is input; a first subtracter that subtracts an output signal of the second FIR filter from a combined signal of the output signal of the first FIR filter and the second input signal; an adaptive digital filter into which the output signal of the first FIR filter is input; a second subtracter that subtracts an output signal of the adaptive digital filter from an output signal of the first subtracter; and an output terminal to which an output signal of the second subtracter is output. The adaptive digital filter has such filter coefficients that the output signal from the second subtracter through the output terminal is the output signal from the first subtracter that has had the other than the second input signal removed or reduced.

Also, according to the invention, there is provided a digital signal processing circuit comprising a first input terminal to which a first input signal is input; a first FIR filter into which the first input signal is input through the first input terminal; a second FIR filter into which the first input signal is input at the same time as into the first FIR filter; a first output terminal to which an output signal of the first FIR filter is output; a second output terminal to which an output signal of the second FIR filter is output; a second input terminal to which is input a subtracted signal produced by subtracting the output signal through the second output terminal from a combined signal of the output signal through the first output terminal and a second input signal on an input/output signal common line; an adaptive digital filter into which the output signal of the first FIR filter is input; a subtracter that subtracts an output signal of the adaptive digital filter from the signal through the second input terminal; and a third output terminal to which an output signal of the subtracter is output. The adaptive digital filter has such filter coefficients that the output signal from the subtracter through the third output terminal is the subtracted signal that has had the other than the second input signal removed or reduced.

Further, according to the invention, there is provided a method of setting filter coefficients of an echo prevention circuit comprising an input terminal to which a first input signal is input; a first FIR filter into which the first input signal is input through the input terminal; a second FIR filter into which the first input signal is input at the same time as into the first FIR filter; an input/output terminal to which an output signal of the first FIR filter is output or a second input signal is input; a first subtracter that subtracts an output signal of the second FIR filter from a combined signal of the output signal of the first FIR filter and the second input signal; an adaptive digital filter into which the output signal of the first FIR filter is input; a second subtracter that subtracts an output signal of the adaptive digital filter from an output signal of the first subtracter; and an output terminal to which an output signal of the second subtracter is output. The setting method sets the adaptive digital filter to have such filter coefficients that the output signal from the second subtracter through the output terminal is the output signal from the first subtracter that has had the other than the second input signal removed or reduced.

Yet further, there is provided a method of setting filter coefficients of a digital signal processing circuit comprising a first input terminal to which a first input signal is input; a first FIR filter into which the first input signal is input through the first input terminal; a second FIR filter into which the first input signal is input at the same time as into the first FIR filter; a first output terminal to which an output signal of the first FIR filter is output; a second output terminal to which an output signal of the second FIR filter is output; a second input terminal to which is input a subtracted signal produced by subtracting the output signal through the second output terminal from a combined signal of the output signal through the first output terminal and a second input signal on an input/output signal common line; an adaptive digital filter into which the output signal of the first FIR filter is input; a subtracter that subtracts an output signal of the adaptive digital filter from the signal through the second input terminal; and a third output terminal to which an output signal of the subtracter is output. The setting method sets the adaptive digital filter to have such filter coefficients that the output signal from the subtracter through the third output terminal is the subtracted signal that has had the other than the second input signal removed or reduced.

Still further, there is provided a recording medium storing a program for setting filter coefficients of an echo prevention circuit comprising a processor; an input terminal to which a first input signal is input; a first FIR filter into which the first input signal is input through the input terminal; a second FIR filter into which the first input signal is input at the same time as into the first FIR filter; an input/output terminal to which an output signal of the first FIR filter is output or a second input signal is input; a first subtracter that subtracts an output signal of the second FIR filter from a combined signal of the output signal of the first FIR filter and the second input signal; an adaptive digital filter into which the output signal of the first FIR filter is input; a second subtracter that subtracts an output signal of the adaptive digital filter from an output signal of the first subtracter; and an output terminal to which an output signal of the second subtracter is output. The program causes the processor to implement a function to set the adaptive digital filter to have such filter coefficients that the output signal from the second subtracter through the output terminal is the output signal from the first subtracter that has had the other than the second input signal removed or reduced.

Further, according to the invention, there is provided a recording medium storing a program for setting filter coefficients of a digital signal processing circuit comprising a processor; a first input terminal to which a first input signal is input; a first FIR filter into which the first input signal is input through the first input terminal; a second FIR filter into which the first input signal is input at the same time as into the first FIR filter; a first output terminal to which an output signal of the first FIR filter is output; a second output terminal to which an output signal of the second FIR filter is output; a second input terminal to which is input a subtracted signal produced by subtracting the output signal through the second output terminal from a combined signal of the output signal through the first output terminal and a second input signal on an input/output signal common line; an adaptive digital filter into which the output signal of the first FIR filter is input; a subtracter that subtracts an output signal of the adaptive digital filter from the signal through the second input terminal; and a third output terminal to which an output signal of the subtracter is output. The program causes the processor to implement a function to set the adaptive digital filter to have such filter coefficients that the output signal from the subtracter through the third output terminal is the subtracted signal that has had the other than the second input signal removed or reduced.

Features and objects of the present invention other than the above will become apparent from the description of this specification and the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<<First Implementation>>
==Example Configuration of Echo Prevention Circuit and Digital Signal Processing Circuit==

Figure 1:
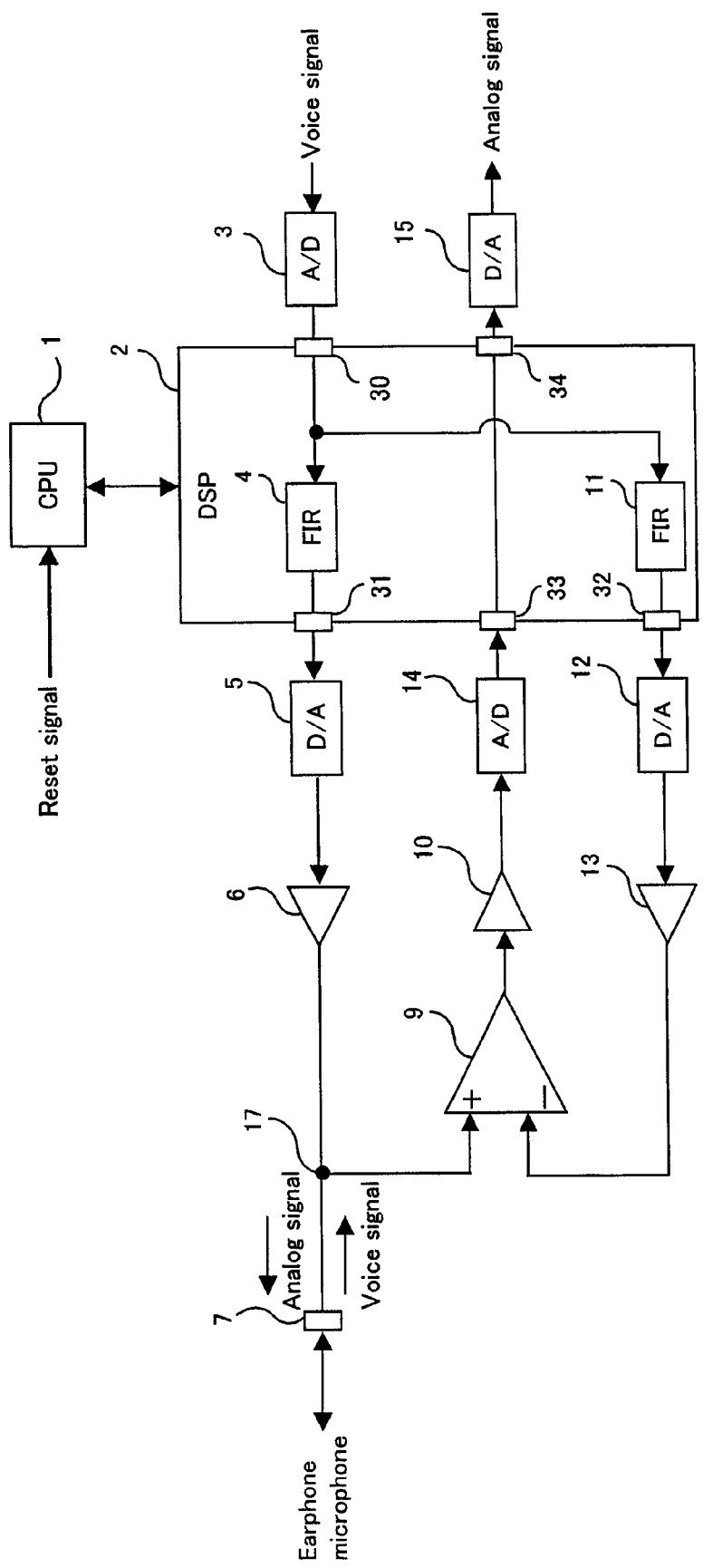
FIG. 1 is a block diagram illustrating a first implementation of the echo prevention circuit and the digital signal processing circuit included therein according to the present invention.

An echo prevention circuit and digital signal processing circuit according to the present invention will be described with reference to FIG. 1. FIG. 1 is a block diagram illustrating an example of the echo prevention circuit and the digital signal processing circuit (DSP (Digital Signal Processor) 2) included therein according to the present invention.

The echo prevention circuit comprises a CPU (Central Processor Unit) 1, the DSP 2, an AD converter 3, a DA converter 5 (a first DA converter), an amplifier 6, an input/output terminal 7, a differential amplifier 9 (a first subtracter), an amplifier 10, an AD converter 14, a DA converter 15, a DA converter 12 (a second DA converter), and an amplifier 13. Although in this implementation the CPU 1 is included, it is possible that the CPU 1 is not included.

The DSP 2 has an input terminal 30 (a first input terminal), an FIR (Finite Impulse Response) filter 4 (a first FIR filter), an output terminal 31 (a first output terminal), an FIR filter 11 (a second FIR filter), an output terminal 32 (a second output terminal), an input terminal 33 (a second input terminal), and an output terminal 34 (a third output terminal).

For example, a voice signal (a first input signal) is input to the AD converter 3. The AD converter 3 inputs digital signals into which the voice signal has been analog-to-digital converted to the DSP 2 through the input terminal 30.

The digital signals input to the DSP 2 are input into each of the FIR filters 4, 11. The FIR filter 4 performs a convolution operation based on its filter coefficients, as described later, on the digital signals and outputs to the output terminal 31. At the same time, the FIR filter 11 performs a convolution operation based on its filter coefficients, as described later, on the digital signals and outputs to the output terminal 32.

The DA converter 5 has the output signal from the FIR filter 4 input thereto via the output terminal 31, and outputs an analog signal into which the output signal from the FIR filter 4 has been digital-to-analog converted to the amplifier 6, which amplifies the analog signal with a predetermined amplification factor and outputs.

An apparatus (such as an earphone microphone or a speaker), which produces voice based on an analog signal, is connected to the input/output terminal 7, and through the input/output terminal 7 an analog signal from the amplifier 6 is output to the apparatus connected thereto. Alternatively, an apparatus (such as an earphone microphone or a microphone), which converts, e.g., voice into a voice signal and outputs, is connected to the input/output terminal 7, and the voice signal from the apparatus connected thereto is input to the input/output terminal 7. Through the input/output terminal 7, the voice signal is input to the + input terminal of the differential amplifier 9. Or, the signal output through the input/output terminal 7 is reflected by the apparatus connected and is input through the input/output terminal 7 to the + input terminal of the differential amplifier 9. Here, the reflected signal is, for example, a signal returned through the earphone microphone or the like, a voice signal into which, sound output from the earphone microphone being reflected in an ear, the reflected sound is converted by the earphone microphone, or the like. Note that outputting the output signal (e.g. an analog signal) or inputting the input signal (e.g. a voice signal) through the input/output terminal 7 is not mutually exclusively performed. For example, the output signal and the input signal may be output and input at the same time through the input/output terminal 7. An input/output signal common line is an inner line connected to the input/output terminal 7.

The output signal from the FIR filter 11 is input to the DA converter 12 through the output terminal 32. The DA converter 12 outputs an analog signal into which the output signal from the FIR filter 11 has been digital-to-analog converted to the amplifier 13, which amplifies the analog signal with a predetermined amplification factor and outputs to the − input terminal of the differential amplifier 9.

The differential amplifier 9 outputs the voice signal input through the input/output terminal 7 to the amplifier 10, which amplifies the voice signal with a predetermined amplification factor and outputs to the AD converter 14. The analog signal from the amplifier 6 is input to the + input terminal of the differential amplifier 9, which amplifies the difference between the analog signal input from the amplifier 6 to its + input terminal and the analog signal input from the amplifier 13 to its − input terminal and outputs.

The AD converter 14 inputs digital signals into which the voice signal from the amplifier 10 has been analog-to-digital converted to the DSP 2 through the input terminal 33. The digital signals input to the input terminal 33 are output through the output terminal 34. The DA converter 15 outputs an analog signal into which the digital signals have been digital-to-analog converted.

The CPU 1 controls the echo prevention circuit overall. For example, when a reset signal is input to reset the echo prevention circuit, the CPU 1 outputs an instruction signal to instruct the DSP 2 to execute an impulse response acquisition process, as described later, to the DSP 2. Furthermore, the CPU 1 outputs to the DSP 2, for example, the other logic value of 0 in the initial operation of the impulse response acquisition process. In this implementation, when the reset signal is input, the CPU 1 outputs the instruction signal to instruct the DSP 2 to execute the impulse response acquisition process, but the invention is not limited to this. For example, the CPU 1 may be configured to output the instruction signal to the DSP 2 when detecting power on for enabling the echo prevention circuit and the DSP 2 to operate. Alternatively, the CPU 1 may be configured to output the instruction signal to the DSP 2 when detecting an electrical change in an analog circuit (e.g., a change in the amplitude of the output of the amplifier 10).

==Detailed Configuration of DSP 2 and FIR Filters 4, 11==

Figure 2:
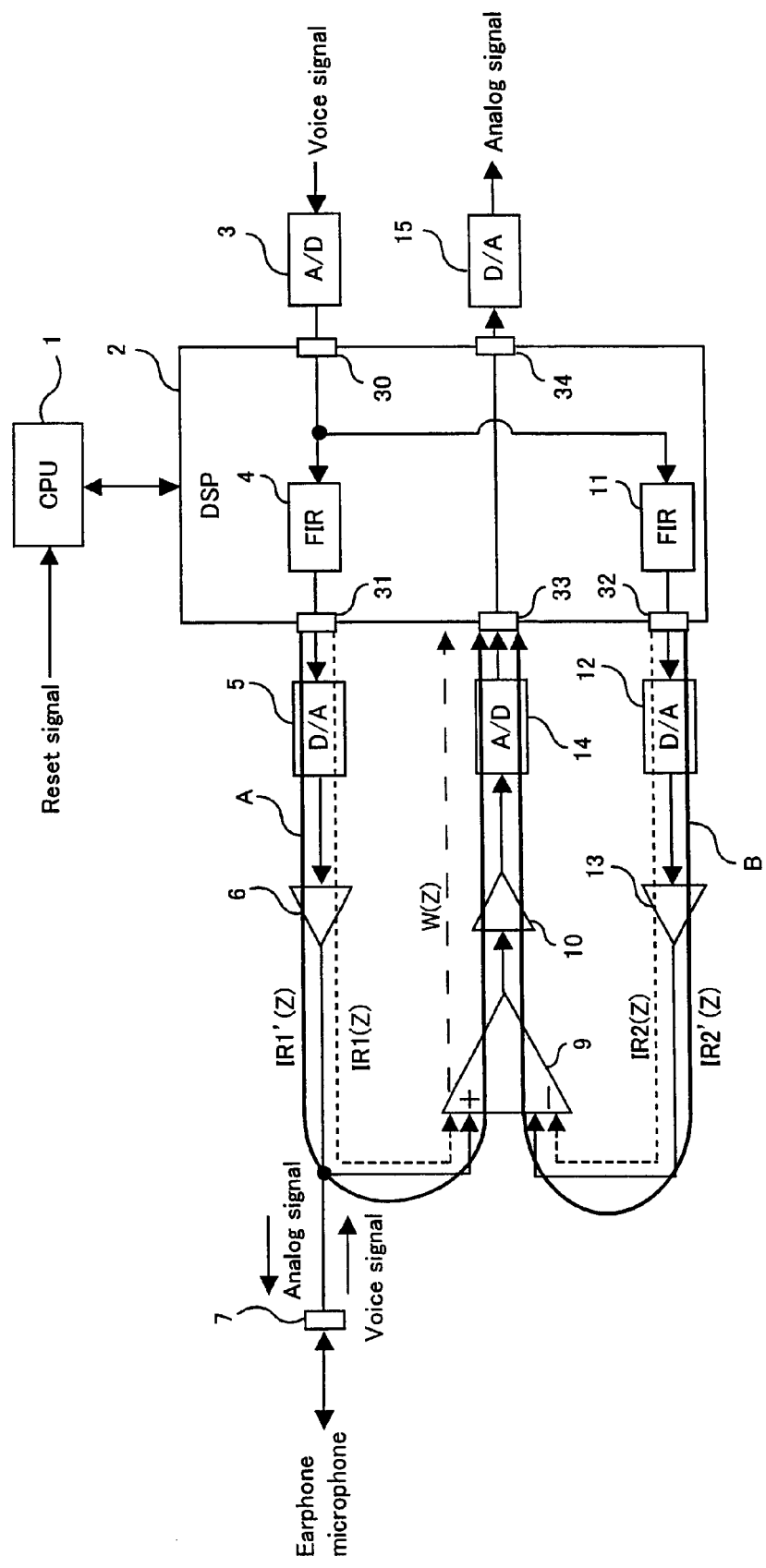
FIG. 2 is a diagram showing paths A, B in the echo prevention circuit of FIG. 1.
Figure 3:
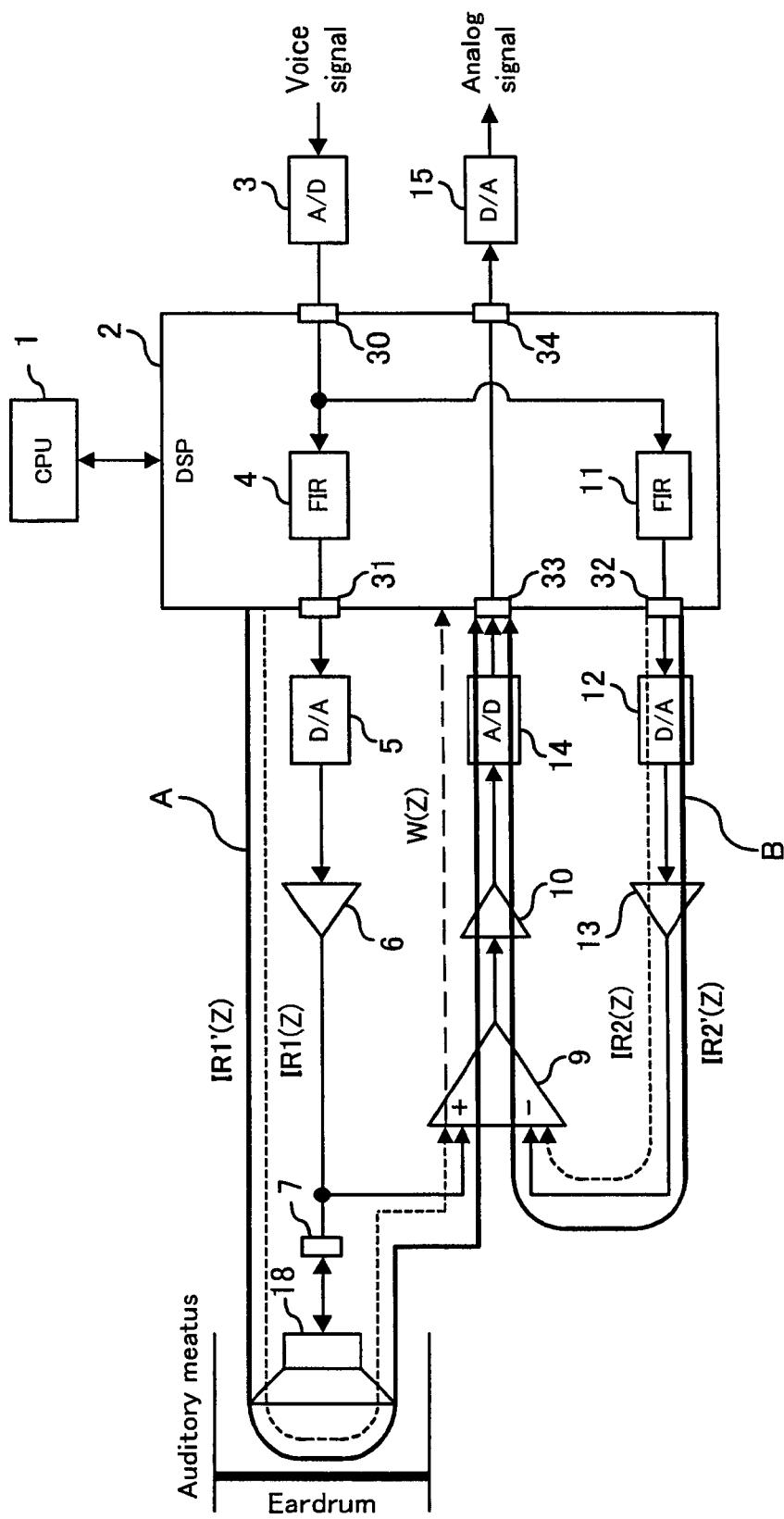
FIG. 3 is a diagram showing the case where an earphone microphone 18 is included in the path A of FIG. 2.
Figure 4:
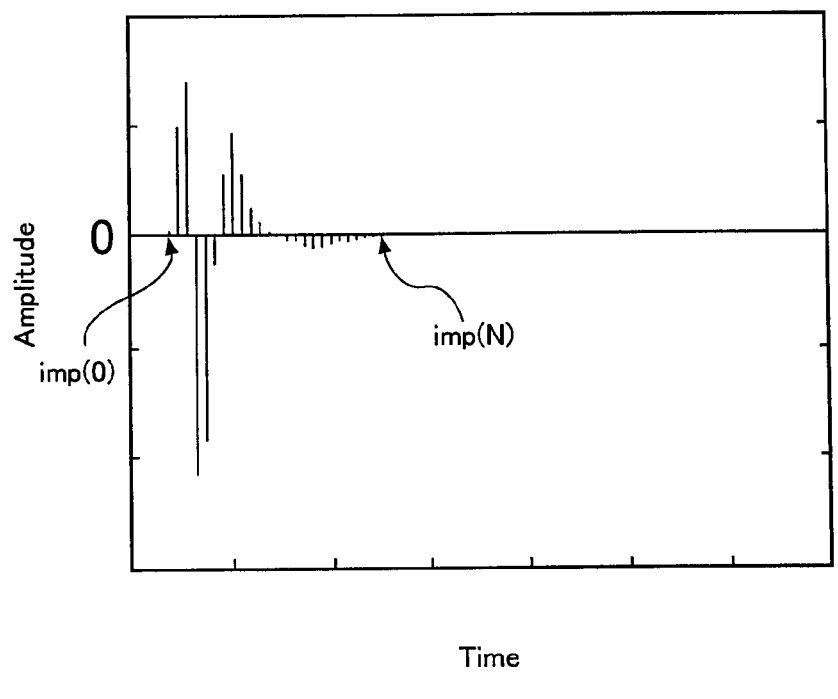
FIG. 4 shows impulse response of the paths A and B of FIG. 2 or 3.
Figure 4:
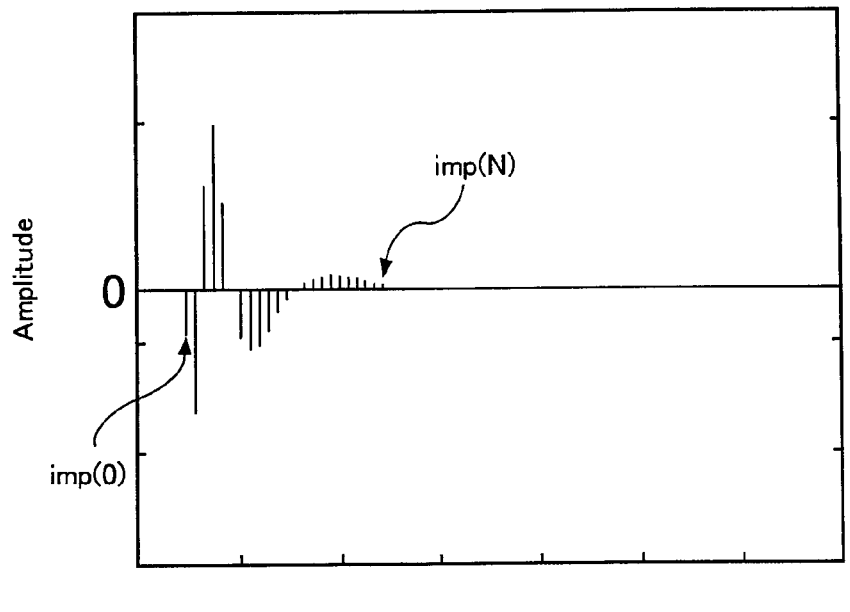
Figure 5:
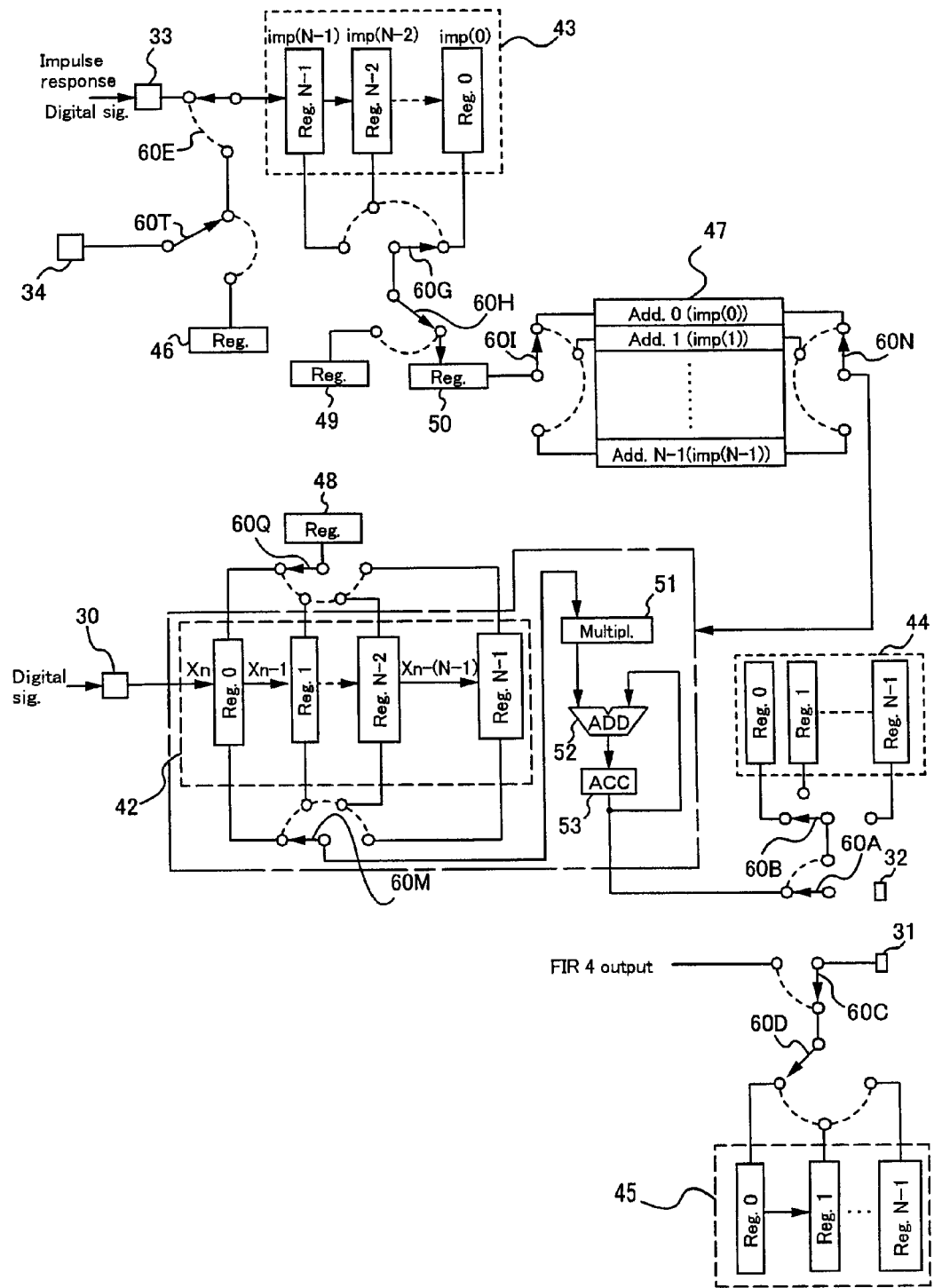
FIG. 5 is a diagram showing part of the configuration of a DSP 2.
Figure 6:
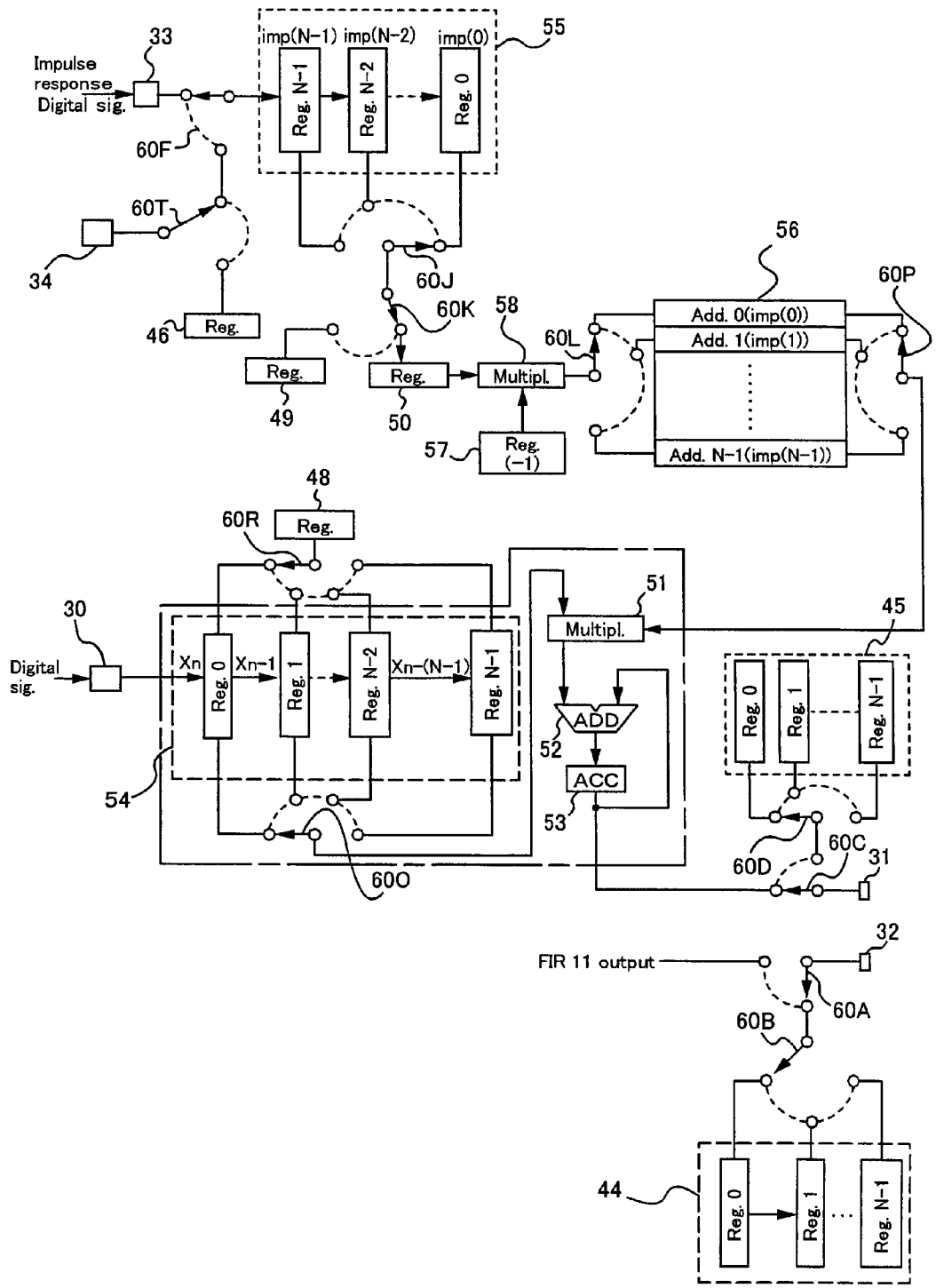
FIG. 6 is a diagram showing other part of the configuration of the DSP 2.
Figure 7:
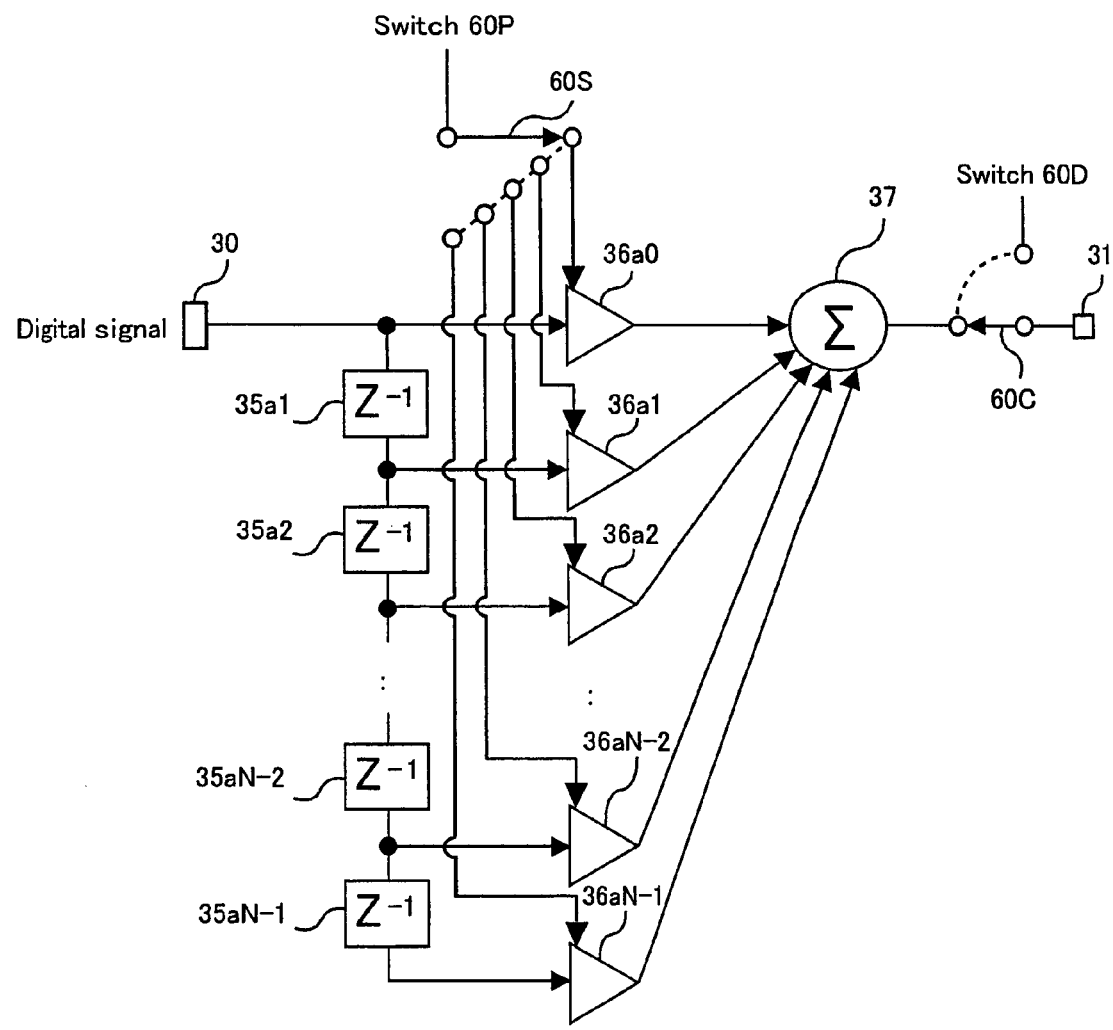
FIG. 7 is a diagram showing another example of the FIR filters 4, 11.

The configuration of the DSP 2 and the FIR filters 4, 11 that are constituents of the DSP 2 will be described in detail below with reference to FIGS. 1 to 7. FIG. 2 is a diagram showing paths A, B in the echo prevention circuit of FIG. 1. FIG. 3 is a diagram showing the case where an earphone microphone 18 is included in the path A. FIG. 4(*a*) shows impulse response IR1'(Z) of the path A of FIG. 2 or 3, and FIG. 4(*b*) shows impulse response IR2'(Z) of the path B of FIG. 2 or 3. FIG. 5 is a block diagram showing part of the configuration of the DSP 2 and, to describe in detail, a block diagram showing part of the configuration of the DSP 2 for setting the filter coefficients of the FIR filter 11 based on the impulse response IR1'(Z) of the path A. FIG. 6 is a block diagram showing other part of the configuration of the DSP 2 and, to describe in detail, a block diagram showing other part of the configuration of the DSP 2 for setting the filter coefficients of the FIR filter 4 based on the impulse response IR2'(Z) of the path B. FIG. 7 is a block diagram showing another example of the FIR filters 4, 11.

First, the configuration of the DSP 2 and the FIR filter 11 will be described in detail with reference to FIG. 5.

The DSP 2 has an impulse response storage memory 43 (part of a filter coefficient setting unit), for-impulse memories 44, 45, a filter coefficient storage memory 47, registers 46, 48, 49, 50 (part of the filter coefficient setting unit), switches 60A to 60E and 60G to 60I (part of the filter coefficient setting unit), and switches 60N, 60Q as well as the FIR filter 11 and the like of FIG. 1.

The FIR filter 11 has a for-digital-signals memory 42, a multiplier 51, an ADD (adder) 52, an ACC (Accumulator) 53, and a switch 60M as indicated inside the chain line of FIG. 5.

The above-mentioned other logic value of 0 from the CPU 1 is input into the registers 48, 49.

The for-impulse memories 44, 45 each consist of N registers 0 to N−1. When acquiring the impulse response IR1'(Z) of the path A indicated by a solid line in FIG. 2 or 3 in the impulse response acquisition process as described later, e.g., one logic value of 1 is stored into the register 0 of the for-impulse memory 45, and the other logic value of 0 is stored into the other registers 1 to N−1 of the for-impulse memory 45. Also, the other logic value of 0 is stored into the register 46 and the registers 0 to N−1 of the for-impulse memory 44.

When acquiring the impulse response IR2'(Z) of the path B indicated by a solid line in FIG. 2 or 3 in the impulse response acquisition process as described later, e.g., one logic value of 1 is stored into the register 0 of the for-impulse memory 44, and the other logic value of 0 is stored into the other registers 1 to N−1 of the for-impulse memory 44. Also, the other logic value of 0 is stored into the register 46 and the registers 0 to N−1 of the for-impulse memory 45.

The impulse response storage memory 43 consists of N registers 0 to N−1. Impulse responses imp(0) to imp(N−1) (=IR1'(Z)) on a per sampling cycle basis for the path A are stored into the registers 0 to N−1 of the impulse response storage memory 43 through the input terminal 33 by the DSP 2 switching the switch 60E to the input terminal 33 side. First, for example, the impulse response imp(0) is stored into the register N−1 through the input terminal 33. Then, the impulse response imp(1) is stored into the register N−1 and the impulse response imp(0) stored in the register 0 is stored into the register N−2. By repeating this process, the impulse responses imp(0) to imp(N−1) (=IR1'(Z)) are stored in the registers 0 to N−1 of the impulse response storage memory 43. The sampling cycle refers to each of the time intervals between the impulse responses imp(0) to imp(N−1) (=IR1'(Z)) as shown in (a) of FIG. 4. Also, the impulse response storage memory 43 is cleared by the DSP 2 switching the switch 60H to the register 49 side and switching the switch 60G to the registers 0 to N−1 sequentially thereby writing the other logic value of 0 stored in the register 49.

The filter coefficient storage memory 47 consists of N addresses 0 to N−1. The impulse responses imp(0) to imp(N−1) stored in the registers 0 to N−1 of the impulse response storage memory 43 are stored sequentially into the N addresses 0 to N−1 of the filter coefficient storage memory 47 via the register 50 by switching the switches 60G, 60I sequentially. As a result, the filter coefficients of the FIR filter 11 are set to the impulse responses imp(0) to imp(N−1) (=IR1'(Z) of the path A. The reason why the filter coefficients of the FIR filter 11 are set to the impulse responses imp(0) to imp(N−1) (=IR1'(Z)) of the path A will be described in the later description of the filter coefficients of the FIR filters 4, 11.

The register 50 temporarily stores the impulse responses imp(0) to imp(N−1) to store the impulse responses imp(0) to imp(N−1) from the impulse response storage memory 43 into the N addresses 0 to N−1 of the filter coefficient storage memory 47.

The for-digital-signals memory 42 consists of N registers 0 to N−1. The digital signals from the AD converter 3 are sequentially input through the input terminal 30 into the for-digital-signals memory 42. And by the digital signals being sequentially input into the N registers 0 to N−1, the digital signals are delayed by units of one sampling cycle. For example, let Xn be a digital signal. The register 0 outputs Xn−1 obtained by delaying Xn by one sampling cycle to the register 1, and the register N−2 outputs Xn−(N−1). Also, the for-digital-signals memory 42 is cleared by the DSP 2 switching the switch 60Q to the registers 0 to N−1 sequentially thereby writing the other logic value of 0 stored in the register 48.

The digital signals Xn, . . . , Xn−(N−1) from the for-digital-signals memory 42 and the filter coefficients imp(0), . . . , imp(N−1) from the filter coefficient storage memory 47 are input sequentially to the multiplier 51 by the DSP 2 switching the switches 60M, 60N respectively to the registers 0, . . . and to the addresses 0, . . . sequentially. The multiplier 51 multiplies the digital signals Xn, . . . , Xn−(N−1) and the filter coefficients imp(0), . . . , imp(N−1) sequentially and outputs the multiplying results to the ADD 52. For example, the multiplier 51 outputs the result of multiplying Xn from the for-digital-signals memory 42 and imp(0) from the filter coefficient storage memory 47 to the ADD 52. Next, the multiplier 51 outputs the result of multiplying Xn−1 from the for-digital-signals memory 42 and imp(1) from the filter coefficient storage memory 47 to the ADD 52. By repeating this process, the digital signals Xn, . . . , Xn−(N−1) and the filter coefficients imp(0), . . . , imp(N−1) are multiplied.

The ACC 53 holds an adding result input from the ADD 52. The ADD 52 outputs to the ACC 53 the result of adding the multiplying result from the multiplier 51 and the previous adding result of the ADD 52 stored in the ACC 53. As a result, Xn·imp(0)+ . . . +Xn−(N−1)·imp(N−1) is stored in the ACC 53. In this way, the FIR filter 11 performs a convolution operation on the digital signals based on the filter coefficients stored in the filter coefficient storage memory 47. The FIR filter 11 outputs the convoluted digital signal to the output terminal 32.

Next, the configuration of the DSP 2 and the FIR filter 4 will be described with reference to FIG. 6. The same reference numerals denote the same parts as in the configuration of the DSP 2 and the FIR filter 11, with description thereof being omitted.

The DSP 2 has an impulse response storage memory 55 (part of the filter coefficient setting unit), the for-impulse memories 44, 45, a filter coefficient storage memory 56, the registers 46, 48 to 50 and a register 57 (part of the filter coefficient setting unit), a multiplier 58 (part of the filter coefficient setting unit), the switches 60A to 60D and switches 60F, 60J to 60L (part of the filter coefficient setting unit), and switches 60P, 60R as well as the FIR filter 4 and the like of FIG. 1.

The FIR filter 4 has a for-digital-signals memory 54, the multiplier 51, the ADD 52, the ACC 53, and a switch 60O as indicated inside the chain line of FIG. 6. The multiplier 51, the ADD 52, and the ACC 53 are shared with the FIR filter 11.

The impulse response storage memory 55 consists of N registers 0 to N−1. Impulse responses imp(0) to imp(N−1) (=IR2'(Z)) on a per sampling cycle basis for the path B are stored into the registers 0 to N−1 of the impulse response storage memory 55 through the input terminal 33 by the DSP 2 switching the switch 60F to the input terminal 33 side. The impulse responses imp(0) to imp(N−1) are stored into the registers 0 to N−1 of the impulse response storage memory 55 like with the impulse response storage memory 43. Also, the impulse response storage memory 55 is cleared by the DSP 2 switching the switch 60K to the register 49 side and switching the switch 60J to the registers 0 to N−1 sequentially thereby writing the other logic value of 0 stored in the register 49.

A binary data indicating −1 is stored in advance in the register 57 for the multiplier 58 to invert in phase the impulse responses imp(0) to imp(N−1) stored in the impulse response storage memory 55.

The multiplier 58 outputs the result of multiplying the value of the register 50 and the value of the register 57 to the filter coefficient storage memory 56, and, to describe in detail, the impulse responses imp(0) to imp(N−1) from the registers 0 to N−1 of the impulse response storage memory 55 are input sequentially into the register 50 by the DSP 2 switching the switch 60K to the register 50 side and switching the switch 60J to the registers 0, . . . sequentially. Then, the multiplier 58 multiplies the values of the register 50 and the value of the register 57 sequentially and outputs the multiplying results representing the phase-inverted impulse responses imp(0) to imp(N−1) to the filter coefficient storage memory 56.

The filter coefficient storage memory 56 consists of N addresses 0 to N−1. The impulse responses imp(0) to imp(N−1) inverted in phase by the multiplier 58 are stored sequentially into the N addresses 0 to N−1 of the filter coefficient storage memory 56 by switching the switch 60L sequentially. As a result, the filter coefficients of the FIR filter 4 are set to the phase-inverted impulse responses imp(0) to imp(N−1) (=IR2'(Z)) of the path B. The reason why the filter coefficients of the FIR filter 4 are set to the phase-inverted impulse responses imp(0) to imp(N−1) (=IR2'(Z)) of the path B will be described in the later description of the filter coefficients of the FIR filters 4, 11.

The for-digital-signals memory 54 consists of N registers 0 to N−1. The digital signals from the AD converter 3 are sequentially input through the input terminal 30 into the for-digital-signals memory 54. And by the digital signals being sequentially input into the N registers 0 to N−1, the digital signals are delayed by units of one sampling cycle. For example, let Xn be a digital signal. The register 0 outputs Xn−1 obtained by delaying Xn by one sampling cycle to the register 1, and the register N−2 outputs Xn−(N−1). Also, the for-digital-signals memory 54 is cleared by the DSP 2 switching the switch 60R to the registers 0 to N−1 sequentially thereby writing the other logic value of 0 stored in the register 48.

Then, a like process as with the FIR filter 11 is performed by the multiplier 51 and the ADD 52. As a result, the FIR filter 4 completes the convolution operation on the digital signals based on the filter coefficients stored in the filter coefficient storage memory 56. The FIR filter 4 outputs a convoluted digital signal to the output terminal 31.

In the present implementation, the configuration of the FIR filters 4, 11 has been described, but their configuration is not limited to this embodiment. For example, the configuration shown in FIG. 7 may be taken. In this case, delay circuits 35a1 to 35aN−1 corresponding to the for-digital-signals memories 42, 54; multipliers 36a0 to 36aN−1 corresponding to the multiplier 51; and an adder 37 corresponding to the ADD 52 and ACC 53 may be provided. The FIR filter 4 having the configuration shown in FIG. 7 will be described as an example below. As shown in the Figure, the FIR filter 4 has N−1 number of delay circuits 35a1 to 35aN−1 connected in cascade, N number of multipliers 36a0 to 36aN−1 that each multiply an inputted digital signal, and an adder 37 that adds the outputs from the multipliers 36a0 to 36aN−1.

The delay circuits 35a1 to 35aN−1 delay the digital signal Xn input through the input terminal 30 by units of one sampling cycle and output. For example, the delay circuit 35a1 outputs a digital signal Xn−1 obtained by delaying the digital signal Xn by one sampling cycle, and the delay circuit 35aN−1 outputs a digital signal Xn−(N−1).

The impulse responses imp(0) to imp(N−1) stored in the filter coefficient storage memory 56 are respectively set as multiplication coefficients in the multipliers 36a0 to 36aN−1 by switching the switches 60P, 60S sequentially. The multipliers 36a0 to 36aN−1 multiply inputted digital signals by the set multiplication coefficients respectively, and output the multiplying results.

The adder 37 adds the outputs from the multipliers 36a0 to 36aN−1. As a result, the same convolution operation as with the FIR filter 4 is completed.

==Filter Coefficients of FIR Filters 4, 11==

The filter coefficients of the FIR filters 4, 11 will be described in detail with reference to FIGS. 2, 3. The earphone microphone 18 is connectable to the input/output terminal 7. When an analog signal output through the input/output terminal 7 is input thereto, the earphone microphone 18 vibrates a diaphragm (not shown) according to the analog signal thereby outputting voice. Furthermore, the earphone microphone 18 catches vibration of his eardrum with the diaphragm when a person wearing the earphone microphone 18 in his ear makes a voice, and generates and outputs an analog signal. The analog signal output from the earphone microphone 18 is input through the input/output terminal 7.

As mentioned above, the analog signal from the amplifier 6 is possibly input to the + input terminal of the differential amplifier 9 as well as being output through the input/output terminal 7. That is, a combined signal of the analog signal from the amplifier 6 and a signal input to the input/output terminal 7 is input to the + input terminal of the differential amplifier 9. Description will be made below assuming that the signal input to the input/output terminal 7 (a second input signal) includes, for example, an electrical noise signal and environmental noise as well as a voice signal. In this case, an echo of the analog signal occurs, or the analog signal from the amplifier 6 is superimposed on the voice signal input through the input/output terminal 7 and input to the + input terminal of the differential amplifier 9, thus generating an echo. Accordingly, the filter coefficients of the FIR filters 4, 11 are set so as to prevent this echo.

Let IR1(Z) be impulse response (a transfer function) of from the output terminal 31 to the + input terminal of the differential amplifier 9 indicated by a dashed line in FIG. 2 or 3, IR2(Z) be impulse response (a transfer function) of from the output terminal 32 to the − input terminal of the differential amplifier 9 indicated by a dashed line in FIG. 2 or 3, and W(Z) be impulse response (a transfer function) of from the stage following the +/− input terminal of the differential amplifier 9 to the input terminal 33 indicated by a long dashed line in FIG. 2 or 3.

Then, the impulse response (transfer function) IR1'(Z) of the path A indicated by a solid line in FIG. 2 or 3 is expressed as IR1'(Z)=IR1(Z)·W(Z), and the impulse response (transfer function) IR2'(Z) of the path B indicated by a solid line in FIG. 2 or 3 is expressed as IR2'(Z)=−IR2(Z)·W(Z). Here, the reason why IR2(Z) is inverted in phase is that the path B goes through the − input terminal of the differential amplifier 9.

Here, suppose that the filter coefficients of the FIR filter 4 are −IR2'(Z) that is the inverse of IR2'(Z), then the characteristic of from the input of the FIR filter 4 to the input terminal 33, I Rall_1(Z), is expressed as:

$$I\text{ Rall\_1}(Z) = -IR2'(Z) \cdot IR1'(Z)$$
$$= (-(-IR2(Z) \cdot W(Z))) \cdot (IR1(Z) \cdot W(Z))$$
$$= IR2(Z) \cdot W(Z) \cdot IR1(Z) \cdot W(Z).$$

Also, suppose that the filter coefficients of the FIR filter 11 are IR1'(Z), then the characteristic of from the input of the FIR filter 11 to the input terminal 33, I Rall_2(Z), is expressed as:

$$I\text{ Rall\_2}(Z) = IR1'(Z) \cdot IR2'(Z)$$
$$= IR1(Z) \cdot W(Z) \cdot (-IR2(Z) \cdot W(Z))$$
$$= IR1(Z) \cdot W(Z) \cdot (-IR2(Z)) \cdot W(Z)$$
$$= -I\text{ Rall\_1}(Z).$$

That is, the characteristic of from the input of the FIR filter 4 to the input terminal 33, I Rall_1(Z), and the characteristic of from the input of the FIR filter 11 to the input terminal 33, I Rall_2(Z), could cancel out. Therefore, it is understood that the filter coefficients of the FIR filter 4 need only be set equal to −IR2'(Z) that is the inverse of IR2'(Z) and the filter coefficients of the FIR filter 11 equal to IR1'(Z).

Alternatively, if the filter coefficients of the FIR filter 4 are IR2'(Z), then the characteristic of from the input of the FIR filter 4 to the input terminal 33, I Rall_1(Z), is expressed as:

$$I\text{ Rall\_1}(Z) = IR2'(Z) \cdot IR1'(Z)$$
$$= (-IR2(Z) \cdot W(Z)) \cdot (IR1(Z) \cdot W(Z))$$
$$= -IR2(Z) \cdot W(Z) \cdot IR1(Z) \cdot W(Z).$$

Also, if the filter coefficients of the FIR filter 11 are −IR1'(Z) that is the inverse of IR1'(Z), then the characteristic of from the input of the FIR filter 11 to the input terminal 33, I Rall_2(Z), is expressed as:

$$I\text{ Rall\_2}(Z) = -IR1'(Z) \cdot IR2'(Z)$$
$$= (-(IR1(Z) \cdot W(Z))) \cdot (-IR2(Z) \cdot W(Z))$$
$$= IR1(Z) \cdot W(Z) \cdot IR2(Z) \cdot W(Z)$$
$$= -I\text{ Rall }1(Z).$$

That is, the characteristic of from the input of the FIR filter 4 to the input terminal 33, I Rall_1(Z), and the characteristic of from the input of the FIR filter 11 to the input terminal 33, I Rall_2(Z), could cancel out. Therefore, it is understood that the filter coefficients of the FIR filter 4 need only be set equal to IR2'(Z) and the filter coefficients of the FIR filter 11 equal to −IR1'(Z) that is the inverse of IR1'(Z).

By setting the filter coefficients of the FIR filters 4, 11 in this way, the signal transmitting through the path A in the differential amplifier 9 can be cancelled out by the signal transmitting through the path B. Therefore, the above-mentioned echo, which occurs when digital signals are input to the input terminal 30, can be prevented.

As shown in FIG. 3, in a state of the earphone microphone 18 being connected, the impulse response IR1'(Z) is acquired, and by setting the filter coefficients of the FIR filter 11 to this IR1'(Z), effective echo prevention that is according to the transfer characteristic of the earphone microphone 18 becomes possible.

Moreover, in a state where the connected earphone microphone 18 is attached to an ear by inserting into its auditory meatus or covering its ear auricle, the impulse response IR1'(Z) is acquired, and by setting the filter coefficients of the FIR filter 11 to this IR1'(Z), effective echo prevention that is according to the transfer characteristics of the earphone microphone 18 and of the user's auditory meatus becomes possible.

==Setting Filter Coefficients of FIR Filters 4, 11 with Impulse Response Acquiring Process==

Figure 8:
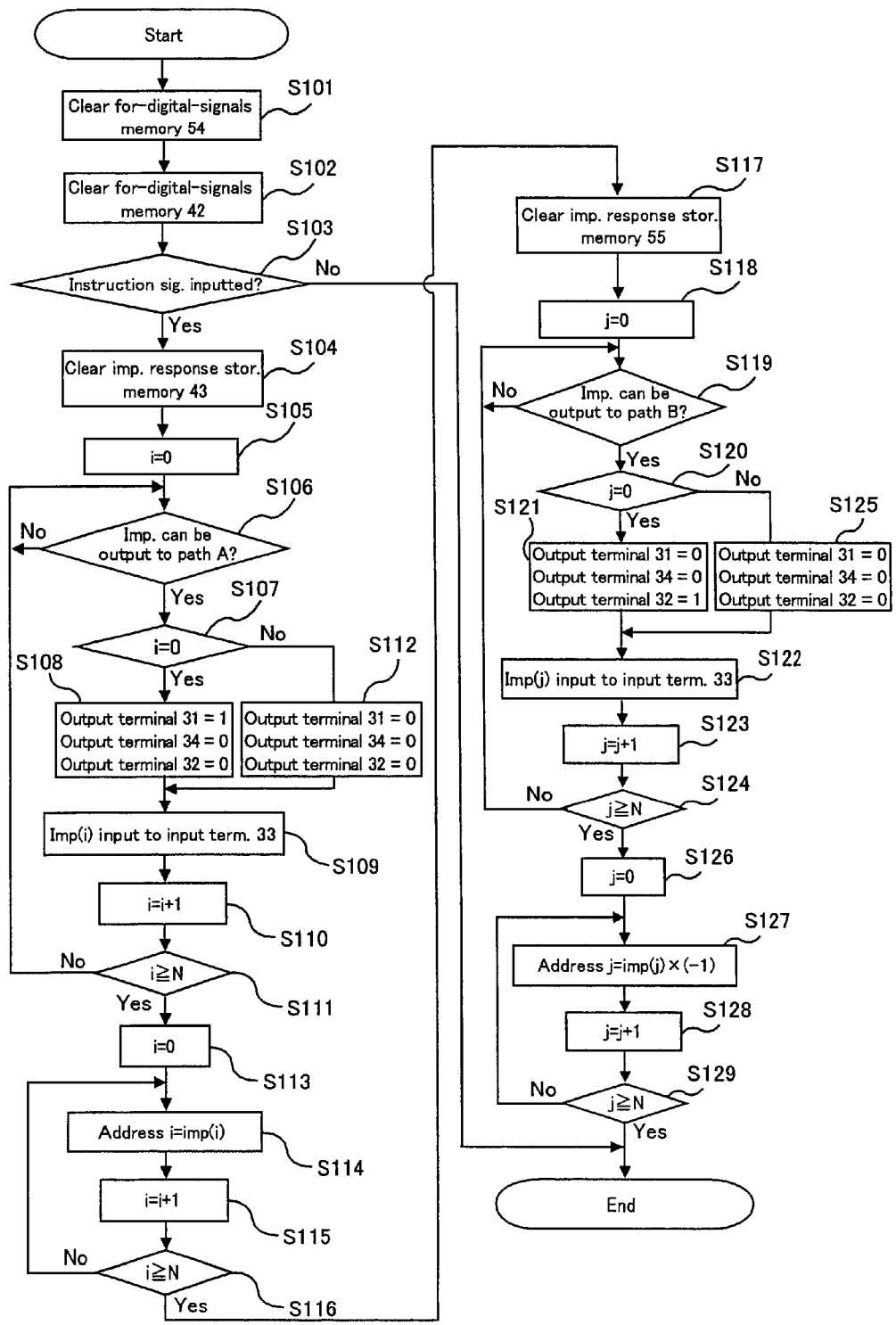
FIG. 8 is a flow chart illustrating the operation of the echo prevention circuit and the digital signal processing circuit included therein according to the present invention.

The operation of the impulse response acquisition process and of setting the filter coefficients of the FIR filters 4, 11 by the echo prevention circuit and the digital signal processing circuit included therein according to the present invention will be described with reference to FIGS. 1 to 6 and 8. FIG. 8 is a flow chart illustrating an example of the operation of the echo prevention circuit and the digital signal processing circuit included therein according to the present invention.

When the reset signal is input to reset the echo prevention circuit, the CPU 1 outputs to the DSP 2 an instruction signal to instruct the DSP 2 to execute the impulse response acquisition process. The CPU 1 outputs the other logic value of 0 to the DSP 2 in the beginning of the impulse response acquisition process. The other logic value of 0 input into the DSP 2 is input into the registers 48, 49.

The DSP 2 switches the switch 60R sequentially to the registers 0 to N−1 of the for-digital-signals memory 54, thereby clearing the registers 0 to N−1 of the for-digital-signals memory 54 with use of the other logic value of 0 stored in the register 48 (S101). Likewise, the DSP 2 switches the switch 60Q sequentially to the registers 0 to N−1 of the for-digital-signals memory 42, thereby clearing the registers 0 to N−1 of the for-digital-signals memory 42 with use of the other logic value of 0 stored in the register 48 (S102). Then, the DSP 2 determines whether the instruction signal from the CPU 1 has been input (S103).

When determining that the instruction signal from the CPU 1 has been input (YES at S103), the DSP 2 switches the switch 60H to the register 49 side and switches the switch 60G sequentially to the registers 0 to N−1, thereby clearing the registers 0 to N−1 of the impulse response storage memory 43 with use of the other logic value of 0 stored in the register 49 (S104). Hereinafter, let imp(i) (i=0, . . . , N−1) be an i-th impulse response to be stored in the impulse response storage memory 43. The DSP 2 sets i to 0 to acquire impulse response imp(0) to be stored in the register N−1 of the impulse response storage memory 43 (S105) and puts the input terminal 30 in high impedance, and thereafter performs the following processes.

The DSP 2 determines whether an impulse can be output through the output terminal 31 to the path A, to acquire impulse response imp(0) of the path A indicated in FIG. 2 or 3 (S106). For example, the DSP 2 determines it by determining whether being in a state where a signal is being output through the output terminal 31 or input to the input terminal 33. If an impulse were output in the state where a signal is being output through the output terminal 31 or input to the input terminal 33, an accurate impulse response imp(0) might not be acquired.

When determining that an impulse can be output to the path A (YES at S106), the DSP 2 determines whether i=0 (S107). Since in S105 i was set to 0, the DSP 2 determines that i=0 (YES at S107). Then, the DSP 2 stores one logic value of 1 into the register 0 of the for-impulse memory 45. Also, the DSP 2 stores the other logic value of 0 into the other registers 1 to N−1 of the for-impulse memory 45, the register 46, and the registers 0 to N−1 of the for-impulse memory 44. Then, the DSP 2 switches the switch 60C to the for-impulse memory 45 side, the switch 60A to the for-impulse memory 44 side, and the switch 60T to the register 46 side. Also, the DSP 2 switches the switch 60E to the input terminal 33 side. Then, the DSP 2 switches the switches 60D, 60B to the registers 0 respectively. As a result, an impulse having one logic value of 1 from the register 0 of the for-impulse memory 45 is output through the output terminal 31 (S108). The impulse output through the output terminal 31 transmits through the path A to the input terminal 33 (S109). As a result, impulse response imp(0) is acquired (imp(0) of FIG. 4(a)). This impulse response imp(0) is first stored into the register N−1 of the impulse response storage memory 43.

Next, to acquire impulse response imp(1), the DSP 2 increments i by one, that is, i=i+1=1 (S110). The DSP 2 determines that i not ≧N (NO at S111) because the impulse response acquired has not yet reached imp(N−1), and repeats the above process of S106 again. In S110, since i=1≠0 (NO at S107), the DSP 2 switches the switches 60D, 60B to the registers 1 respectively. As a result, an impulse is not output through the output terminal 31 (S112), and impulse imp(1) that is delayed by one sampling cycle from the impulse output at S108 is input to the input terminal 33. Then, this impulse response imp(1) is stored into the register N−1 of the impulse response storage memory 43 and the impulse response imp(0) stored in the register N−1 is stored into the register N−2. In this way, the processes of from S106 to S111 are repeated until i≧N (YES at S111), thereby acquiring the impulse responses imp(0) to imp(N−1) (=IR1'(Z)). The impulse responses imp(0) to imp(N−1) are stored in the registers 0 to N−1 of the impulse response storage memory 43.

In order to store into the addresses 0 to N−1 of the filter coefficient storage memory 47 the impulse responses imp(0) to imp(N−1) (=IR1'(Z)) stored in the registers 0 to N−1 of the impulse response storage memory 43, the DSP 2 switches the switch 60H to the register 50 side and switches the switches 60G, 60I respectively to the registers 0, . . . and to the addresses 0, . . . sequentially. To describe in detail, first, the DSP 2 sets i to 0 to store impulse response imp(0) into the address 0 (S113). Then, the DSP 2 switches the switch 60G to the register 0 and the switch 60I to the address 0. As a result, the impulse response imp(0) is stored in the address 0 of the filter coefficient storage memory 47 (S114). Next, the DSP 2 increments i by one (i=i+1=1) to store impulse response imp(1) into the address 1 of the filter coefficient storage memory 47 (S115). The DSP 2 determines that i not ≧N (NO at S116) because the impulse responses up to imp(N−1) have not yet been stored, and repeats the above process of S114 again. That is, the DSP 2 switches the switch 60G to the register 1 and the switch 60I to the address 1. As a result, the impulse response imp(1) is stored in the address 1 (S114). The processes of from S114 to S116 are repeated until i≧N (YES at S116), and thus the impulse responses imp(0) to imp(N−1) are stored in the addresses 0 to N−1 of the filter coefficient storage memory 47. That is, the filter coefficients of the FIR filter 11 have been set.

Next, the DSP 2 switches the switch 60K to the register 49 side and switches the switch 60J sequentially to the registers 0 to N−1, thereby clearing the registers 0 to N−1 of the impulse response storage memory 55 with use of the other logic value of 0 stored in the register 49 (S117). Hereinafter, let imp(j) (j=0, ..., N−1) be a j-th impulse response to be stored in the impulse response storage memory 55. The DSP 2 sets j to 0 to acquire impulse response imp(0) to be stored in the register N−1 of the impulse response storage memory 55 (S118) and performs the following processes.

The DSP 2 determines whether an impulse can be output to the path B, to acquire impulse response imp(0) of the path B indicated in FIG. 2 or 3 (S119). This determination by the DSP 2 is the same as in S106.

When determining that an impulse can be output to the path A (YES at S119), the DSP 2 determines whether j=0 (S120). Since in S118 j was set to 0, the DSP 2 determines that j=0 (YES at S120). Then, the DSP 2 stores one logic value of 1 into the register 0 of the for-impulse memory 44. Also, the DSP 2 stores the other logic value of 0 into the other registers 1 to N−1 of the for-impulse memory 44, the register 46, and the registers 0 to N−1 of the for-impulse memory 45. Then, the DSP 2 switches the switch 60F to the input terminal 33 side, the switches 60D, 60B to the registers 0 respectively. As a result, an impulse having one logic value of 1 from the register 0 of the for-impulse memory 44 is output through the output terminal 32 (S121). The impulse output through the output terminal 32 transmits through the path B to the input terminal 33 (S122). As a result, impulse response imp(0) is acquired (imp(0) of FIG. 4(*b*)). This impulse response imp(0) is first stored into the register N−1 of the impulse response storage memory 55.

Next, to acquire impulse response imp(1), the DSP 2 increments j by one, that is, j=j+1=1 (S123). The DSP 2 determines that j not ≧N (NO at S124) because the impulse response acquired has not yet reached imp(N−1), and repeats the above process of S119 again. In S123, since j=1≠0 (NO at S120), the DSP 2 switches the switches 60D, 60B to the registers 1 respectively. As a result, an impulse is not output through the output terminal 31 (S125), and impulse imp(1) that is delayed by one sampling cycle from the impulse output at S121 is input to the input terminal 33. Then, this impulse response imp(1) is stored into the register N−1 of the impulse response storage memory 55 and the impulse response imp(0) stored in the register N−1 is stored into the register N−2. In this way, the processes of from S119 to S124 are repeated until j≧N (YES at S124), thereby acquiring the impulse responses imp(0) to imp(N−1) (=IR2'(Z)). The impulse responses imp(0) to imp(N−1) are stored in the registers 0 to N−1 of the impulse response storage memory 55.

In order to invert in phase the impulse responses imp(0) to imp(N−1) stored in the registers 0 to N−1 of the impulse response storage memory 55 and store into the addresses 0 to N−1 of the filter coefficient storage memory 56, the DSP 2 switches the switch 60K to the register 50 side and switches the switches 60J, 60L respectively to the registers 0, ... and to the addresses 0, ... sequentially. First, the DSP 2 sets j to 0 to store phase-inverted impulse response imp(0) into the address 0 (S126). Then, the DSP 2 switches the switch 60J to the register 0 and the switch 60L to the address 0. At this time, imp(0) from the register 0 is multiplied in the multiplier 58 by the value of the register 57 and thereby inverted in phase. As a result, the phase-inverted impulse response imp(0) is stored in the address 0 of the filter coefficient storage memory 47 (S127). Next, the DSP 2 increments j by one (j=j+1=1) to store impulse response imp(1) into the address 1 of the filter coefficient storage memory 47 (S128). The DSP 2 determines that j not ≧N (NO at S129) because the impulse responses up to imp(N−1) have not yet been stored in the filter coefficient storage memory 56, and repeats the above process of S127 again. That is, the DSP 2 switches the switch 60J to the register 1 and the switch 60L to the address 1. Then, the impulse response imp(1) from the register 1 is multiplied in the multiplier 58 by the value of the register 57 and thereby inverted in phase. As a result, the phase-inverted impulse response imp(1) is stored in the address 1 (S127). The processes of from S127 to S129 are repeated until j≧N (YES at S129), and thus the phase-inverted impulse responses imp(0) to imp(N−1) are stored in the addresses 0 to N−1 of the filter coefficient storage memory 56. That is, the filter coefficients of the FIR filter 4 have been set.

In the above implementation, the above processes have been described which use hardware such as the switches 60, but the invention is not limited to this. For example, a program for the above processes may be stored beforehand in a ROM (Read Only Memory) or the like so that a processor of the DSP 2 reads out the program and executes.

<<Second Implementation>>
==Example Configuration of Echo Prevention Circuit and Digital Signal Processing Circuit==

Figure 9:
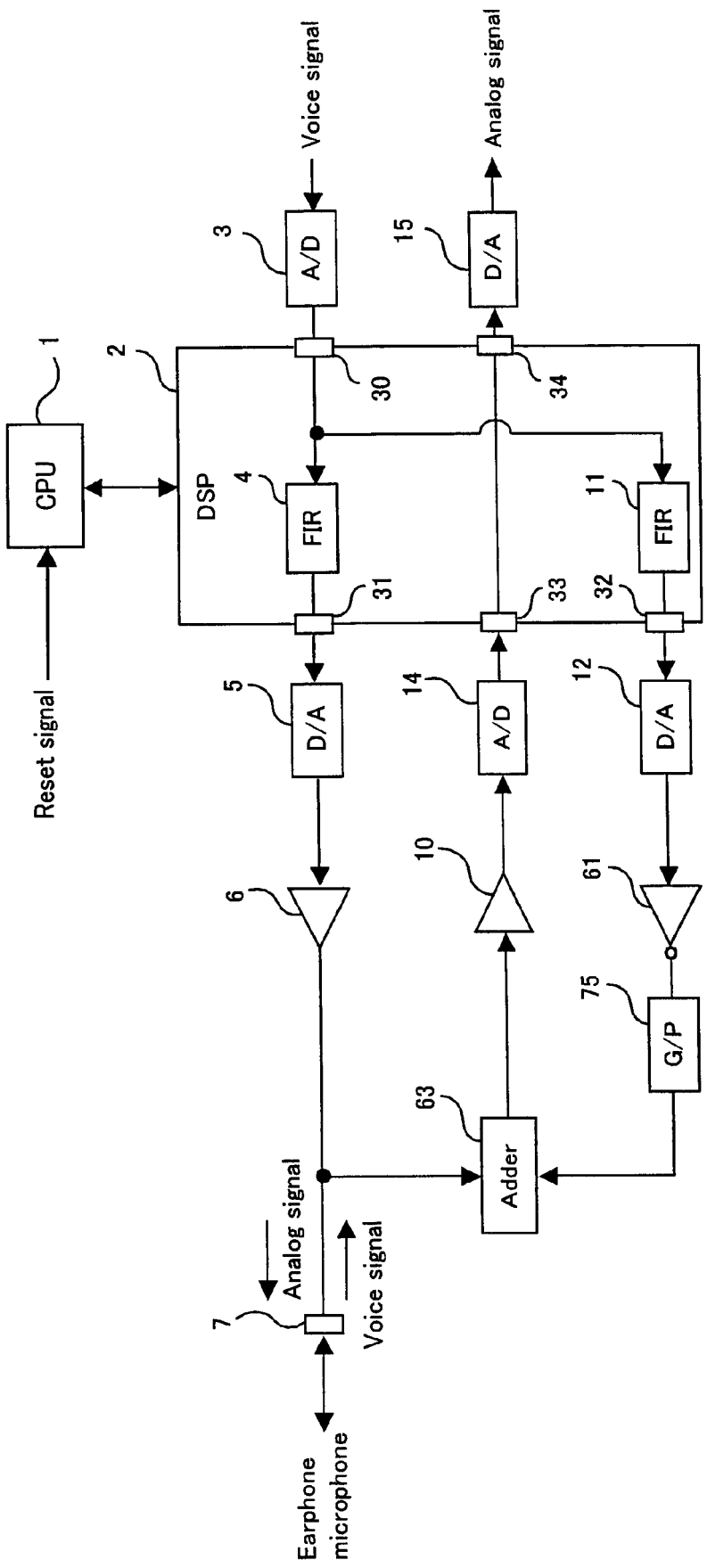
FIG. 9 is a block diagram illustrating a second implementation of the echo prevention circuit and the digital signal processing circuit included therein according to the present invention.

FIG. 9 is a diagram showing a second implementation. FIG. 9 is a block diagram illustrating an example of an echo prevention circuit and a digital signal processing circuit included therein according to the present invention. In the echo prevention circuit of FIG. 9, the same reference numerals denote the same parts as in the first implementation with description thereof being omitted.

The echo prevention circuit comprises a CPU 1, a DSP 2, an AD converter 3, a DA converter 5, an amplifier 6, an input/output terminal 7, an adder 63, an amplifier 10, an AD converter 14, a DA converter 15, a DA converter 12, an inverting amplifier 61 (an inverting circuit), and a gain phase adjusting circuit (G/P) 75.

This implementation differs from the first implementation in that the inverting amplifier 61, the gain phase adjusting circuit 75, and the adder 63 are provided instead of the differential amplifier 9 and the amplifier 13. Although also in this implementation the CPU 1 is included, it is possible that the CPU 1 is not included.

The DSP 2 has an input terminal 30, an FIR filter 4, an output terminal 31, an FIR filter 11, an output terminal 32, an input terminal 33, and an output terminal 34.

The inverting amplifier 61 inverts and amplifies an analog signal from the DA converter 12 with a predetermined amplification factor and outputs to the gain phase adjusting circuit 75.

The gain phase adjusting circuit 75 adjusts in gain and phase the analog signal from the inverting amplifier 61 and outputs to the adder 63. The gain and phase of the analog signal is adjusted in order to generate an analog signal that is the inverse in phase of an analog signal from the amplifier 6 so as to cause the output of the adder 63 to be zero when digital signals are input to the input terminal 30.

The analog signal from the amplifier 6 is input into the adder 63, which outputs the result of adding the analog signal from the amplifier 6 and the analog signal from the gain phase adjusting circuit 75 to the amplifier 10. Also, the adder 63 outputs a voice signal through the input/output terminal 7 to the amplifier 10.

==Filter Coefficients of FIR filters 4, 11==

Figure 10:
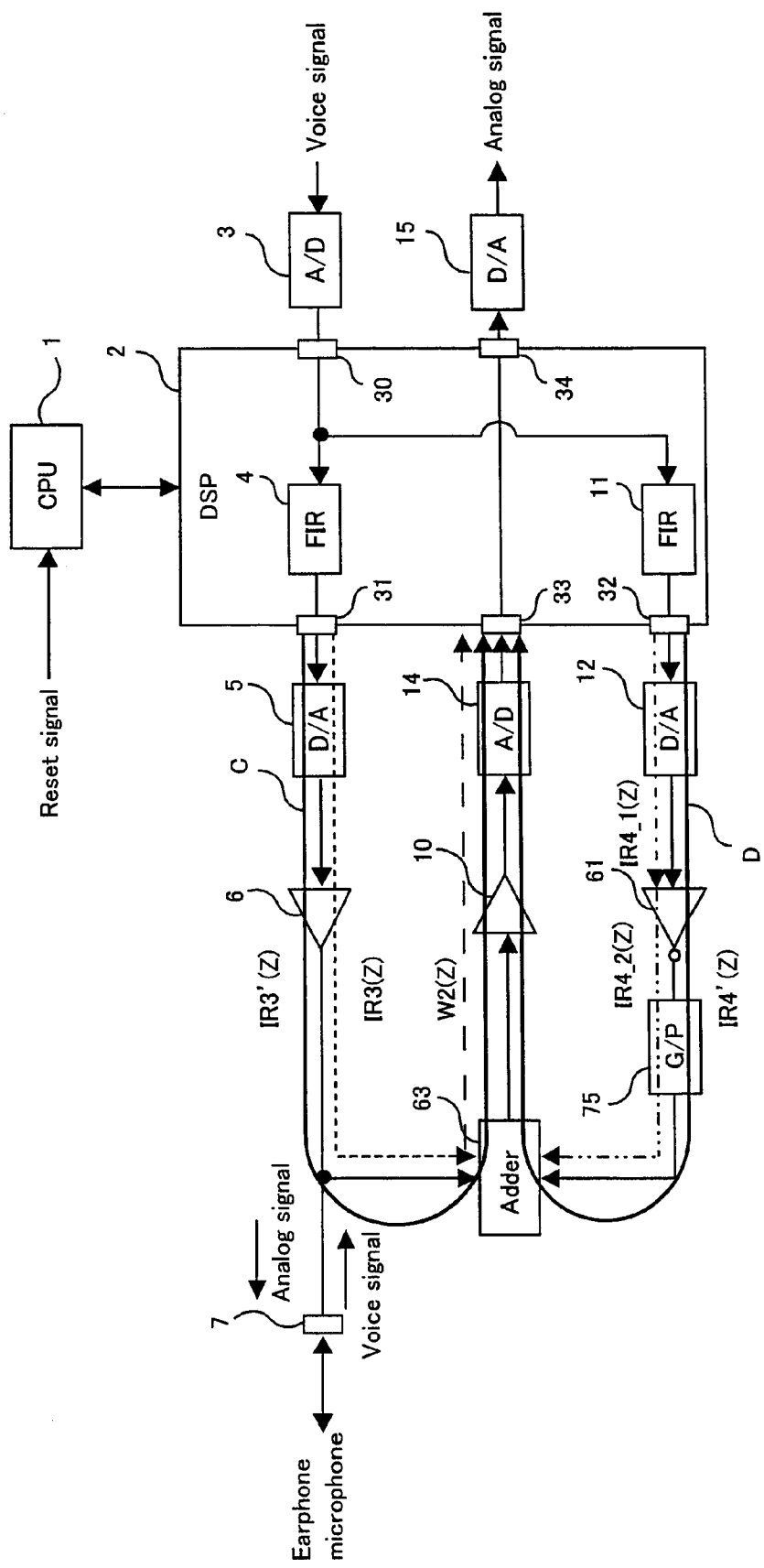
FIG. 10 is a diagram showing paths C, D in the echo prevention circuit of FIG. 9.
Figure 11:
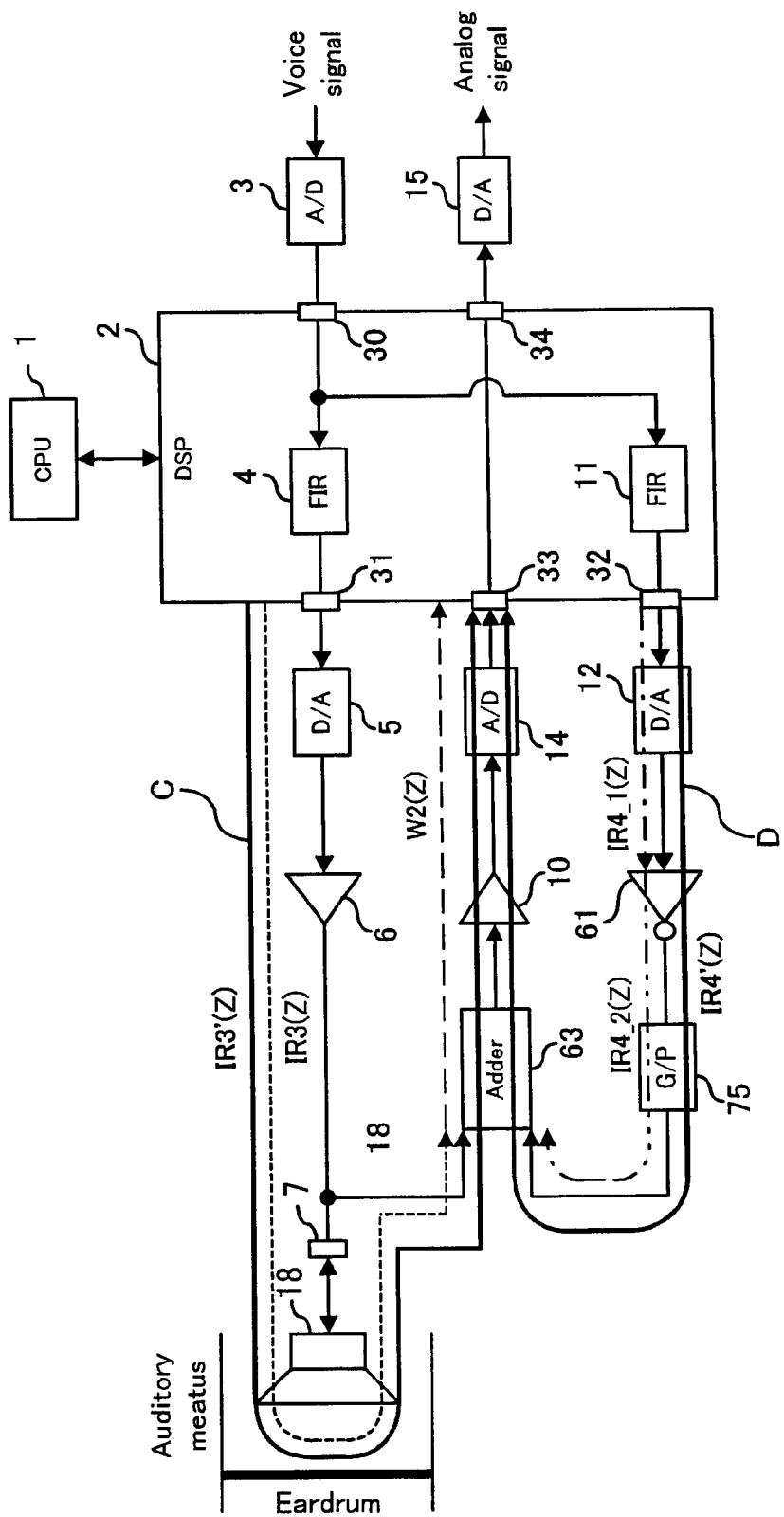
FIG. 11 is a diagram showing the case where the earphone microphone 18 is included in the path C of FIG. 10.

The filter coefficients of the FIR filters 4, 11 will be described in detail with reference to FIGS. 10, 11. FIG. 10 shows the paths C, D of the echo prevention circuit of FIG. 9. FIG. 11 shows a case where the earphone microphone 18 is included in the path C.

The analog signal from the amplifier 6 is possibly input into the adder 63 as well as being output through the input/output terminal 7. In this case, an echo of the analog signal occurs, or the analog signal from the amplifier 6 is superimposed on a voice signal input through the input/output terminal 7 and input to the adder 63, thus generating an echo. Accordingly, the filter coefficients of the FIR filters 4, 11 are set so as to prevent this echo.

Let IR3(Z) be impulse response (a transfer function) of from the output terminal 31 to an input terminal of the adder 63 indicated by a dashed line in FIG. 10 or 11, IR4_1(Z) be impulse response (a transfer function) of from the output terminal 32 to the input of the inverting amplifier 61 indicated by a chain line in FIG. 10 or 11, and IR4_2(Z) be impulse response (a transfer function) of from the input of the inverting amplifier 61 to an input terminal of the adder 63 indicated by a two-dot chain line in FIG. 10 or 11. Furthermore, let W2(Z) be impulse response (a transfer function) of from the stage following each input terminal of the adder 63 to the input terminal 33 indicated by a long dashed line in FIG. 10 or 11.

Then, the impulse response (transfer function) IR3'(Z) of the path C indicated by a solid line in FIG. 10 or 11 is expressed as IR3'(Z)=IR3(Z)·W2(Z), and the impulse response (transfer function) IR4'(Z) of the path D indicated by a solid line in FIG. 10 or 11 is expressed as IR4'(Z)=−IR4_1(Z)·IR4_2(Z)·W2(Z). Here, IR4_1(Z) is inverted in phase because of being inverted by the inverting amplifier 61.

Here, suppose that the filter coefficients of the FIR filter 4 are −IR4'(Z) that is the inverse of IR4'(Z), then the characteristic of from the input of the FIR filter 4 to the input terminal 33, I Rall_3(Z), is expressed as:

$$I\ \mathrm{Rall\_3}(Z) = -IR4'(Z) \cdot IR3'(Z)$$
$$= (-(-IR4\_1(Z) \cdot IR4\_2(Z) \cdot W2(Z))) \cdot (IR3(Z) \cdot W2(Z))$$
$$= IR4\_1(Z) \cdot IR4\_2(Z) \cdot W2(Z) \cdot IR3(Z) \cdot W2(Z).$$

Also, suppose that the filter coefficients of the FIR filter 11 are IR3'(Z), then the characteristic of from the input of the FIR filter 11 to the input terminal 33, I Rall_4(Z), is expressed as:

$$I\ \mathrm{Rall\_4}(Z) = IR3'(Z) \cdot IR4'(Z)$$
$$= IR3(Z) \cdot W2(Z) \cdot (-IR4\_1(Z) \cdot IR4\_2(Z) \cdot W2(Z))$$
$$= IR3(Z) \cdot W2(Z) \cdot (-IR4\_1(Z)) \cdot IR4\_2(Z) \cdot W2(Z)$$
$$= -I\ \mathrm{Rall\_3}(Z).$$

That is, the characteristic of from the input of the FIR filter 4 to the input terminal 33, I Rall_3(Z), and the characteristic of from the input of the FIR filter 11 to the input terminal 33, I Rall_4(Z), could cancel out. Therefore, it is understood that the filter coefficients of the FIR filter 4 need only be set equal to −IR4'(Z) that is the inverse of IR4'(Z) and the filter coefficients of the FIR filter 11 equal to IR3'(Z).

Alternatively, if the filter coefficients of the FIR filter 4 are IR4'(Z), then the characteristic of from the input of the FIR filter 4 to the input terminal 33, I Rall_3(Z), is expressed as:

$$I\ \mathrm{Rall\_3}(Z) = IR4'(Z) \cdot IR3'(Z)$$
$$= (-IR4\_1(Z) \cdot IR4\_2(Z) \cdot W2(Z)) \cdot (IR3(Z) \cdot W2(Z))$$
$$= -IR4\_1(Z) \cdot IR4\_2(Z) \cdot W2(Z) \cdot IR3(Z) \cdot W2(Z).$$

Also, if the filter coefficients of the FIR filter 11 are −IR3'(Z) that is the inverse of IR3'(Z), then the characteristic of from the input of the FIR filter 11 to the input terminal 33, I Rall_4(Z), is expressed as:

$$I\ \mathrm{Rall\_4}(Z) = -IR3'(Z) \cdot IR4'(Z)$$
$$= -(IR3(Z) \cdot W2(Z)) \cdot (-IR4\_1(Z) \cdot IR4\_2(Z) \cdot W2(Z))$$
$$= IR3(Z) \cdot W2(Z) \cdot IR4\_1(Z) \cdot IR4\_2(Z) \cdot W2(Z)$$
$$= -I\ \mathrm{Rall\_3}(Z).$$

That is, the characteristic of from the input of the FIR filter 4 to the input terminal 33, I Rall_3(Z), and the characteristic of from the input of the FIR filter 11 to the input terminal 33, I Rall_4(Z), could cancel out. Therefore, it is understood that the filter coefficients of the FIR filter 4 need only be set equal to IR4'(Z) and the filter coefficients of the FIR filter 11 equal to −IR3'(Z) that is the inverse of IR3'(Z).

By setting the filter coefficients of the FIR filters 4, 11 in this way, the signal transmitting through the path C in the adder 63 can be cancelled out by the signal transmitting through the path D. Therefore, the above-mentioned echo, which occurs when digital signals are input to the input terminal 30, can be prevented.

As shown in FIG. 11, in a state of the earphone microphone 18 being connected, the impulse response IR3'(Z) is acquired, and by setting the filter coefficients of the FIR filter 11 to this IR3'(Z), effective echo prevention that is according to the transfer characteristic of the earphone microphone 18 becomes possible.

Moreover, in a state where the connected earphone microphone 18 is attached to an ear by inserting into its auditory meatus or covering its ear auricle, the impulse response IR3'(Z) is acquired, and by setting the filter coefficients of the FIR filter 11 to this IR3'(Z), effective echo prevention that is according to the transfer characteristics of the earphone microphone 18 and of the user's auditory meatus becomes possible.

Note that the processes of setting the filter coefficients of the FIR filter 4 to −IR4'(Z), the inverse of IR4'(Z), and of setting the filter coefficients of the FIR filter 11 to IR3'(Z) can be performed like in the first implementation.

<<Third Implementation>>
==Example Configuration of Echo Prevention Circuit and Digital Signal Processing Circuit==

Figure 12:
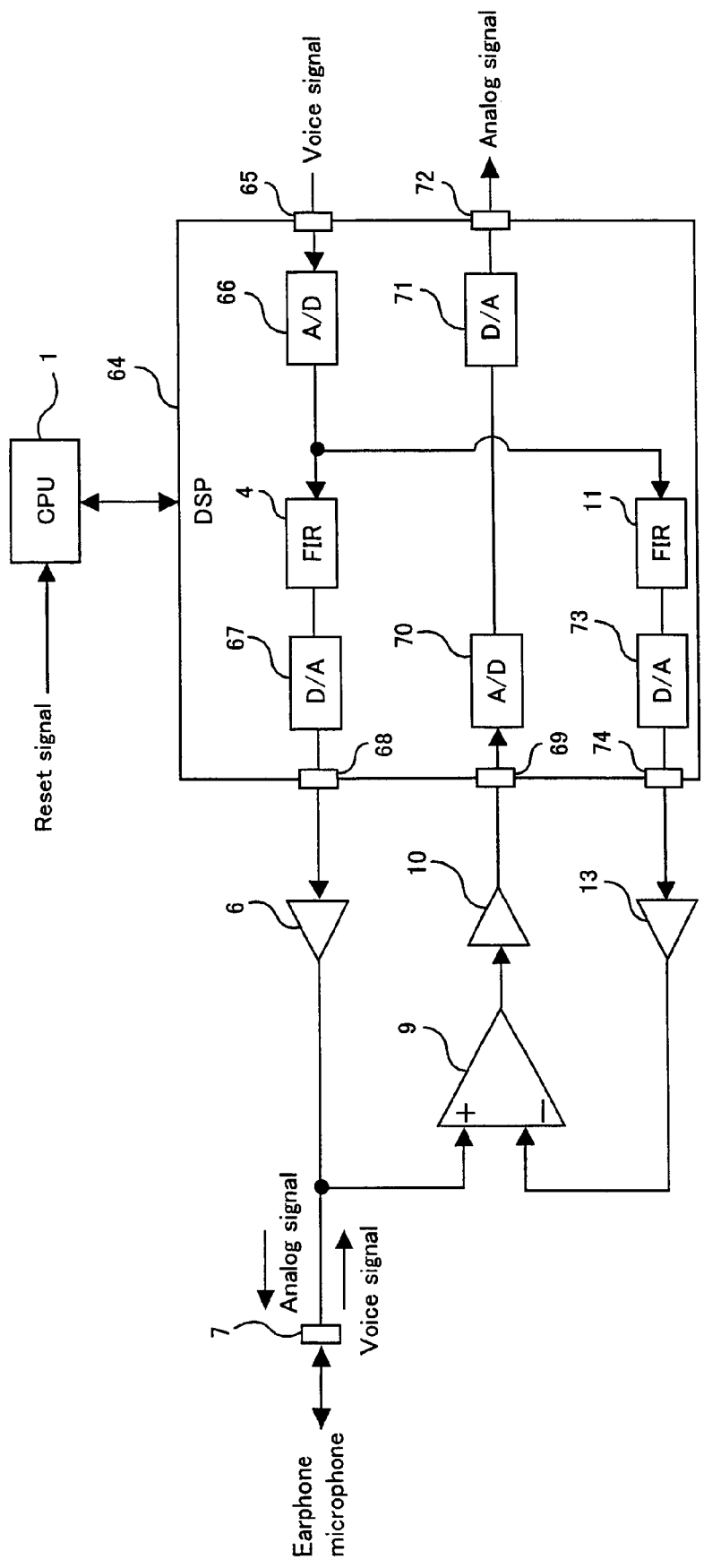
FIG. 12 is a block diagram illustrating a third implementation of the echo prevention circuit and the digital signal processing circuit included therein according to the present invention.

FIG. 12 is a diagram showing a third implementation. FIG. 12 is a block diagram illustrating an example of an echo prevention circuit and a digital signal processing circuit (DSP 64) included therein according to the present invention. In the echo prevention circuit of FIG. 12, the same reference numerals denote the same parts as in the first implementation with description thereof being omitted.

The echo prevention circuit comprises a CPU 1, a DSP 64, an amplifier 6, an input/output terminal 7, a differential amplifier 9, an amplifier 10, and an amplifier 13. Although also in this implementation the CPU 1 is included, it is possible that the CPU 1 is not included.

The DSP 64 has an input terminal 65 (a first input terminal), an AD converter 66, an FIR filter 4, a DA converter 67 (a first DA converter), an output terminal 68 (a first output terminal), an input terminal 69 (a second input terminal), an AD converter 70, a DA converter 71, an output terminal 72 (a third output terminal), an FIR filter 11, a DA converter 73 (a second DA converter), and an output terminal 74 (a second output terminal).

That is, the present implementation differs from the first implementation in that the AD converters 3, 14 and the DA converters 5, 12, 15 in the latter are incorporated in the DSP 64.

For example, a voice signal is input through the input terminal 65 to the AD converter 66, which outputs digital signals into which the voice signal has been analog-to-digital converted to the FIR filters 4, 11.

The FIR filter 4 performs the convolution operation on the digital signals based on its filter coefficients and outputs to the DA converter 67. At the same time, the FIR filter 11 performs the convolution operation based on its filter coefficients on the digital signals and outputs to the DA converter 73.

The DA converter 67 outputs an analog signal into which the digital signals have been digital-to-analog converted through the output terminal 68. Thus, the analog signal from the DA converter 67 is input to the amplifier 6.

The DA converter 73 outputs an analog signal into which the digital signals have been digital-to-analog converted through the output terminal 74. Thus, the analog signal from the DA converter 73 is input to the amplifier 13.

A voice signal from the amplifier 10 is input through the input terminal 69 to the AD converter 70, which outputs digital signals into which the voice signal has been analog-to-digital converted to the DA converter 71.

The DA converter 71 outputs an analog signal into which the digital signals have been digital-to-analog converted through the output terminal 72.

==Filter Coefficients of FIR Filters 4, 11==

Figure 13:
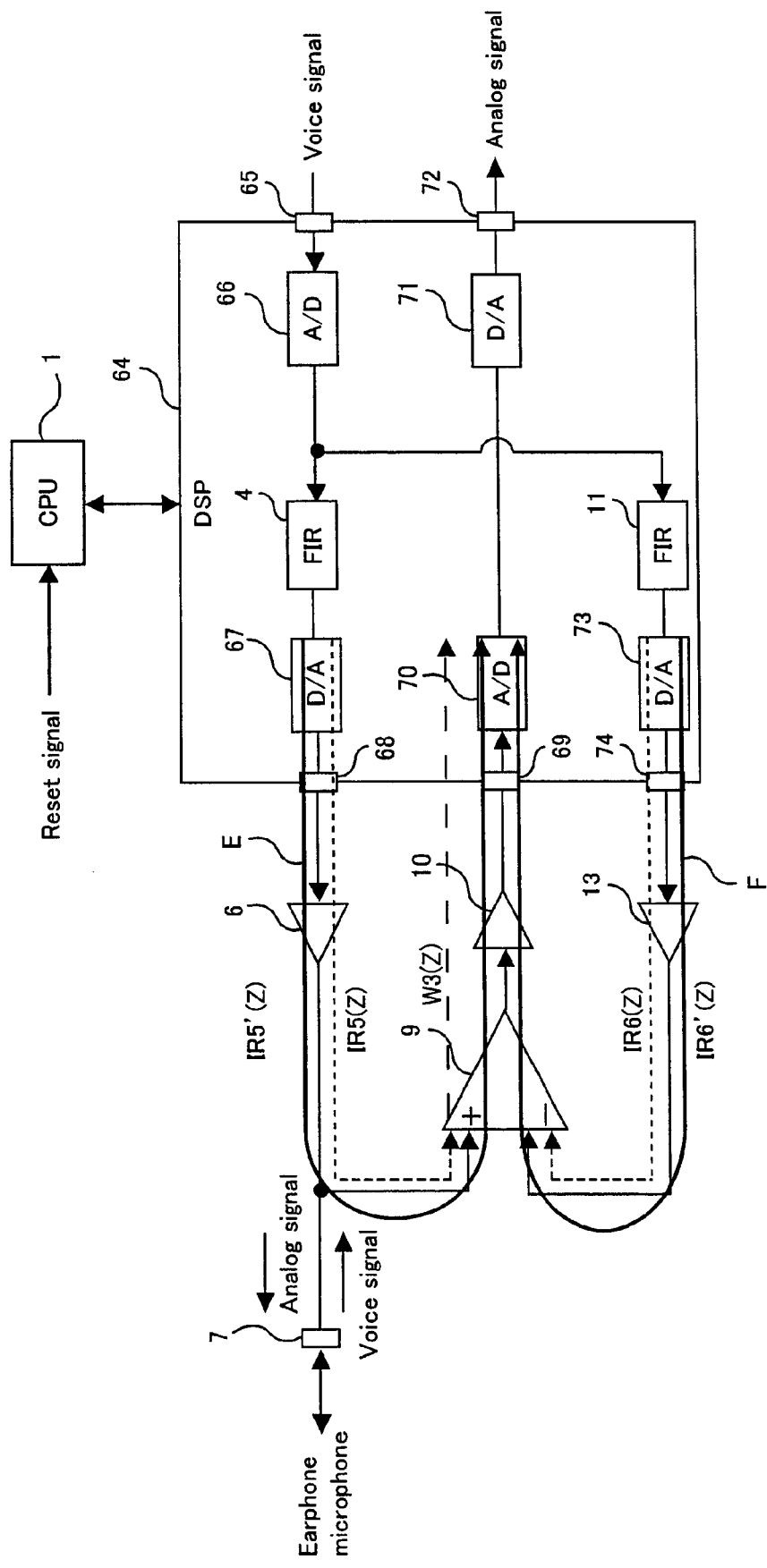
FIG. 13 is a diagram showing paths E, F in the echo prevention circuit of FIG. 12.
Figure 14:
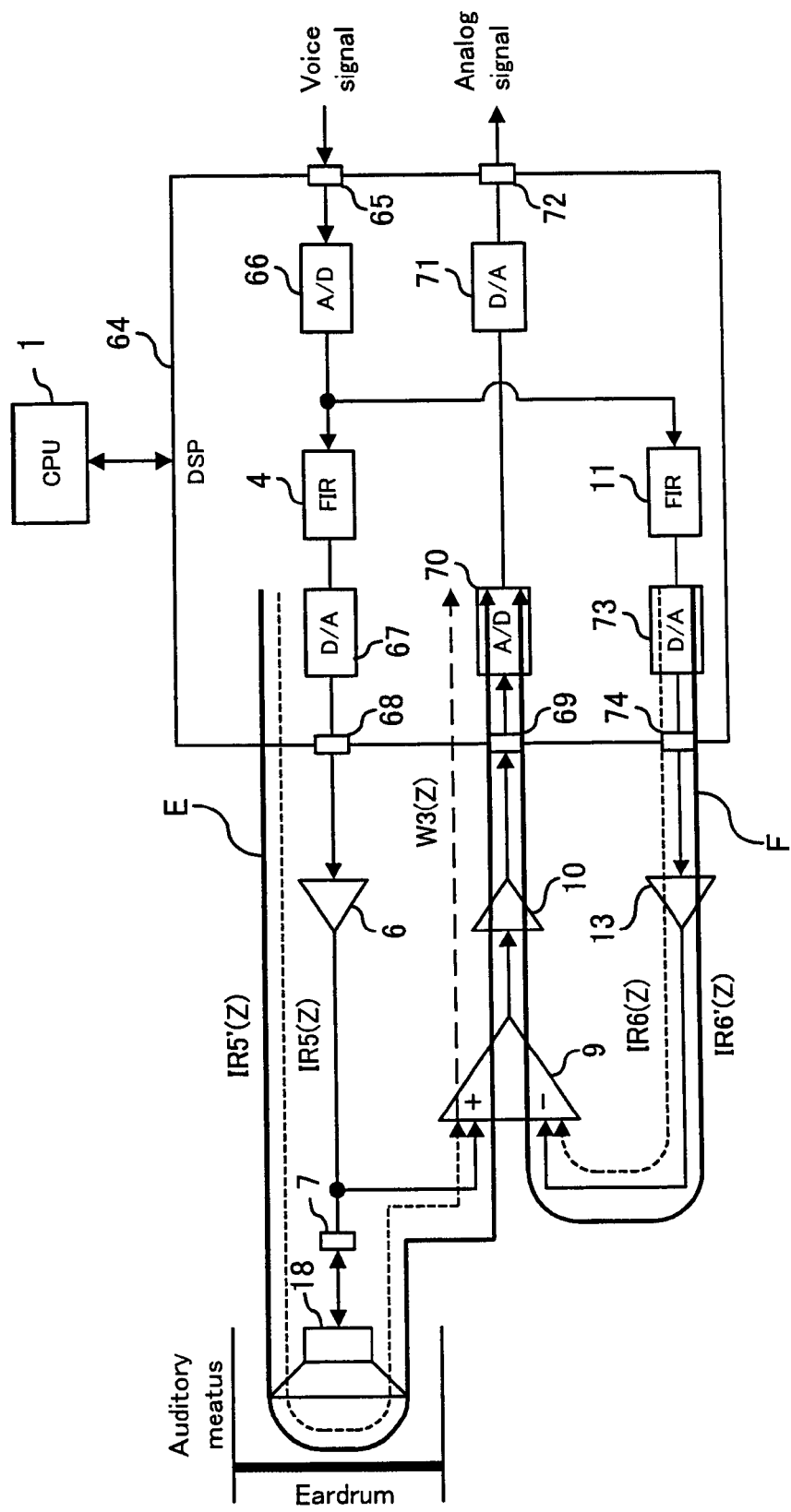
FIG. 14 is a diagram showing the case where the earphone microphone 18 is included in the path E of FIG. 13.

The filter coefficients of the FIR filters 4, 11 will be described in detail with reference to FIGS. 13, 14. FIG. 13 shows the paths E, F of the echo prevention circuit of FIG. 12. FIG. 14 shows a case where the earphone microphone 18 is included in the path E.

The analog signal from the amplifier 6 is possibly input into the differential amplifier 9 as well as being output through the input/output terminal 7. In this case, an echo of the analog signal occurs, or the analog signal from the amplifier 6 is superimposed on a voice signal input through the input/output terminal 7 and input to the differential amplifier 9, thus generating an echo. Accordingly, the filter coefficients of the FIR filters 4, 11 are set so as to prevent this echo.

Let IR5(Z) be impulse response (a transfer function) of from the input of the DA converter 67 to the + input terminal of the differential amplifier 9 indicated by a dashed line in FIG. 13 or 14, IR6(Z) be impulse response (a transfer function) of from the input of the DA converter 73 to the − input terminal of the differential amplifier 9 indicated by a dashed line in FIG. 13 or 14, and W3(Z) be impulse response (a transfer function) of from the stage following the +/− input terminal of the differential amplifier 9 to the output of the AD converter 70 indicated by a long dashed line in FIG. 13 or 14.

Then, the impulse response (transfer function) IR5'(Z) of the path E indicated by a solid line in FIG. 13 or 14 is expressed as IR5'(Z)=IR5(Z)·W3(Z), and the impulse response (transfer function) IR6'(Z) of the path F indicated by a solid line in FIG. 13 or 14 is expressed as IR6'(Z)=−IR6(Z)·W3(Z). Here, the reason why IR6(Z) is inverted in phase is that the path F goes through the − input terminal of the differential amplifier 9.

Here, suppose that the filter coefficients of the FIR filter 4 are −IR6'(Z) that is the inverse of IR6'(Z), then the characteristic of from the input of the FIR filter 4 to the output of the AD converter 70, I Rall_5(Z), is expressed as:

$$I\,\text{Rall\_5}(Z) = -IR6'(Z) \cdot IR5'(Z)$$
$$= (-(-IR6(Z) \cdot W3(Z))) \cdot (IR5(Z) \cdot W3(Z))$$
$$= IR6(Z) \cdot W3(Z) \cdot IR5(Z) \cdot W3(Z).$$

Also, suppose that the filter coefficients of the FIR filter 11 are IR5'(Z), then the characteristic of from the input of the FIR filter 11 to the output of the AD converter 70, I Rall_6(Z), is expressed as:

$$I\,\text{Rall\_6}(Z) = IR5'(Z) \cdot IR6'(Z)$$
$$= IR5(Z) \cdot W3(Z) \cdot (-IR6(Z) \cdot W3(Z))$$
$$= IR5(Z) \cdot W3(Z) \cdot (-IR6(Z)) \cdot W3(Z)$$
$$= -I\,\text{Rall\_5}(Z).$$

That is, the characteristic of the path E, I Rall_5(Z), and the characteristic of the path F, I Rall_6(Z), could cancel out. Therefore, it is understood that the filter coefficients of the FIR filter 4 need only be set equal to −IR6'(Z) that is the inverse of IR6'(Z) and the filter coefficients of the FIR filter 11 equal to IR5'(Z).

Alternatively, if the filter coefficients of the FIR filter 4 are IR6'(Z), then the characteristic of from the input of the FIR filter 4 to the output of the AD converter 70, I Rall_5(Z), is expressed as:

$$I\,\text{Rall\_5}(Z) = IR6'(Z) \cdot IR5'(Z)$$
$$= (-IR6(Z) \cdot W3(Z)) \cdot (IR5(Z) \cdot W3(Z))$$
$$= -IR6(Z) \cdot W3(Z) \cdot IR5(Z) \cdot W3(Z).$$

Also, if the filter coefficients of the FIR filter 11 are −IR5'(Z) that is the inverse of IR5'(Z), then the characteristic of from the input of the FIR filter 11 to the output of the AD converter 70, I Rall_6(Z), is expressed as:

$$I\,\text{Rall\_6}(Z) = -IR5'(Z) \cdot IR6'(Z)$$
$$= (-(IR5(Z) \cdot W3(Z))) \cdot (-IR6(Z) \cdot W3(Z))$$
$$= IR5(Z) \cdot W3(Z) \cdot IR6(Z) \cdot W3(Z)$$
$$= -I\,\text{Rall\_5}(Z).$$

That is, the characteristic of the path E, I Rall_5(Z), and the characteristic of the path F, I Rall_6(Z), could cancel out. Therefore, it is understood that the filter coefficients of the FIR filter 4 need only be set equal to IR6'(Z) and the filter coefficients of the FIR filter 11 equal to −IR5'(Z) that is the inverse of IR5'(Z).

By setting the filter coefficients of the FIR filters 4, 11 in this way, the signal transmitting through the path E in the differential amplifier 9 can be cancelled out by the signal transmitting through the path F. Therefore, the above-mentioned echo, which occurs when digital signals are input to the input terminal 65, can be prevented.

As shown in FIG. 14, in a state of the earphone microphone 18 being connected, the impulse response IR5'(Z) is acquired, and by setting the filter coefficients of the FIR filter 11 to this IR5'(Z), effective echo prevention that is according to the transfer characteristic of the earphone microphone 18 becomes possible.

Moreover, in a state where the connected earphone microphone 18 is attached to an ear by inserting into its auditory meatus or covering its ear auricle, the impulse response IR5'(Z) is acquired, and by setting the filter coefficients of the FIR filter 11 to this IR5'(Z), effective echo prevention that is according to the transfer characteristics of the earphone microphone 18 and of the user's auditory meatus becomes possible.

Note that the processes of setting the filter coefficients of the FIR filter 4 to −IR6'(Z), the inverse of IR6'(Z), and of setting the filter coefficients of the FIR filter 11 to IR5'(Z) can be performed like in the first implementation.

<<Fourth Implementation>>
==Example Configuration of Echo Prevention Circuit and Digital Signal Processing Circuit==

Figure 15:
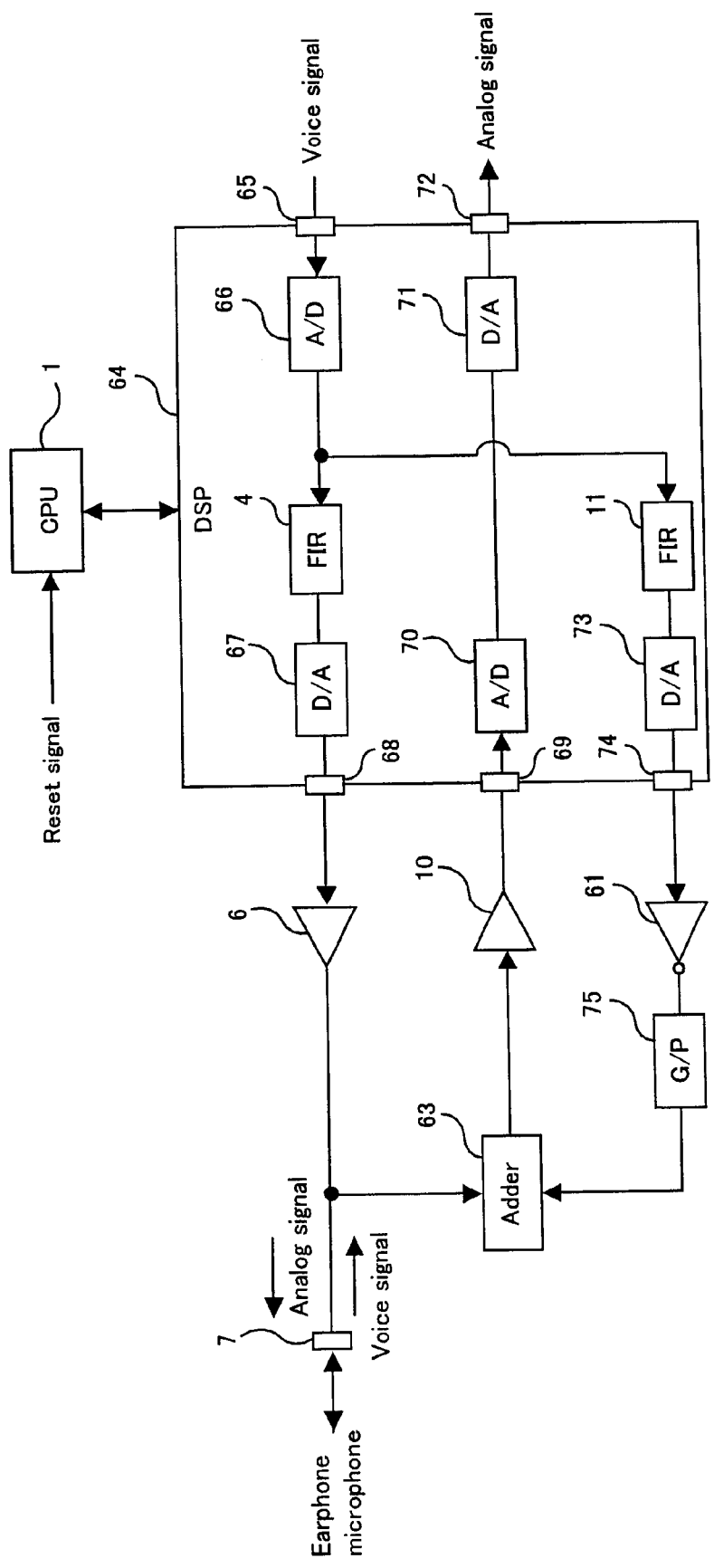
FIG. 15 is a block diagram illustrating a fourth implementation of the echo prevention circuit and the digital signal processing circuit included therein according to the present invention.

FIG. 15 is a diagram showing a fourth implementation. FIG. 15 is a block diagram illustrating an example of an echo prevention circuit and a digital signal processing circuit (DSP 64) included therein according to the present invention.

As shown in FIG. 15, the echo prevention circuit of the fourth implementation has a configuration where the second implementation (FIG. 9) and the third implementation (FIG. 12) are combined, and the same reference numerals denote the same parts as in the first implementation with description thereof being omitted.

==Filter Coefficients of FIR Filters 4, 11==

Figure 16:
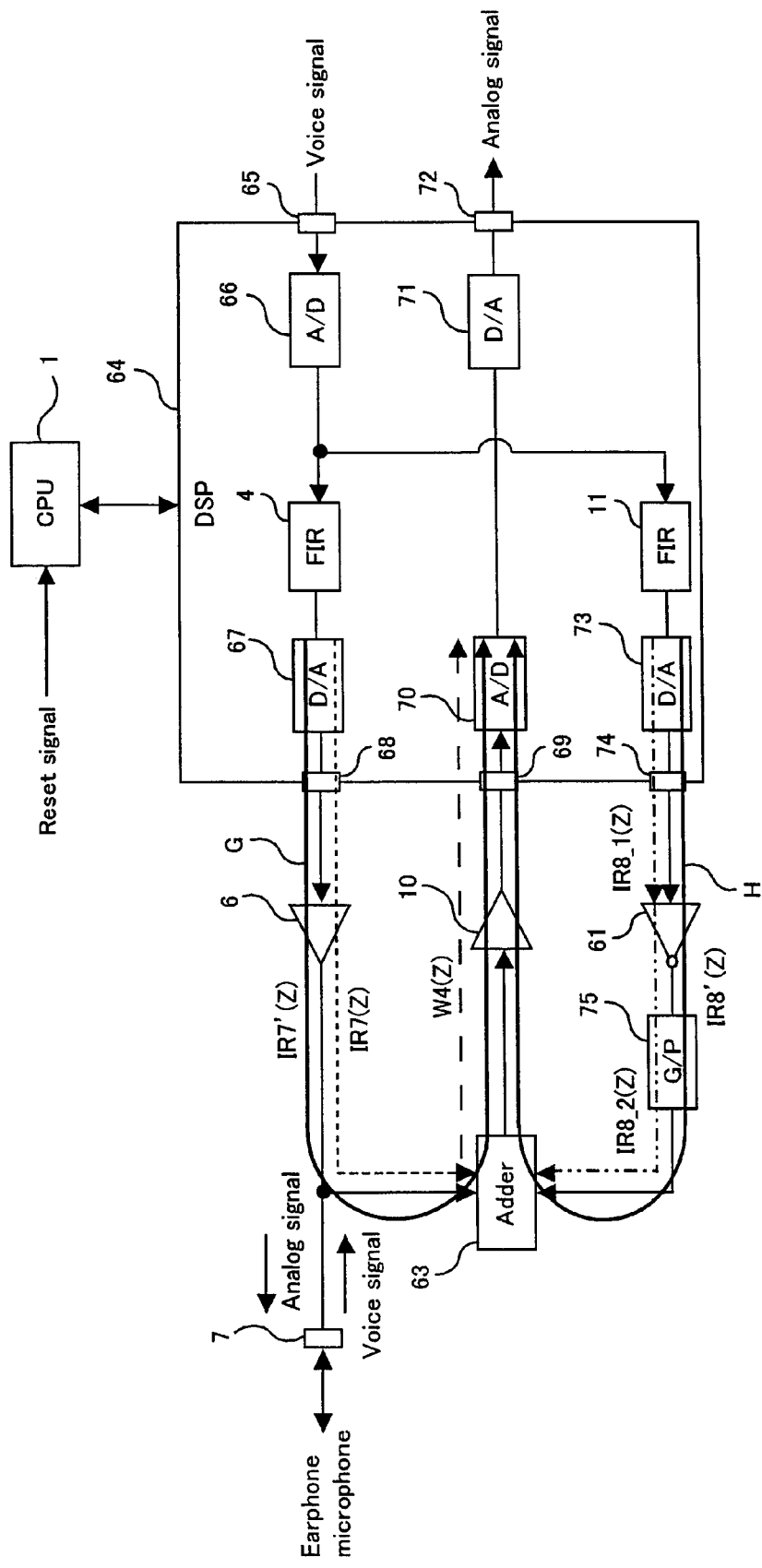
FIG. 16 is a diagram showing paths G, H in the echo prevention circuit of FIG. 15.
Figure 17:
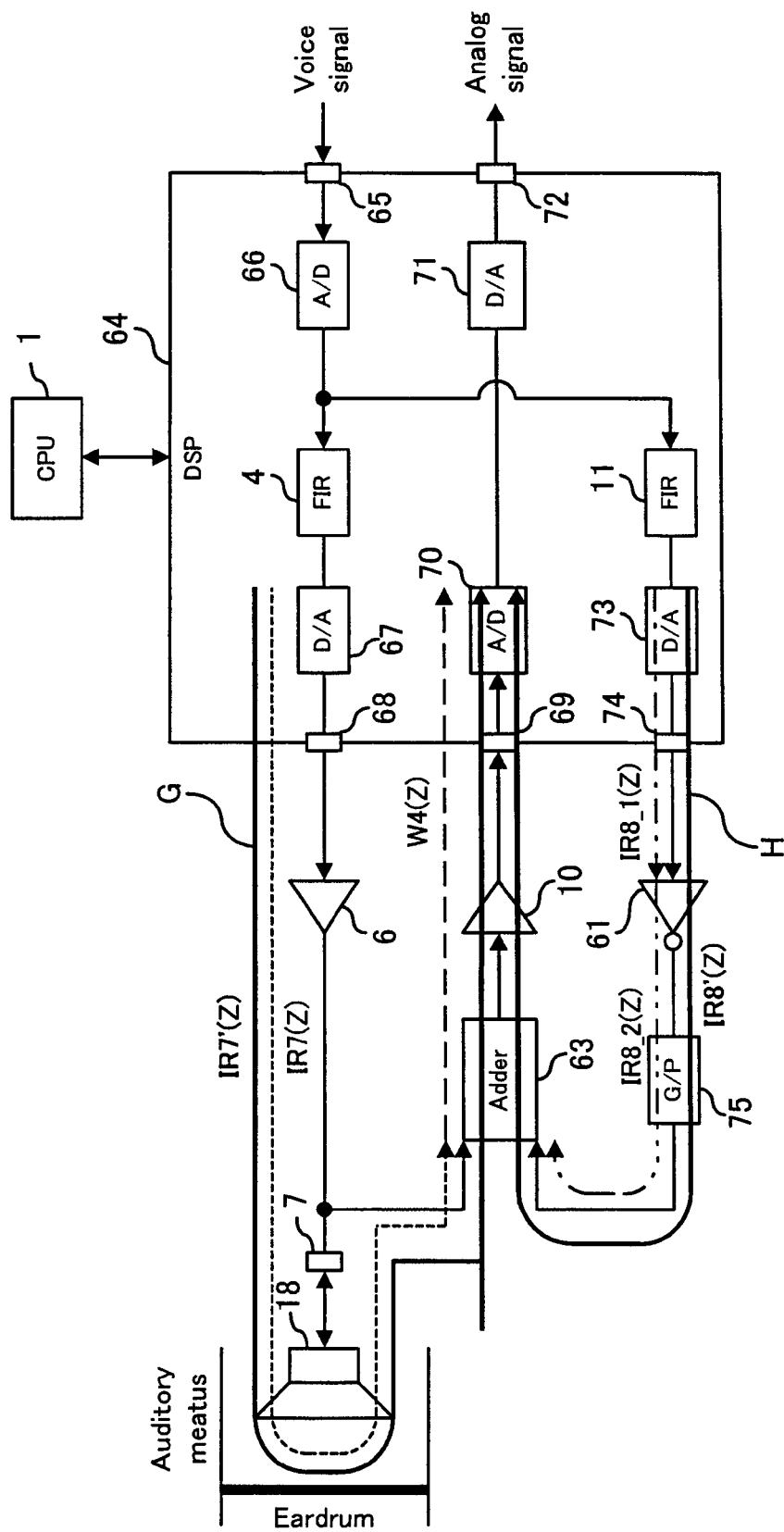
FIG. 17 is a diagram showing the case where the earphone microphone 18 is included in the path G of FIG. 16.

The filter coefficients of the FIR filters 4, 11 will be described in detail with reference to FIGS. 16, 17. FIG. 16 shows the paths G, H of the echo prevention circuit of FIG. 15. FIG. 17 shows a case where the earphone microphone 18 is included in the path G.

The analog signal from the amplifier 6 is possibly input into the adder 63 as well as being output through the input/output terminal 7. In this case, an echo of the analog signal occurs, or the analog signal from the amplifier 6 is superimposed on a voice signal input through the input/output terminal 7 and input to the adder 63, thus generating an echo. Accordingly, the filter coefficients of the FIR filters 4, 11 are set so as to prevent this echo.

Let IR7(Z) be impulse response (a transfer function) of from the input of the DA converter 67 to an input terminal of the adder 63 indicated by a dashed line in FIG. 16 or 17, IR8_1(Z) be impulse response (a transfer function) of from the input of the DA converter 73 to the input of the inverting amplifier 61 indicated by a chain line in FIG. 16 or 17, and IR8_2(Z) be impulse response (a transfer function) of from the input of the inverting amplifier 61 to an input terminal of the adder 63 indicated by a two-dot chain line in FIG. 16 or 17. Furthermore, let W4(Z) be impulse response (a transfer function) of from the stage following each input terminal of the adder 63 to the output of the AD converter 70 indicated by a long dashed line in FIG. 16 or 17.

Then, the impulse response (transfer function) IR7'(Z) of the path G indicated by a solid line in FIG. 16 or 17 is expressed as IR7'(Z)=IR7(Z)·W4(Z), and the impulse response (transfer function) IR8'(Z) of the path H indicated by a solid line in FIG. 16 or 17 is expressed as IR8'(Z)=−IR8_1(Z)·IR8_2(Z)·W4(Z). Here, IR8_1(Z) is inverted in phase because of being inverted by the inverting amplifier 61.

Here, suppose that the filter coefficients of the FIR filter 4 are −IR8'(Z) that is the inverse of IR8'(Z), then the characteristic of from the input of the FIR filter 4 to the output of the AD converter 70, I Rall_7(Z), is expressed as:

$$I\text{Rall\_7}(Z) = -IR8'(Z) \cdot IR7'(Z)$$
$$= (-(-IR8\_1(Z) \cdot IR8\_2(Z) \cdot W4(Z))) \cdot (IR7(Z) \cdot W4(Z))$$
$$= IR8\_1(Z) \cdot IR8\_2(Z) \cdot W4(Z) \cdot IR7(Z) \cdot W4(Z).$$

Also, suppose that the filter coefficients of the FIR filter 11 are IR7'(Z), then the characteristic of from the input of the FIR filter 11 to the output of the AD converter 70, I Rall_8(Z), is expressed as:

$$I\text{Rall\_8}(Z) = IR7'(Z) \cdot IR8'(Z)$$
$$= IR7(Z) \cdot W4(Z) \cdot (-IR8\_1(Z) \cdot IR8\_2(Z) \cdot W4(Z))$$
$$= IR7(Z) \cdot W4(Z) \cdot (-IR8\_1(Z)) \cdot IR8\_2(Z) \cdot W4(Z)$$
$$= -I\text{Rall\_7}(Z).$$

That is, the characteristic of from the input of the FIR filter 4 to the output of the AD converter 70, I Rall_7(Z), and the characteristic of from the input of the FIR filter 11 to the output of the AD converter 70, I Rall_8(Z), could cancel out. Therefore, it is understood that the filter coefficients of the FIR filter 4 need only be set equal to −IR8'(Z) that is the inverse of IR8'(Z) and the filter coefficients of the FIR filter 11 equal to IR7'(Z)

Alternatively, if the filter coefficients of the FIR filter 4 are IR8'(Z), then the characteristic of from the input of the FIR filter 4 to the output of the AD converter 70, I Rall_7(Z), is expressed as:

$$I\text{Rall\_7}(Z) = IR8'(Z) \cdot IR7'(Z)$$
$$= (-IR8\_1(Z) \cdot IR8\_2(Z) \cdot W4(Z)) \cdot (IR7(Z) \cdot W4(Z))$$
$$= -IR8\_1(Z) \cdot IR8\_2(Z) \cdot W4(Z) \cdot (IR7(Z) \cdot W4(Z)).$$

Also, if the filter coefficients of the FIR filter 11 are −IR7'(Z) that is the inverse of IR7'(Z), then the characteristic of from the input of the FIR filter 11 to the output of the AD converter 70, I Rall_8(Z), is expressed as:

$$I\text{Rall\_8}(Z) = -IR7'(Z) \cdot IR8'(Z)$$
$$= -(IR7(Z) \cdot W4(Z)) \cdot (-IR8\_1(Z) \cdot IR8\_2(Z) \cdot W4(Z))$$
$$= IR7(Z) \cdot W4(Z) \cdot IR8\_1(Z) \cdot IR8\_2(Z) \cdot W4(Z)$$
$$= -I\text{Rall\_7}(Z).$$

That is, the characteristic of from the input of the FIR filter 4 to the output of the AD converter 70, I Rall_7(Z), and the characteristic of from the input of the FIR filter 11 to the output of the AD converter 70, I Rall_8(Z), could cancel out. Therefore, it is understood that the filter coefficients of the FIR filter 4 need only be set equal to IR8'(Z) and the filter coefficients of the FIR filter 11 equal to −IR7'(Z) that is the inverse of IR7'(Z).

By setting the filter coefficients of the FIR filters 4, 11 in this way, the signal transmitting through the path G in the adder 63 can be cancelled out by the signal transmitting through the path H. Therefore, the above-mentioned echo, which occurs when digital signals are input to the input terminal 65, can be prevented.

As shown in FIG. 17, in a state of the earphone microphone 18 being connected, the impulse response IR7'(Z) is acquired, and by setting the filter coefficients of the FIR filter 11 to this IR7'(Z), effective echo prevention that is according to the transfer characteristic of the earphone microphone 18 becomes possible.

Moreover, in a state where the connected earphone microphone 18 is attached to an ear by inserting into its auditory meatus or covering its ear auricle, the impulse response IR7'(Z) is acquired, and by setting the filter coefficients of the FIR filter 11 to this IR7'(Z), effective echo prevention that is according to the transfer characteristics of the earphone microphone 18 and of the user's auditory meatus becomes possible.

Note that the processes of setting the filter coefficients of the FIR filter 4 to −IR8'(Z), the inverse of IR8'(Z), and of setting the filter coefficients of the FIR filter 11 to IR7'(Z) can be performed like in the first implementation.

<<Fifth Implementation>>

==Example Configuration of Echo Prevention Circuit and Digital Signal Processing Circuit==

Figure 18:
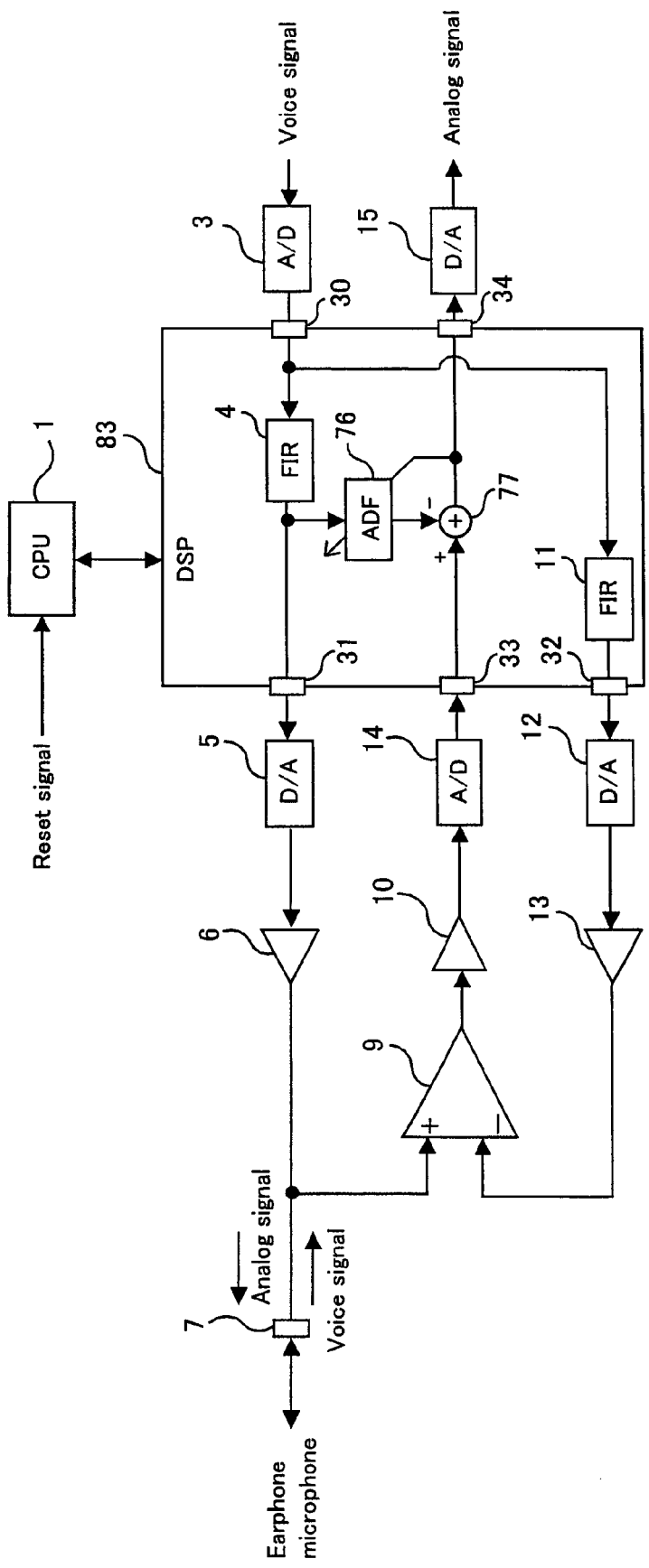
FIG. 18 is a block diagram illustrating a fifth implementation of the echo prevention circuit and the digital signal processing circuit included therein according to the present invention.
Figure 19:
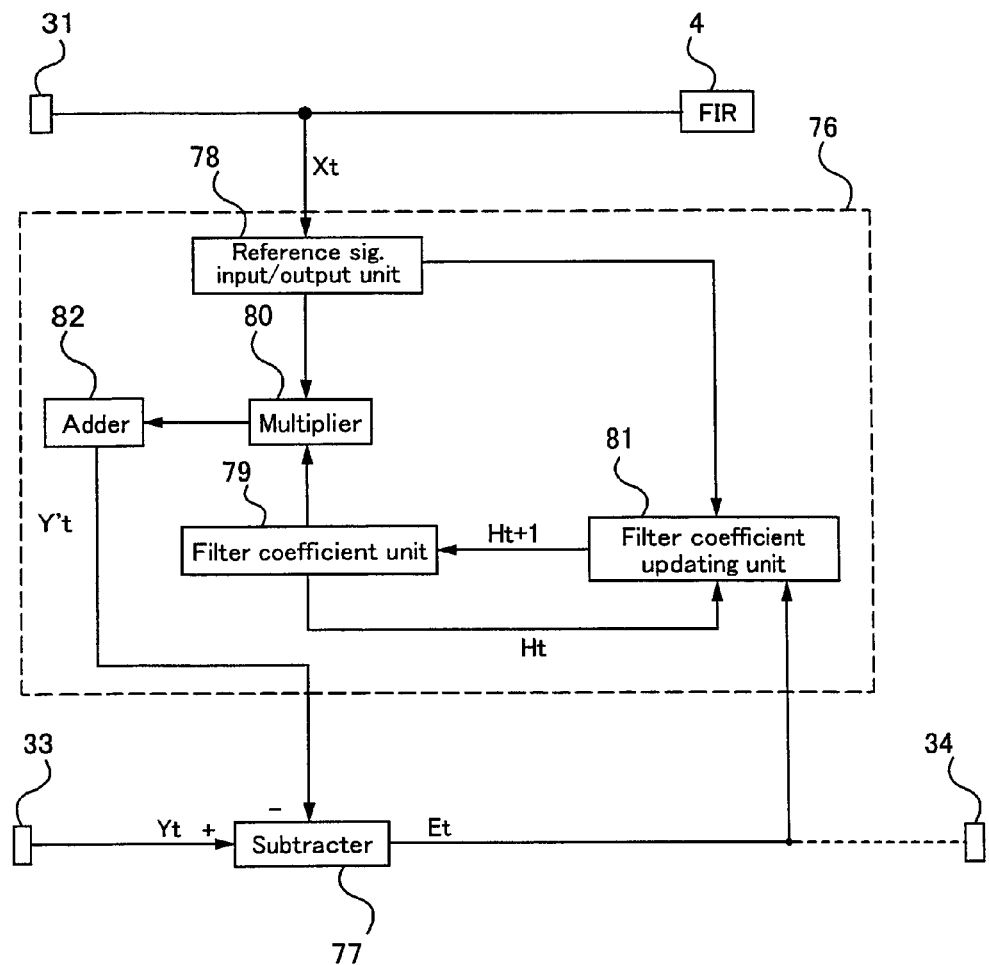
FIG. 19 is a detailed diagram of an ADF 76 of FIG. 18.

FIG. 18 is a diagram showing a fifth implementation. FIG. 18 is a block diagram illustrating an example of an echo prevention circuit and a digital signal processing circuit (DSP 83) included therein according to the present invention. In the echo prevention circuit of FIG. 18, the same reference numerals denote the same parts as in the first implementation with description thereof being omitted. FIG. 19 is a detailed diagram of an ADF (Adaptive Digital Filter) 76 of FIG. 18.

The DSP 83 has an input terminal 30, an FIR filter 4, the ADF 76, an output terminal 31, an FIR filter 11, an output terminal 32, an input terminal 33, a subtracter 77 (a second subtracter), and an output terminal 34.

A digital signal from the AD converter 14 is input through the input terminal 33 to the + input terminal of the subtracter 77. The output signal from the ADF 76 is input to the − input terminal of the subtracter 77. The subtracter 77 subtracts the digital signal from the AD converter 14 and the output signal from the ADF 76. Hereinafter, the output signal from the subtracter 77 is called an error signal.

As enclosed by a dashed line in FIG. 19, the ADF 76 has a reference signal input/output unit 78, a filter coefficient unit 79, a multiplier 80, a filter coefficient updating unit 81, and an adder 82.

The reference signal input/output unit 78 has inputted thereto a digital signal from the FIR filter 4, which digital signal is hereinafter called a reference signal, and holds and outputs the reference signal to the multiplier 80 and the filter coefficient updating unit 81.

The filter coefficient unit 79 has inputted thereto filter coefficients from the filter coefficient updating unit 81 and holds the filter coefficients. The filter coefficient unit 79 outputs the filter coefficients to the multiplier 80, while the reference signal input/output unit 78 outputs the reference signals to the multiplier 80, and also outputs the filter coefficients to the filter coefficient updating unit 81.

The multiplier 80 outputs the results of multiplying the reference signals and the filter coefficients sequentially to the adder 82, which outputs the results of adding the output signals from the multiplier 80 sequentially to the subtracter 77.

The error signals from the subtracter 77 are input into the filter coefficient updating unit 81. The filter coefficient updating unit 81 calculates filter coefficients based on the error signals, the reference signals, and the filter coefficients according to an estimation algorithm such as an LMS (Least Mean Square) or an NLMS (Normalized Least Mean Square), and outputs to the filter coefficient unit 79. The filter coefficient updating unit 81 calculates such filter coefficients that the average of the error signals from the subtracter 77 is at or below a predetermined value when digital signals are input to the input terminal 30. This predetermined value is decided in such a way that an echo in a voice generated based on an analog signal that is output from the DA converter 15 when the average of the error signals is at or below it, has such a level that human beings can not hear.

Digital signals from the subtracter 77 are input through the output terminal 34 to the DA converter 15, which outputs an analog signal into which the digital signals have been digital-to-analog converted.

==Updating Filter Coefficients of Filter Coefficient Unit 79==

Figure 20:
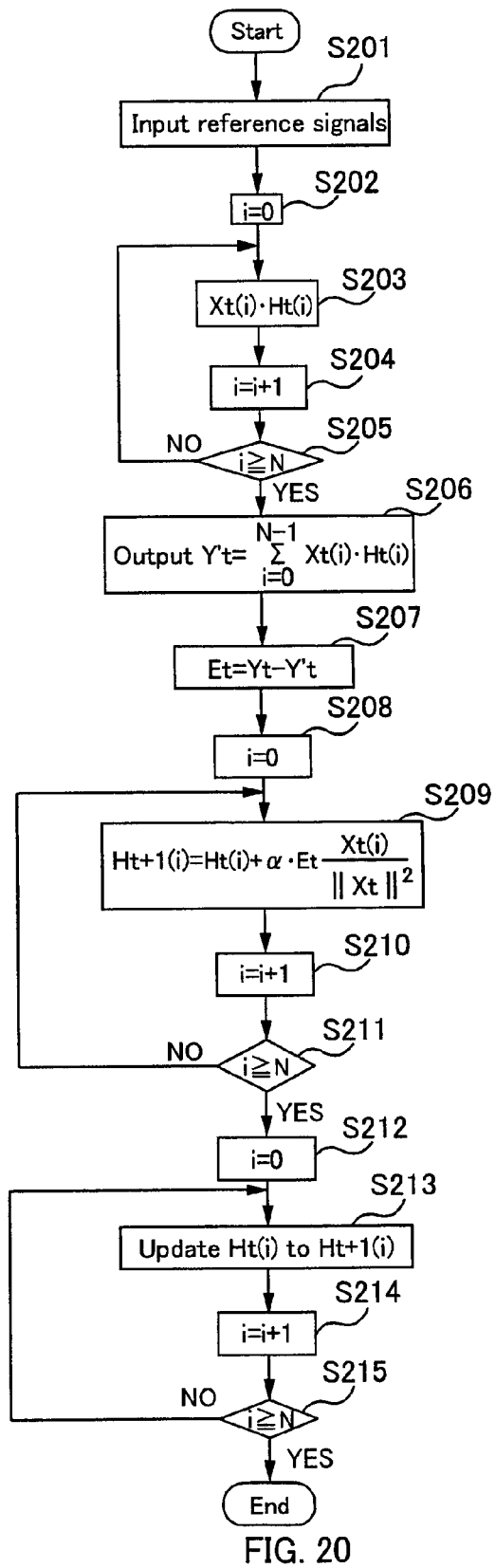
FIG. 20 is a flow chart illustrating the operation of the echo prevention circuit and the digital signal processing circuit included therein according to the present invention.

An example of the operation for updating the filter coefficients of the filter coefficient unit 79 will be described with reference to FIGS. 19, 20. FIG. 20 is a flow chart showing an example of the operation of the echo prevention circuit and digital signal processing circuit included therein according to the present invention. In the description below, let Yt be a digital signal that is input to the + input terminal of the subtracter 77 at time t when a digital signal is input to the input terminal 30, and Xt (={Xt(0), Xt(1), ..., Xt(N−1)}) be reference signals that are input into the reference signal input/output unit 78. Moreover, Let Ht (={Ht(0), Ht(1), ..., Ht(N−1)}) be filter coefficients of the filter coefficient unit 79, and Ht+1 (={Ht+1(0), Ht+1(1), ..., Ht+1(N−1)}) be filter coefficients that are calculated by the filter coefficient updating unit 81. Xt(i), Ht(i), Ht+1(i) refer to the i-th reference signal and filter coefficients respectively.

When inputting the reference signals Xt to the reference signal input/output unit 78 (S201), the DSP 83 performs the following process to generate a signal Y't to be input to the − input terminal of the subtracter 77. First, the DSP 83 sets i to 0 (S202) and has Xt(0) of the reference signal input/output unit 78 and Ht(0) of the filter coefficient unit 79 output to the multiplier 80. The multiplier 80 multiplies Xt(0) and Ht(0) (S203), and outputs the multiplying result to the adder 82, which adds Xt(0)·Ht(0) from the multiplier 80 and a zero.

Next, the DSP 83 increments i by one, that is, i=i+1=1 (S204). The DSP 83 determines that i not $\geq$N (NO at S205) because the multiplying result of the multiplier 80 has not reached Xt(N−1)·Ht(N−1), and has Xt(1) of the reference signal input/output unit 78 and Ht(1) of the filter coefficient unit 79 output to the multiplier 80. The multiplier 80 outputs the result of multiplying Xt(1) and Ht(1) (S203) to the adder 82, which adds Xt(1) Ht(1) output from the multiplier 80 and Xt(0)·Ht(0). In this way, the processes of from S203 to S205 are repeated until i$\geq$N (YES at S205), and the adding result of the adder 82 becomes Y't (=Xt(0)·Ht(0)+ ... +Xt(N−1)·Ht(N−1)). Then, the adder 82 outputs Y't to the − input terminal of the subtracter 77 (S206).

The subtracter 77 subtracts Yt input to its + input terminal and Y't input to its − input terminal and outputs (S207). An error signal from the subtracter 77 is input into the filter coefficient updating unit 81. Letting Et (=Yt−Y't) be the error signal from the subtracter 77, description will be made below.

The filter coefficient updating unit 81 performs the following processes to update the filter coefficients of the filter coefficient unit 79. First, the filter coefficient updating unit 81 sets i to 0 to calculate Ht+1(0) (S208). Ht+1(0) is expressed as:

$$Ht+1(0)=Ht(0)+(\alpha \cdot Et \cdot Xt(0))/|Xt|^2,$$

where $\alpha$ is a step gain, a predetermined constant, and $|Xt|^2$ is a norm (or square sum) of the reference signals Xt. The filter coefficient updating unit 81 solves the above equation based on Xt(0) from the reference signal input/output unit 78, Ht(0) from the filter coefficient unit 79, and Et from the subtracter 77 thereby calculating Ht+1(0) (S209). Next, to calculate Ht+1(1), the filter coefficient updating unit 81 increments i by one, that is, i=i+1=1 (S210). The filter coefficient updating unit 81 determines that i not ≧N (NO at S211) because the filter coefficient calculated has not yet reached Ht+1(N−1). Like in the above, Ht+1(1) is calculated from:

$$Ht+1(1)=Ht(1)+(\alpha \cdot Et \cdot Xt(1))/|Xt|^2.$$

In this way, the processes of from S209 to S211 are repeated until i≧N (YES at S211), and thereby Ht+1 (={Ht+1(0), . . . , Ht+1(N−1)}) is calculated. To update Ht (={Ht(0), . . . , Ht(N−1)}) to Ht+1 (={Ht+1(0), . . . , Ht+1(N−1)}) in the filter coefficient unit 79, the filter coefficient updating unit 81 outputs the Ht+1 to the filter coefficient unit 79.

First, the DSP 83 sets i to 0 to update Ht(0) to Ht+1(0) (S212). As a result, Ht(0) of the filter coefficient unit 79 is updated to Ht+1(0) (S213). Next, the DSP 83 increments i by one, that is, i=i+1=1 to update Ht(1) to Ht+1(1) (S214). The DSP 83 determines that i not ≧N (NO at S215) because Ht(N−1) has not yet been updated to Ht+1(N−1), and updates Ht(1) to Ht+1(1) (S213). In this way, the processes of from S213 to S215 are repeated until i≧N (YES at S215), and thereby Ht (={Ht(0), . . . , Ht(N−1)}) is updated to Ht+1 (={Ht+1(0), . . . , Ht+1(N−1)}).

Then, the processes of from S202 to S205 are performed again. As a result, an output signal Y't based on Ht+1(={Ht+1(0), . . . , Ht+1(N−1)}) is input from the adder 82 to the − input terminal of the subtracter 77.

In this way, the filter coefficients of the filter coefficient unit 79 can be updated to the filter coefficients reflecting the error signal from the subtracter 77 on the basis of the error signal. By repeating these processes, the average of the error signals from the subtracter 77 can be made at or below the predetermined value when digital signals are input to the input terminal 30. That is, echoes can be prevented. The algorithm for updating the filter coefficients of the filter coefficient unit 79 is not limited to this. The existing estimation algorithm such as the LMS algorithm or the NLMS algorithm, mentioned above, can be used. Or, the filter coefficients of the filter coefficient unit 79 can be updated by the process disclosed in, for example, Japanese Patent Application Laid-Open Publication No. 2002-246880.

According to the above implementation, the above processes have been described which use hardware (e.g., the subtracter 77 and the multiplier 80), but the invention is not limited to this. For example, a program for the above processes may be stored beforehand in a ROM or the like so that a processor of the DSP 83 reads out the program and executes.

In the present implementation, the filter coefficients of the FIR filters 4, 11 can be set by executing the same processes as in the first implementation. By setting the filter coefficients of the FIR filter 11 based on the impulse response acquired in a state of the earphone microphone 18 being connected, effective echo removal that is according to the transfer characteristic of the earphone microphone 18 becomes possible in the differential amplifier 9. As a result, the error signals from the subtracter 77 become small, thereby reducing the number of times to repeat updating the filter coefficients of the filter coefficient unit 79. That is, the time until an echo is cancelled can be shortened. Furthermore, by setting the filter coefficients of the FIR filter 11 based on the impulse response acquired in a state where the connected earphone microphone 18 is attached to an ear by inserting into its auditory meatus or covering its ear auricle, effective echo removal that is according to the transfer characteristics of the earphone microphone 18 and of the user's auditory meatus becomes possible in the differential amplifier 9. That is, the time until an echo is cancelled can be further shortened.

The present implementation differs from the first implementation in that the ADF 76 and the subtracter 77 are provided, but the invention is not limited to this. The ADF 76 and the subtracter 77 may be provided in the second to fourth implementations likewise. To describe in detail, the ADF 76 and the subtracter 77 may be provided in the second implementation like in this implementation. In the third and fourth implementations, the subtracter 77 is provided in between the AD converter 70 and the DA converter 71. Then, the error signal transmitting on the line between the subtracter 77 and the DA converter 71 is input into the ADF 76 and the digital signal from the AD converter 66 is input as the reference signal into the ADF 76.

Due to errors in measuring impulse responses and the like, an echo may not be sufficiently prevented from being in the resulting signal of the signal transmitting through the path A being cancelled in the differential amplifier 9 (adder 63) by the signal transmitting through the path B. In this case, according to the fifth implementation, the output of the differential amplifier 9 (adder 63) can be cancelled by the output signal Y't from the adder 82 in the subtracter 77. Thus, the echo when digital signals (a voice signal) are input to the input terminal 30 (65) can be more reliably prevented.

<<Sixth Implementation>>
==Example Configuration of Echo Prevention Circuit and Digital Signal Processing Circuit==

Figure 21:
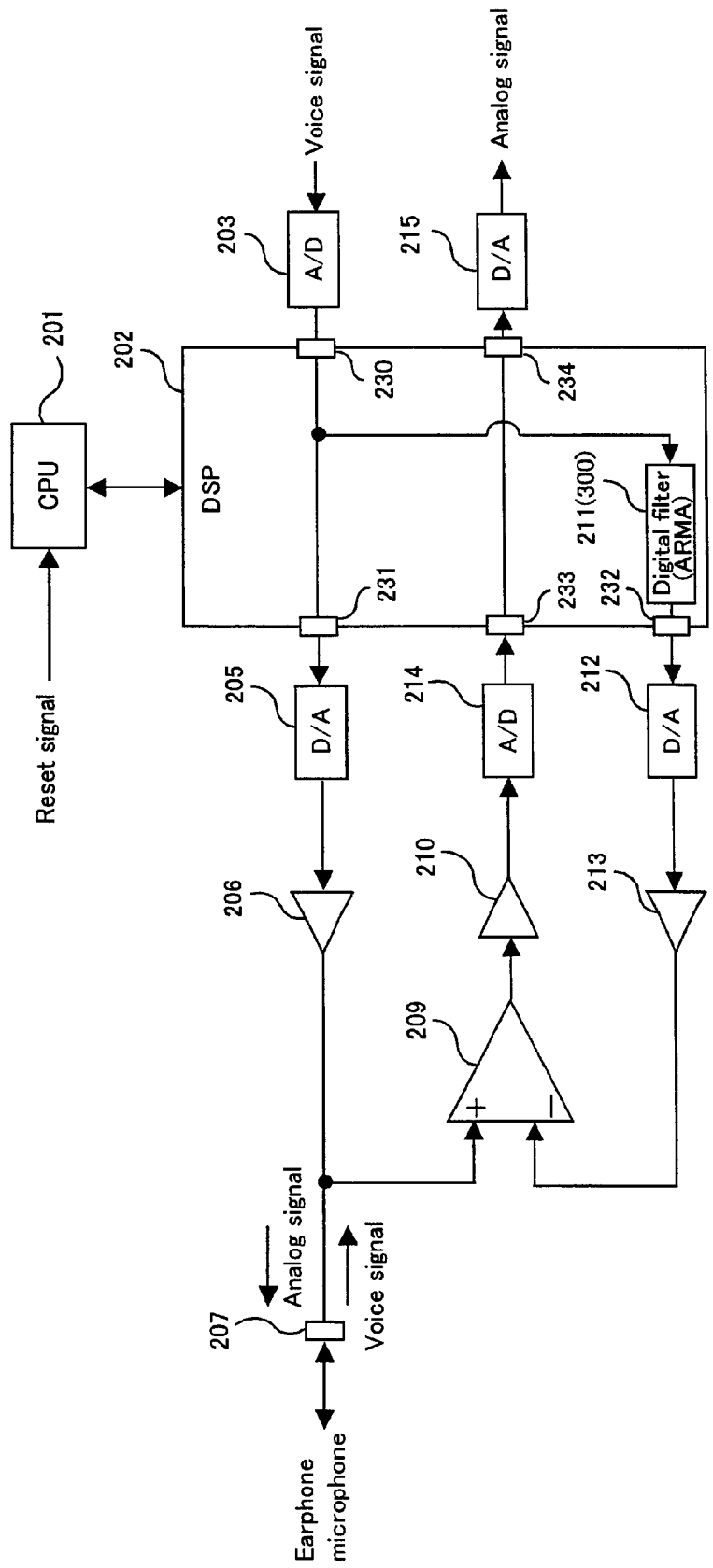
FIG. 21 is a block diagram illustrating a sixth implementation.

FIG. 21 is a diagram showing a sixth implementation. FIG. 21 is a block diagram illustrating an example of an echo prevention circuit and a digital signal processing circuit (DSP 202) included therein.

The echo prevention circuit comprises a CPU 201, a DSP 202, an AD converter 203, a DA converter 205, an amplifier 206, an input/output terminal 207, a differential amplifier 209, an amplifier 210, an AD converter 214, a DA converter 215, a DA converter 212, and an amplifier 213. Although also in this implementation the CPU 201 is included, it is possible that the CPU 201 is not included.

The DSP 202 has an input terminal 230, an output terminal 231, a digital filter (ARMA: Auto-Regressive Moving Average) 211 (300) (hereinafter called the digital filter 211), an output terminal 232, an input terminal 233 and an output terminal 234.

For example, a voice signal is input to the AD converter 203, which inputs digital signals into which the voice signal has been analog-to-digital converted to the DSP 202 through the input terminal 230.

The digital signals input to the DSP 202 are output through the output terminal 231 and also input to the digital filter 211. The digital filter 211 performs a filtering process on the digital signals based on the filter coefficients of the digital filter 211 and outputs to the output terminal 232.

The DA converter 205 has the digital signals from the DSP 202 through the output terminal 232 input thereto, and outputs an analog signal into which the digital signals have been digital-to-analog converted to the amplifier 206, which amplifies the analog signal with a predetermined amplification factor and outputs.

An apparatus (such as an earphone microphone or a speaker), which produces voice based on an analog signal, is connected to the input/output terminal 207, and through the input/output terminal 207, an analog signal from the amplifier 206 is output to the apparatus connected thereto. Also, an apparatus (such as an earphone microphone or a microphone), which converts, e.g., voice into a voice signal and outputs, is connected to the input/output terminal 207, and through the input/output terminal 207 the voice signal from the apparatus connected thereto is input. Through the input/output terminal 207, the voice signal is input to the + input terminal of the differential amplifier 209. Or, the signal output through the input/output terminal 207 is reflected by the apparatus connected and is input through the input/output terminal 207 to the + input terminal of the differential amplifier 209. Here, the reflected signal is, for example, a signal returned through the earphone microphone or the like, a voice signal into which, sound output from the earphone microphone being reflected in an ear, the reflected sound is converted by the earphone microphone, or the like. Note that outputting the output signal (e.g. an analog signal) or inputting the input signal (e.g. a voice signal) through the input/output terminal 207 is not mutually exclusively performed. For example, the output signal and the input signal may be output and input at the same time through the input/output terminal 207. An input/output signal common line is an inner line connected to the input/output terminal 207.

The output signals from the digital filter 211 are input to the DA converter 212 through the output terminal 232. The DA converter 212 outputs an analog signal into which the output signals from the digital filter 211 has been digital-to-analog converted to the amplifier 213, which amplifies the analog signal with a predetermined amplification factor and outputs to the − input terminal of the differential amplifier 209.

The differential amplifier 209 outputs the voice signal input through the input/output terminal 207 to the amplifier 210, which amplifies the voice signal with a predetermined amplification factor and outputs to the AD converter 214. The analog signal from the amplifier 206 is input to the + input terminal of the differential amplifier 209, which amplifies the difference between the analog signal input from the amplifier 206 to its + input terminal and the analog signal input from the amplifier 213 to its − input terminal and outputs.

The AD converter 214 inputs digital signals into which the voice signal from the amplifier 210 has been analog-to-digital converted to the DSP 202 through the input terminal 233. The digital signals input to the input terminal 233 are output through the output terminal 234. The DA converter 215 outputs an analog signal into which the digital signals have been digital-to-analog converted.

The CPU 201 controls the echo prevention circuit overall. For example, when a reset signal is input to reset the echo prevention circuit, the CPU 201 outputs an instruction signal to instruct the DSP 202 to execute an impulse response acquisition process, as described later, to the DSP 202. Furthermore, the CPU 201 outputs to the DSP 202, for example, the other logic value of 0 in the initial operation of the impulse response acquisition process. In this implementation, when the reset signal is input, the CPU 201 outputs the instruction signal to instruct the DSP 202 to execute the impulse response acquisition process, but the invention is not limited to this. For example, the CPU 201 may be configured to output the instruction signal to the DSP 202 when detecting power on for enabling the echo prevention circuit and the DSP 202 to operate. Alternatively, the CPU 201 may be configured to output the instruction signal to the DSP 202 when detecting an electrical change in an analog circuit (e.g., a change in the amplitude of the output of the amplifier 210).

==Filter Coefficients of Digital Filter 211==

Figure 22:
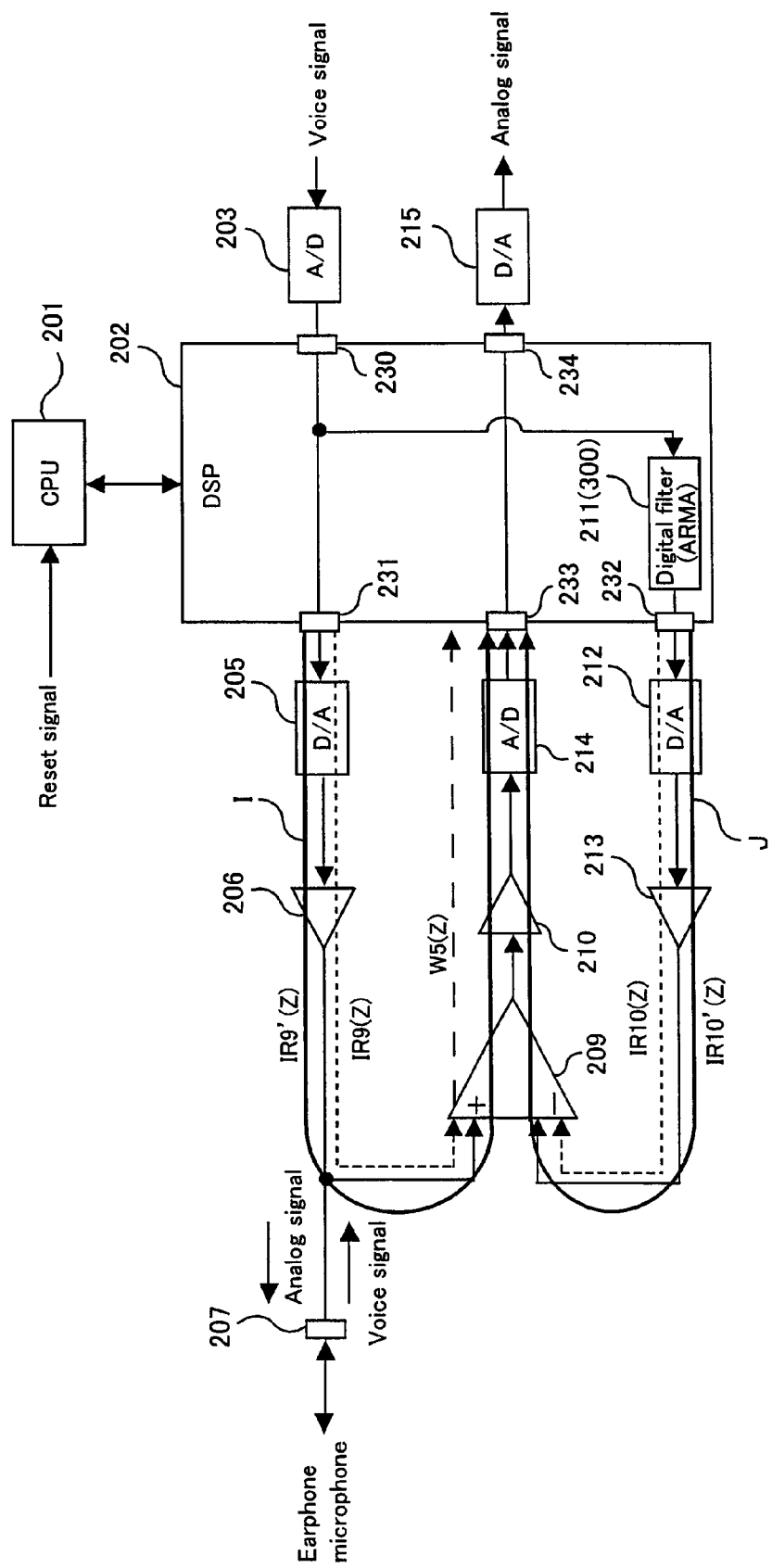
FIG. 22 is a diagram showing paths I, J in the sixth implementation of FIG. 21.
Figure 23:
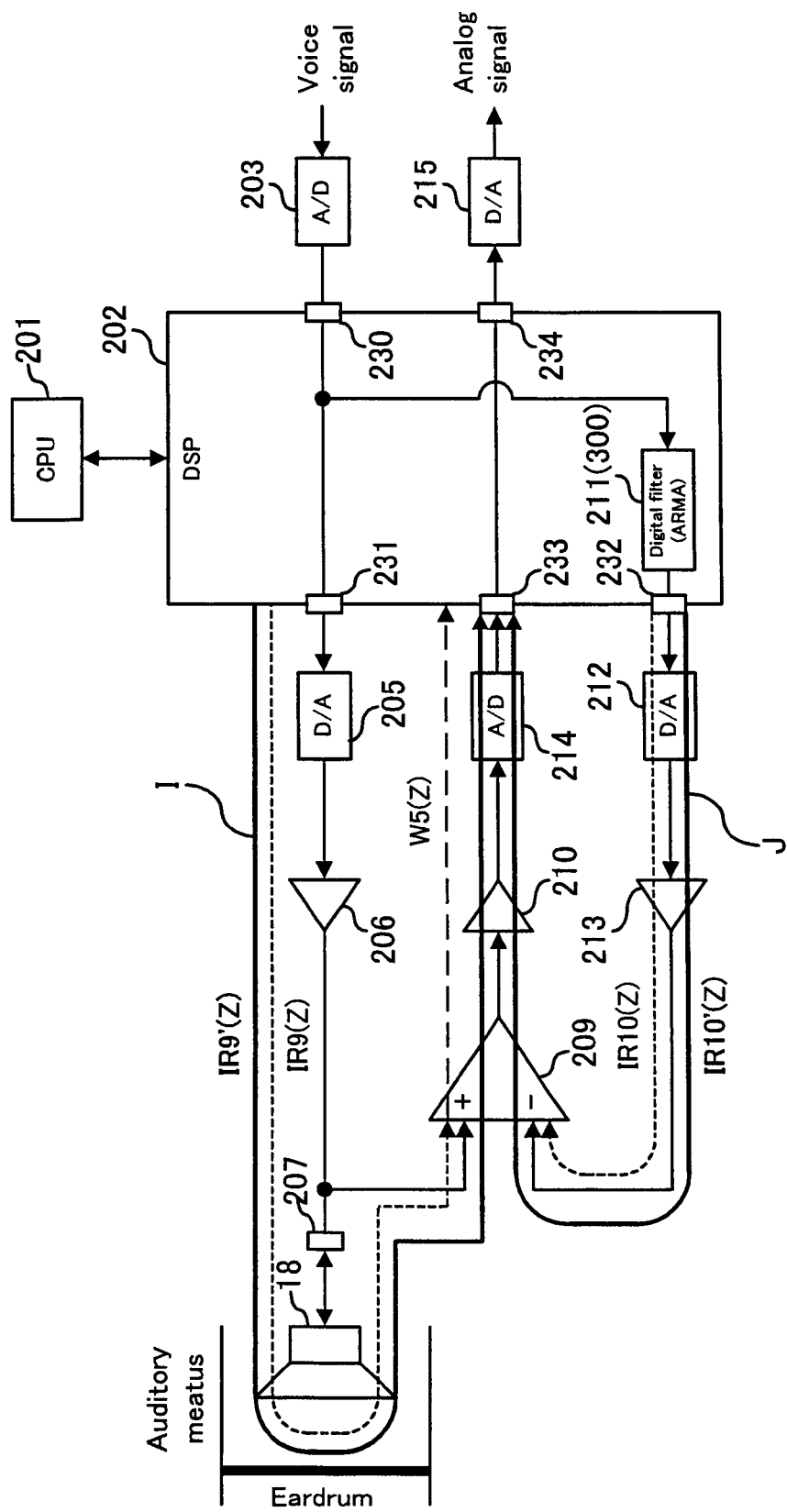
FIG. 23 is a diagram showing the case where the earphone microphone 18 is included in the path I of FIG. 22.

The filter coefficients of the digital filter 211 will be described in detail below with reference to FIGS. 22 to 23. FIG. 22 is a diagram showing paths I, J in the echo prevention circuit of FIG. 21. FIG. 23 is a diagram showing the case where an earphone microphone 18 is included in the path I. The earphone microphone 18 is connectable to the input/output terminal 207. When an analog signal output through the input/output terminal 207 is input thereto, the earphone microphone 18 vibrates a diaphragm (not shown) according to the analog signal thereby outputting voice. Furthermore, the earphone microphone 18 catches vibration of his eardrum with the diaphragm when a person wearing the earphone microphone 18 in his ear makes a voice, and generates and outputs an analog signal. The analog signal output from the earphone microphone 18 is input through the input/output terminal 207.

As mentioned above, the analog signal from the amplifier 206 is possibly input to the + input terminal of the differential amplifier 209 as well as being output through the input/output terminal 207. That is, a combined signal of the analog signal from the amplifier 206 and a signal input to the input/output terminal 207 is input to the + input terminal of the differential amplifier 209. Description will be made below assuming that the signal input to the input/output terminal 207 (a second input signal) includes, for example, an electrical noise signal and environmental noise as well as a voice signal. In this case, an echo of the analog signal occurs, or the analog signal from the amplifier 206 is superimposed on the voice signal input through the input/output terminal 207 and input to the + input terminal of the differential amplifier 209, thus generating an echo. Accordingly, the filter coefficients of the digital filter 211 are set so as to prevent this echo.

Let $IR9(Z)$ be impulse response (a transfer function) of from the output terminal 231 to the + input terminal of the differential amplifier 209 indicated by a dashed line in FIG. 22 or 23, $IR10(Z)$ be impulse response (a transfer function) of from the output terminal 232 to the − input terminal of the differential amplifier 209 indicated by a dashed line in FIG. 22 or 23, and $W5(Z)$ be impulse response (a transfer function) of from the stage following the +/− input terminal of the differential amplifier 209 to the input terminal 233 indicated by a long dashed line in FIG. 22 or 23.

Here, let $Q(Z)$ be the filter coefficients of the digital filter 211. Then, in order to cause signals input to the + and − input terminals of the differential amplifier 209 to cancel out, $Q(Z)$ is set such that the following equation is satisfied:

$$IR9(Z)=IR10(Z) \cdot Q(Z).$$

That is, $Q(Z)$ is set as follows:

$$Q(Z)=IR9(Z)/IR10(Z).$$

However, the impulse responses obtainable by the DSP 202 are the impulse response (transfer function) $IR9'(Z)$ ($=IR9(Z) \cdot W5(Z)$) of the path I and the impulse response (transfer function) $IR10'(Z)$ ($=-IR10(Z) \, W5(Z)$) of the path J, indicated by solid lines in FIG. 22 or 23. Here, the reason why $IR10(Z)$ is inverted in phase is that the path J goes through the − input terminal of the differential amplifier 209.

In this case, the equation that allows the signal transmitting through the path I and the signal transmitting through the path J to cancel out each other, is as follows:

$$-IR9'(Z)=IR10'(Z) \cdot Q(Z)$$

That is, $Q(Z)$ is set as follows:

$$Q(Z)=-IR9'(Z)/IR10'(Z).$$

That is, the characteristic of the digital filter 211 is achieved by taking the product of the inverse of the transfer characteristic $IR9'(Z)$ and the characteristic of the inverse filter of $IR10'(Z)$. By setting the filter coefficients of the digital filter 211 in this way, the signal transmitting through the path I can be canceled in the differential amplifier 209 by the signal transmitting through the path J. As a result, when digital signals are input to the input terminal 230, the previously mentioned echo can be prevented.

As shown in FIG. 23, by acquiring the impulse response IR9'(Z) in a state of the earphone microphone 18 being connected and setting the product of the phase-inverse of this IR9'(Z) and the characteristic of the inverse filter of IR10'(Z) as the filter coefficients in the digital filter 211, effective echo prevention that is according to the transfer characteristic of the earphone microphone 18 becomes possible.

Furthermore, by acquiring the impulse response IR9'(Z) in a state where the connected earphone microphone 18 is attached to an ear by inserting into its auditory meatus or covering its ear auricle and setting the product of the phase-inverse of this IR9'(Z) and the characteristic of the inverse filter of IR10'(Z) as the filter coefficients in the digital filter 211, effective echo prevention that is according to the transfer characteristics of the earphone microphone 18 and of the user's auditory meatus becomes possible.

In order to set the filter coefficients in the digital filter 211, the DSP 202 and the digital filter 211 take the following configuration.

==Detailed Configuration of DSP 202 and Digital Filter 211==

Figure 24:
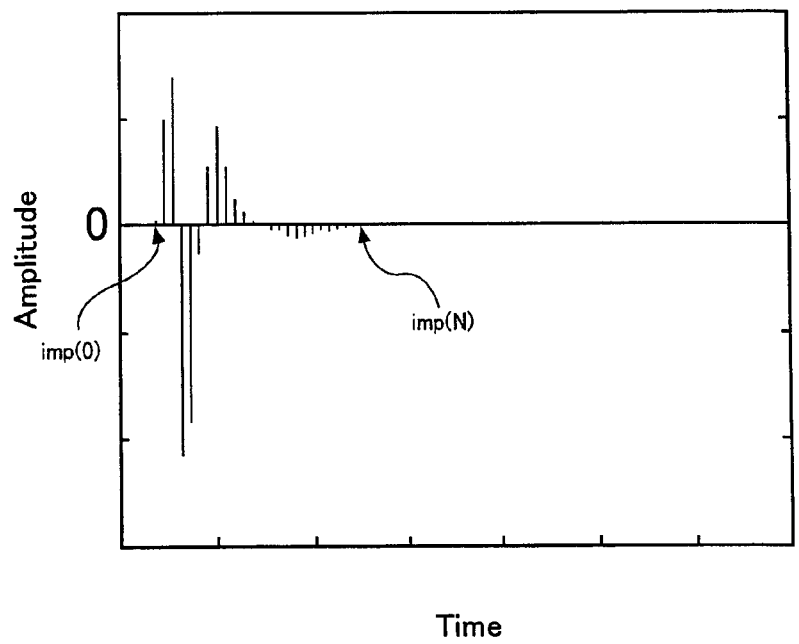
FIG. 24 shows impulse response of the paths I and J of FIG. 22 or 23.
Figure 24:
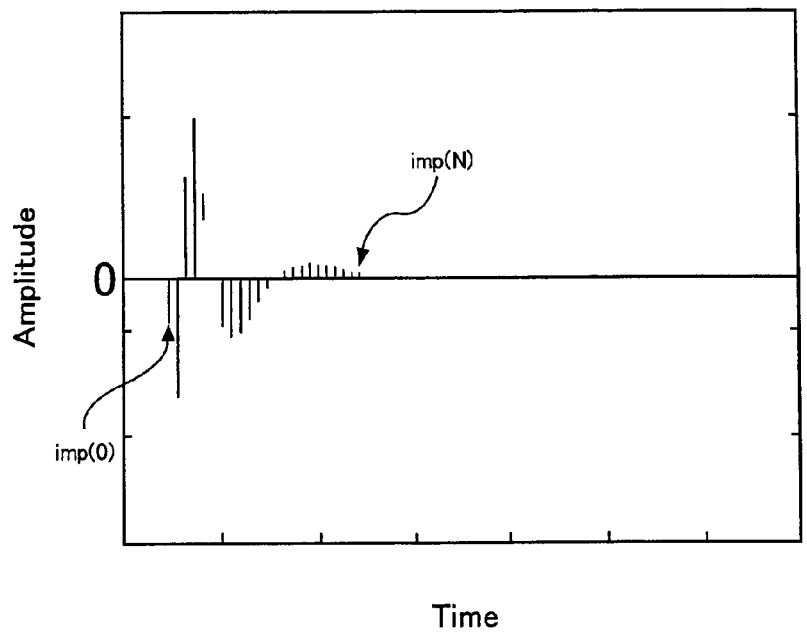
Figure 25:
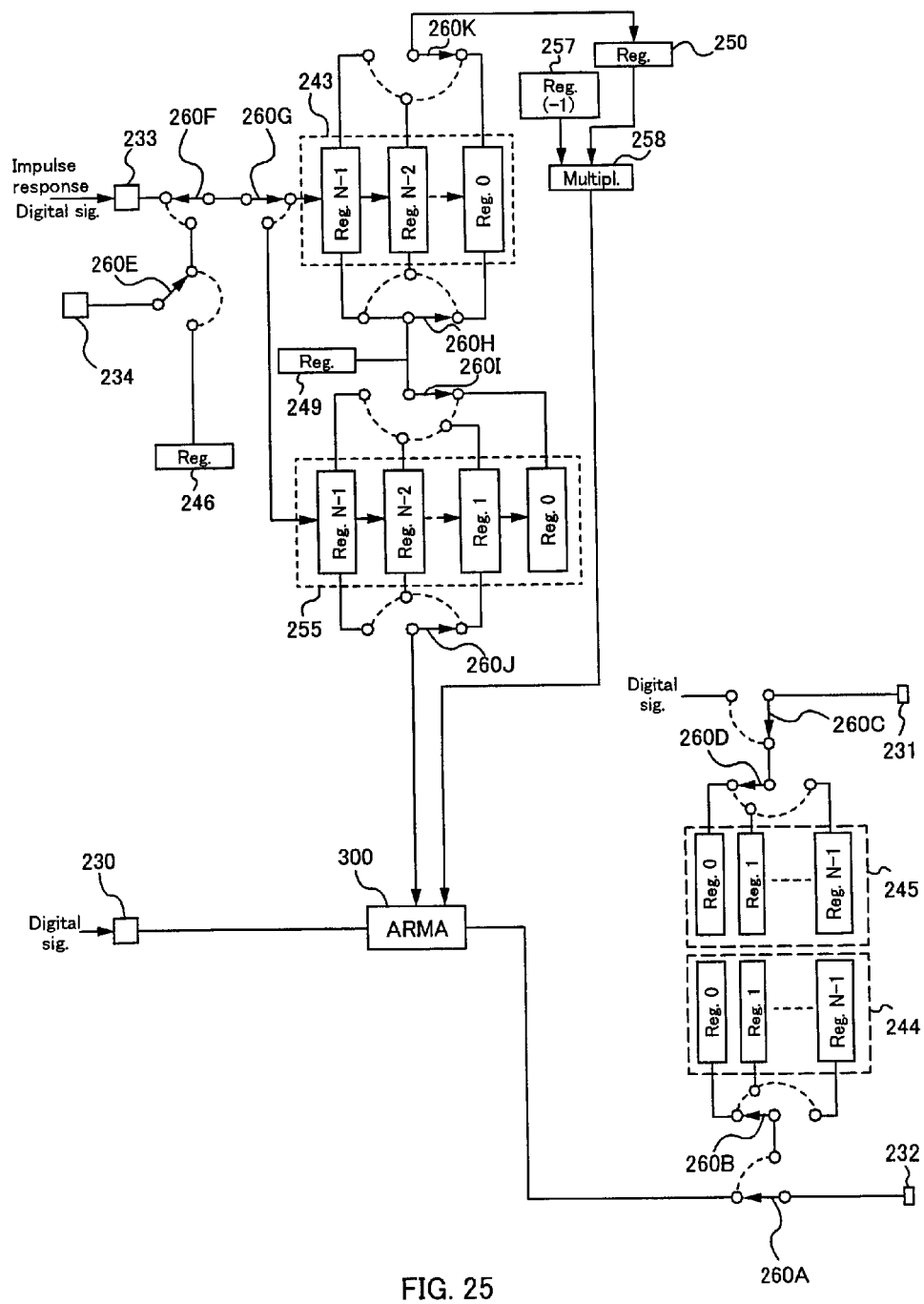
FIG. 25 is a diagram showing part of the configuration of a DSP 202.
Figure 26:
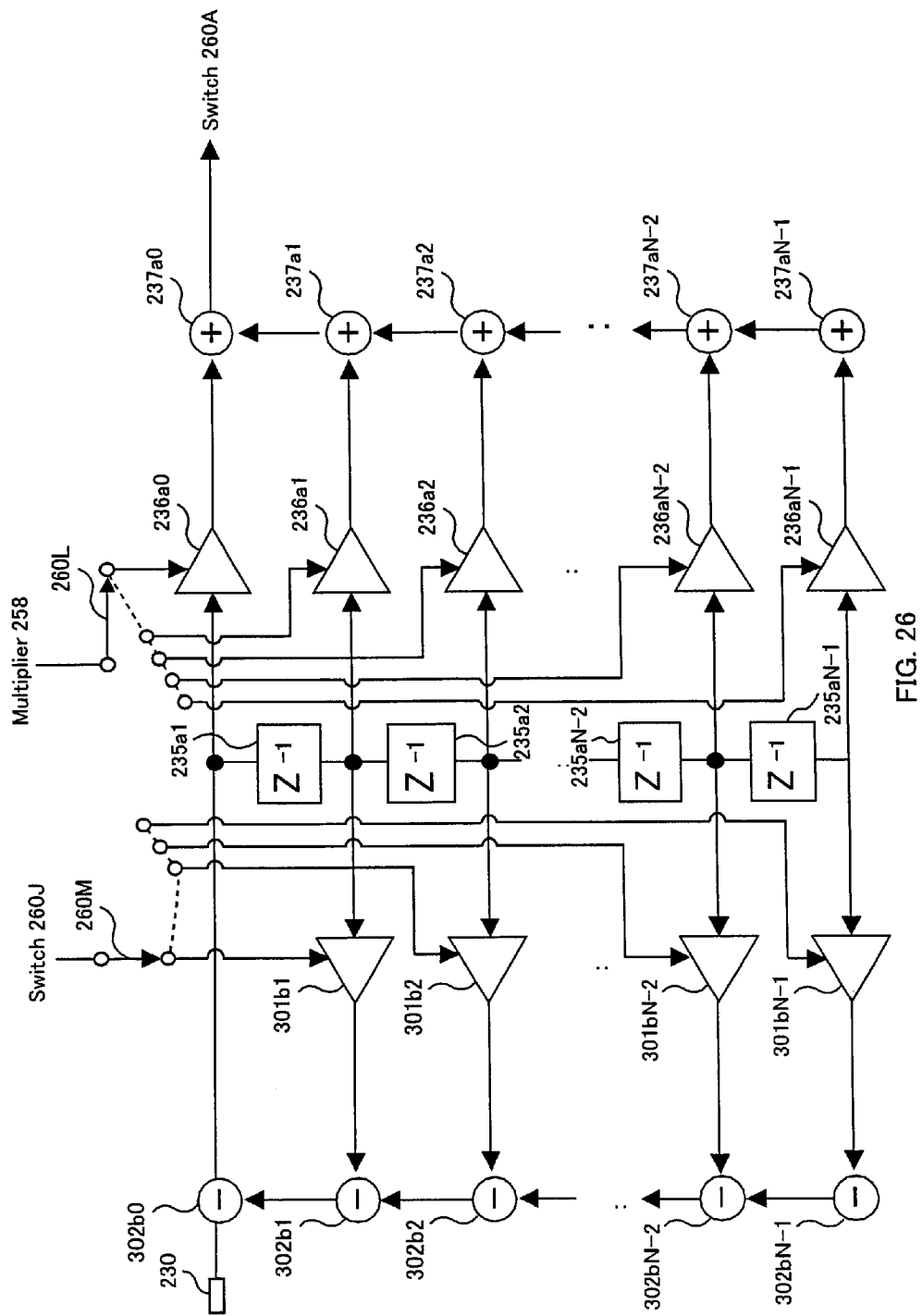
FIG. 26 is a diagram showing the configuration of an ARMA filter 300 as an example of a digital filter 211.

The configuration of the DSP 202 and the digital filter 211 that is a constituent of the DSP 202 will be described in detail below with reference to FIGS. 21 to 26. FIG. 24(a) shows impulse response IR9'(Z) of the path I of FIG. 22 or 23, and FIG. 24(b) shows impulse response IR10'(Z) of the path J of FIG. 22 or 23. FIG. 25 is a block diagram showing part of the configuration of the DSP 202 and, to describe in detail, a block diagram showing part of the configuration of the DSP 202 for setting the filter coefficients of the digital filter 211 based on the impulse responses IR9'(Z) and IR10'(Z). FIG. 26 is a block diagram showing the configuration of an ARMA filter 300, an example of the digital filter 211, and, to describe in detail, the ARMA filter 300 is an example filter whose characteristic is the product of the phase-inverse of this IR9'(Z) and the characteristic of the inverse filter of IR10'(Z). In this implementation, the ARMA filter is used, but the invention is not limited to this. Any digital filter in which the above filter coefficients can be set may be used.

The DSP 202 has impulse response storage memories 243, 255, for-impulse memories 244, 245, registers 246, 249, 250, 257, switches 260A to 260K, and a multiplier 258.

The ARMA filter 300, as shown in FIG. 26, has delay circuits 235a1 to 235aN−1, multipliers 236a0 to 236aN−1, 301b1 to 301bN−1, adders 237a0 to 237aN−1, subtracters 302b0 to 302bN−1, and switches 260L, 260M.

The other logic value of 0 from CPU1 is input into the register 249.

The for-impulse memories 244, 245 each consist of N registers 0 to N−1. When acquiring the impulse response IR9'(Z) of the path I indicated by a solid line in FIG. 22 or 23 in the impulse response acquisition process as described later, e.g., one logic value of 1 is stored into the register 0 of the for-impulse memory 245, and the other logic value of 0 is stored into the other registers 1 to N−1 of the for-impulse memory 245. Also, the other logic value of 0 is stored into the register 246 and the registers 0 to N−1 of the for-impulse memory 244.

When acquiring the impulse response IR10'(Z) of the path J indicated by a solid line in FIG. 22 or 23 in the impulse response acquisition process as described later, e.g., one logic value of 1 is stored into the register 0 of the for-impulse memory 244, and the other logic value of 0 is stored into the other registers 1 to N−1 of the for-impulse memory 244. Also, the other logic value of 0 is stored into the register 246 and the registers 0 to N−1 of the for-impulse memory 245.

The impulse response storage memory 243 consists of N registers 0 to N−1. Impulse responses imp(0) to imp(N−1) (=IR9'(Z)) on a per sampling cycle basis for the path I are stored into the registers 0 to N−1 of the impulse response storage memory 243 through the input terminal 233 by the DSP 202 switching the switch 260F to the input terminal 233 side and the switch 260G to the impulse response storage memory 243 side. First, for example, the impulse response imp(0) is stored into the register N−1 through the input terminal 233. Then, the impulse response imp(1) is stored into the register N−1 and the impulse response imp(0) stored in the register 0 is stored into the register N−2. By repeating this process, the impulse responses imp(0) to imp(N−1) (=IR9'(Z)) are stored in the registers 0 to N−1 of the impulse response storage memory 243. The sampling cycle refers to each of the time intervals between the impulse responses imp(0) to imp(N−1) as shown in (a) of FIG. 24. Also, the impulse response storage memory 243 is cleared by the DSP 202 switching the switch 260H to the registers 0 to N−1 sequentially thereby writing the other logic value of 0 stored in the register 249.

The impulse response storage memory 255 consists of N registers 0 to N−1. Impulse responses imp(0) to imp(N−1) (=IR10'(Z)) on a per sampling cycle basis for the path J are stored into the registers 0 to N−1 of the impulse response storage memory 255 through the input terminal 233 by the DSP 202 switching the switch 260F to the input terminal 233 side and the switch 260G to the impulse response storage memory 255 side. The impulse responses imp(0) to imp(N−1) are stored into the registers 0 to N−1 of the impulse response storage memory 255 like with the impulse response storage memory 243. Also, the impulse response storage memory 255 is cleared by the DSP 202 switching the switch 260I to the registers 0 to N−1 sequentially thereby writing the other logic value of 0 stored in the register 249.

The register 250 temporarily stores the impulse responses imp(0) to imp(N−1) from the impulse response storage memory 243. Also, the register 254 temporarily stores the impulse responses imp(0) to imp(N−1) from the impulse response storage memory 255.

A binary data indicating −1 is stored in advance in the register 257 for the multiplier 258 to invert in phase the impulse responses imp(0) to imp(N−1) stored in the impulse response storage memory 243.

The multiplier 258 outputs the result of multiplying the value of the register 250 and the value of the register 257 to the ARMA filter 300, and, to describe in detail, the impulse responses imp(0) to imp(N−1) from the registers 0 to N−1 of the impulse response storage memory 243 are input sequentially into the register 250 by the DSP 202 switching the switch 260K to the registers 0, . . . sequentially. Then, the multiplier 258 multiplies the values of the register 250 and the value of the register 257 sequentially and outputs the multiplying results representing the impulse responses −imp(0) to −imp(N−1), which are the phase-inverse of the impulse responses imp(0) to imp(N−1), to the ARMA filter 300.

The delay circuits 235a1 to 235aN−1 delay the digital signal Xn input through the input terminal 230 by units of one sampling cycle and output. For example, the delay circuit 235a1 outputs a digital signal Xn−1 obtained by delaying the digital signal Xn by one sampling cycle to the multipliers 236a1, 301b1 and the delay circuit 235a2, and the delay circuit 235aN−1 outputs a digital signal Xn−(N−1) to the multipliers 236aN−1, 301aN−1.

The multipliers 301b1 to 301bN−1 and the subtracters 302b0 to 302bN−1 form the above inverse filter of IR10'(Z).

The impulse responses imp(1) to imp(N−1) stored in the registers 1 to N−1 of the impulse response storage memory 255 are respectively set as multiplication coefficients in the multipliers 301b1 to 301bN−1. To describe in detail, the impulse responses imp(1) to imp(N−1) are input sequentially and set as the multiplication coefficients in the multipliers 301b1 to 301bN−1 by the DSP 202 switching the switch 260J to the registers 1, . . . sequentially and switching the switch 260M to the multipliers 301b1, . . . sequentially. Then, the multipliers 301b1 to 301bN−1 multiply the digital signals Xn−1 to Xn−(N−1) from the delay circuits 235a1 to 235aN−1 by the multiplication coefficients set and outputs the multiplying results to the subtracters 302b1 to 302bN−1.

The subtracters 302b1 to 302bN−1 output results of subtracting digital signals input from the multipliers 301b1 to 301bN−1, in the direction indicated by arrows in FIG. 26. The subtracter 302b0 subtracts the subtracting result of the subtracter 302b1 and a digital signal input through the input terminal 230. Thus, the subtracting result of the subtracter 302b0 is a result of subtracting the multiplying results of the multipliers 301b1 to 301bN−1 from the digital signal input through the input terminal 230.

The phase-inverted impulse responses −imp(0) to −imp(N−1) from the multiplier 258 are respectively set as multiplication coefficients in the multipliers 236a0 to 236aN−1. To describe in detail, the phase-inverted impulse responses −imp(1) to −imp(N−1) are input sequentially and set as the multiplication coefficients in the multipliers 236a0 to 236aN−1 by the DSP 202 switching the switch 260L to the multipliers 236a0, . . . sequentially. Then, the multipliers 236a1 to 236aN−1 multiply the digital signals Xn−1 to Xn−(N−1) from the delay circuits 235a1 to 235aN−1 by the multiplication coefficients set and outputs the multiplying results to the adders 237a1 to 237aN−1. The subtracting result of the subtracter 302b0 is input into the multiplier 236a0, which outputs a result of multiplying the subtracting result by the multiplication coefficient −imp(0) to the adder 237a0.

The adders 237a1 to 237aN−1 output results of adding digital signals input from the multipliers 236a1 to 236aN−1, in the direction indicated by arrows in FIG. 26. The adder 237a0 adds the adding result of the adder 237a1 and the multiplying result of the multiplier 236a0. Thus, the adding result of the adder 237a0 is a result of performing the filter process on the digital signals input through the input terminal 230 by the ARMA filter 300 having the above filter coefficients set.

==Setting Filter Coefficients of ARMA Filter 300 with Impulse Response Acquiring Process==

Figure 27:
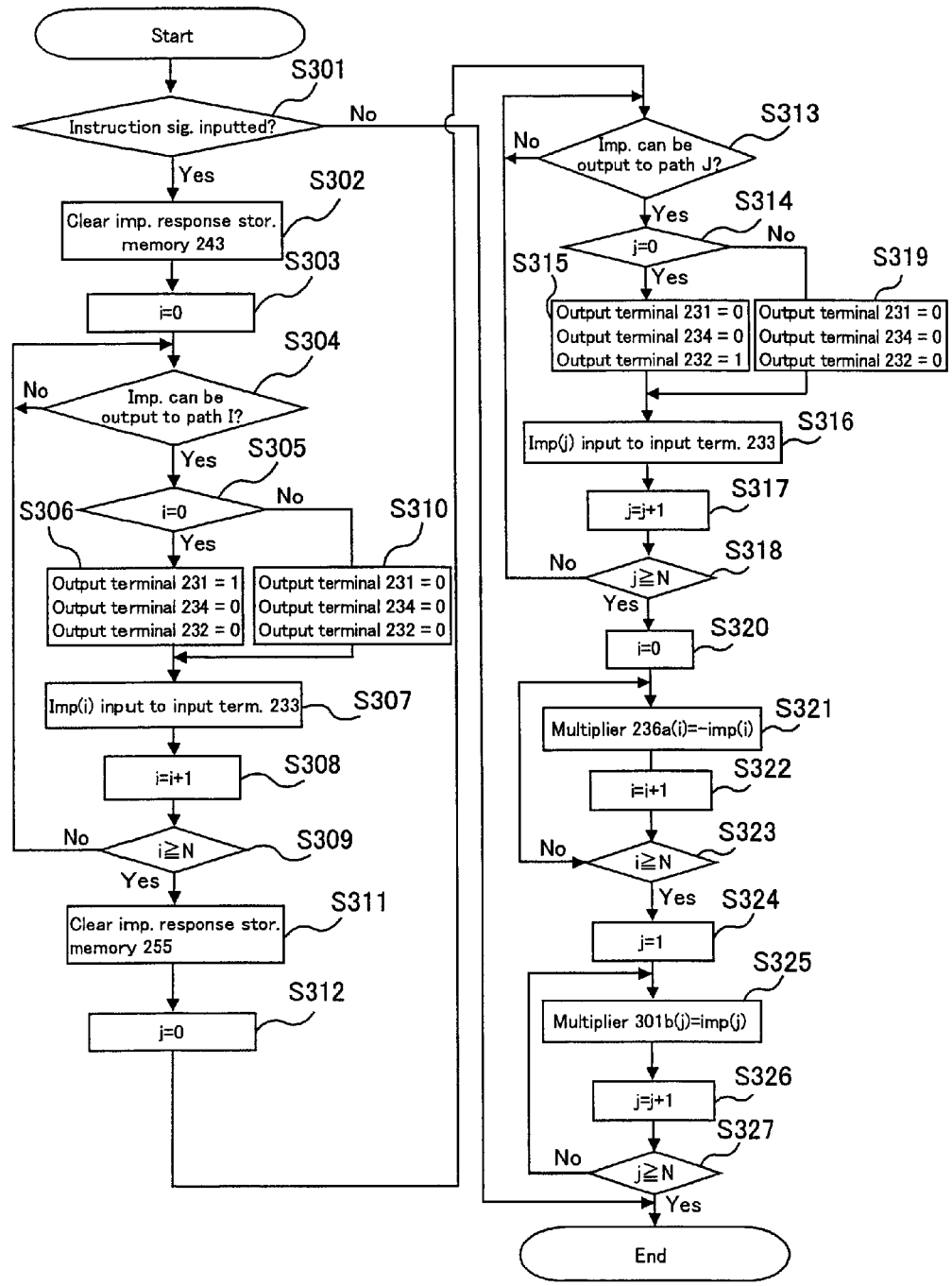
FIG. 27 is a flow chart illustrating the operation of the sixth implementation.

The operation of the impulse response acquisition process and of setting the filter coefficients of the ARMA filter 300 by the echo prevention circuit and the digital signal processing circuit included therein will be described with reference to FIGS. 21 to 27. In this implementation, an example of setting the filter coefficients of the digital filter 211 will be described by way of setting the multiplication coefficients of the multipliers 236a0 to 236aN−1, 301b1 to 301bN−1 of the ARMA filter 300. FIG. 27 is a flow chart illustrating an example of the operation of the echo prevention circuit and the digital signal processing circuit included therein.

When the reset signal is input to reset the echo prevention circuit, the CPU 201 outputs to the DSP 202 an instruction signal to instruct the DSP 202 to execute the impulse response acquisition process. The CPU 201 outputs the other logic value of 0 to the DSP 202 in the beginning of the impulse response acquisition process. The other logic value of 0 input into the DSP 202 is input into the register 249.

The DSP 202 determines whether the instruction signal from the CPU 201 has been input (S301). When determining that the instruction signal from the CPU 201 has been input (YES at S301), the DSP 202 switches the switch 260H sequentially to the registers 0 to N−1, thereby clearing the registers 0 to N−1 of the impulse response storage memory 243 with use of the other logic value of 0 stored in the register 249 (S302). Hereinafter, let imp(i) (i=0, . . . , N−1) be an i-th impulse response to be stored in the impulse response storage memory 243. The DSP 202 sets i to 0 to acquire impulse response imp(0) to be stored in the register N−1 of the impulse response storage memory 243 (S303) and puts the input terminal 230 in high impedance, and thereafter performs the following processes.

The DSP 202 determines whether an impulse can be output through the output terminal 231 to the path I, to acquire impulse response imp(0) of the path I indicated in FIG. 22 or 23 (S304). For example, the DSP 202 determines it by determining whether being in a state where a signal is being output through the output terminal 231 or input to the input terminal 233. If an impulse were output in the state where a signal is being output through the output terminal 231 or input to the input terminal 233, an accurate impulse response imp(0) might not be acquired.

When determining that an impulse can be output to the path I (YES at S304), the DSP 202 determines whether i=0 (S305). Since in S303 i was set to 0, the DSP 202 determines that i=0 (YES at S305). Then, the DSP 202 stores one logic value of 1 into the register 0 of the for-impulse memory 245. Also, the DSP 202 stores the other logic value of 0 into the other registers 1 to N−1 of the for-impulse memory 245, the register 246, and the registers 0 to N−1 of the for-impulse memory 244. Then, the DSP 202 switches the switch 260C to the for-impulse memory 245 side, the switch 260A to the for-impulse memory 244 side, and the switch 260E to the register 246 side. Also, the DSP 202 switches the switch 260F to the input terminal 233 side and the switch 260G to the impulse response storage memory 243 side. Then, the DSP 202 switches the switches 260D, 260B to the registers 0 respectively. As a result, an impulse having one logic value of 1 from the register 0 of the for-impulse memory 245 is output through the output terminal 231 (S306). The impulse output through the output terminal 231 transmits through the path I to the input terminal 233 (S307). As a result, impulse response imp(0) is acquired (imp(0) of FIG. 24(a)). This impulse response imp(0) is first stored into the register N−1 of the impulse response storage memory 243.

Next, to acquire impulse response imp(1), the DSP 202 increments i by one, that is, i=i+1=1 (S308). The DSP 202 determines that i not ≧N (NO at S309) because the impulse response acquired has not yet reached imp(N−1), and repeats the above process of S304 again. In S308, since i=1≠0 (NO at S305), the DSP 202 switches the switches 260D, 260B to the registers 1 respectively. As a result, an impulse is not output through the output terminal 231 (S310), and impulse imp(1) that is delayed by one sampling cycle from the impulse output at S306 is input to the input terminal 233. Then, this impulse response imp(1) is stored into the register N−1 of the impulse response storage memory 243 and the impulse response imp(0) stored in the register N−1 is stored into the register N−2. In this way, the processes of from S304 to S309 are repeated until i≧N (YES at S309), thereby acquiring the impulse responses imp(0) to imp(N−1) (=IR9'(Z)). The impulse responses imp(0) to imp(N−1) are stored in the registers 0 to N−1 of the impulse response storage memory 243.

Next, the DSP 202 switches the switch 260I to the registers 0 to N−1 sequentially. Thus, the registers 0 to N−1 of the impulse response storage memory 255 are cleared with use of the other logic value of 0 stored in the register 249 (S311). Hereinafter, let imp(j) (j=0, ... , N−1) be a j-th impulse response to be stored in the impulse response storage memory 255. The DSP 202 sets j to 0 to acquire impulse response imp(0) to be stored in the register N−1 of the impulse response storage memory 255 (S312) and performs the following processes.

The DSP 202 determines whether an impulse can be output to the path J, to acquire impulse response imp(0) of the path J indicated in FIG. 22 or 23 (S313). This determination by the DSP 202 is the same as in S304.

When determining that an impulse can be output to the path J (YES at S313), the DSP 202 determines whether j=0 (S314). Since in S312 j was set to 0, the DSP 202 determines that j=0 (YES at S314). Then, the DSP 202 stores one logic value of 1 into the register 0 of the for-impulse memory 244. Also, the DSP 202 stores the other logic value of 0 into the other registers 1 to N−1 of the for-impulse memory 244, the register 246, and the registers 0 to N−1 of the for-impulse memory 245. Then, the DSP 202 switches the switch 260G to the impulse response storage memory 255 side and the switches 260D, 260B to the registers 0 respectively. As a result, an impulse having one logic value of 1 from the register 0 of the for-impulse memory 244 is output through the output terminal 232 (S315). The impulse output through the output terminal 232 transmits through the path J to the input terminal 233 (S316). As a result, impulse response imp(0) is acquired (imp(0) of FIG. 24(b)). This impulse response imp(0) is first stored into the register N−1 of the impulse response storage memory 255.

Next, to acquire impulse response imp(1), the DSP 202 increments j by one, that is, j=j+1=1 (S317). The DSP 202 determines that j not ≧N (NO at S318) because the impulse response acquired has not yet reached imp(N−1), and repeats the above process of S313 again. In S317, since j=1≠0 (NO at S314), the DSP 202 switches the switches 260D, 260B to the registers 1 respectively. As a result, an impulse is not output through the output terminal 232 (S319), and impulse imp(1) that is delayed by one sampling cycle from the impulse output at S315 is input to the input terminal 233. Then, this impulse response imp(1) is stored into the register N−1 of the impulse response storage memory 255 and the impulse response imp (0) stored in the register N−1 is stored into the register N−2. In this way, the processes of from S313 to S318 are repeated until j≧N (YES at S318), thereby acquiring the impulse responses imp(0) to imp(N−1) (=IR10'(Z)). The impulse responses imp(0) to imp(N−1) are stored in the registers 0 to N−1 of the impulse response storage memory 255.

In order to invert in phase the impulse responses imp(0) to imp(N−1) stored in the registers 0 to N−1 of the impulse response storage memory 243, the DSP 202 switches the switch 260K to the registers 0, ... sequentially. As a result, the impulse responses imp(0) to imp(N−1) from the registers 0 to N−1 of the impulse response storage memory 243 are sequentially input into the multiplier 258 via the register 250. The multiplier 258 outputs results of multiplying the values of the register 250 and the value of the register 257 sequentially to the ARMA filter 300. Thus, the impulse responses −imp(0) to −imp(N−1) that are the phase-inverse of the impulse responses imp(0) to imp(N−1) are output sequentially from the multiplier 258 to the ARMA filter 300.

Then, to set the impulse responses −imp(0) to −imp(N−1) from the multiplier 258 as the multiplication coefficients of the multipliers 236a0 to 236aN−1, the DSP 202 performs the following processes. First, the DSP 202 sets i to 0 to set impulse response −imp(0) from the multiplier 258 as the multiplication coefficient of the multiplier 236a0 (S320), and switches the switch 260L to the multiplier 236a0 side. Thus, impulse response −imp(0) is set as the multiplication coefficient of the multiplier 236a0 (S321). Next, the DSP 202 increments i by one (i=i+1=1) to set impulse response −imp (1) from the multiplier 258 as the multiplication coefficient of the multiplier 236a1 (S322). The DSP 202 determines that i not ≧N (NO at S323) because the multiplication coefficients of up to the multiplier 236aN−1 have not yet been set, and switches the switch 260L to the multiplier 236a1 side. Thereby, the impulse response −imp(1) is set as the multiplication coefficient of the multiplier 236a1 (S321). The processes of from S321 to S323 are repeated in this way until i≧N (YES at S323), and thus the impulse responses −imp(0) to −imp(N−1) from the multiplier 258 are set as the multiplication coefficients of the multiplier 236a0 to 236aN−1.

Furthermore, to have the impulse responses imp(1) to imp (N−1) stored in the registers 1 to N−1 of the impulse response storage memory 255 output to the ARMA filter 300, the DSP 202 switches the switch 260J to the registers 1, ... sequentially. The impulse responses imp(1) to imp(N−1) from the registers 1 to N−1 of the impulse response storage memory 255 are sequentially output to the ARMA filter 300.

Then, to set the impulse responses imp(1) to imp(N−1) from the impulse response storage memory 255 as the multiplication coefficients of the multipliers 301b1 to 301bN−1, the DSP 202 performs the following processes. First, the DSP 202 sets j to 1 to set impulse response imp(1) from the impulse response storage memory 255 as the multiplication coefficient of the multiplier 301b1 (S324), and switches the switch 260M to the multiplier 301b1 side. Thus, impulse response imp(1) is set as the multiplication coefficient of the multiplier 301b1 (S325). Next, the DSP 202 increments j by one (j=j+1=1) to set impulse response imp(2) from the impulse response storage memory 255 as the multiplication coefficient of the multiplier 301b2 (S326). The DSP 202 determines that j not ≧N (NO at S327) because the multiplication coefficients of up to the multiplier 301bN−1 have not yet been set, and switches the switch 260M to the multiplier 301b2 side. Thereby, the impulse response imp(2) is set as the multiplication coefficient of the multiplier 301b2 (S325). The processes of from S325 to S327 are repeated in this way until j≧N (YES at S327), and thus the impulse responses imp(1) to imp(N−1) from the impulse response storage memory 255 are set as the multiplication coefficients of the multiplier 301b1 to 301bN−1.

According to the above implementation, the above processes have been described which use hardware (e.g., the switch 260), but the invention is not limited to this. For example, a program for the above processes may be stored beforehand in a ROM or the like so that a processor of the DSP 202 reads out the program and executes.

<<Seventh Implementation>>

==Example Configuration of Echo Prevention Circuit and Digital Signal Processing Circuit==

A seventh implementation will be described with reference to FIGS. 22, 28 to 32 and is another implementation of setting the filter coefficients of the digital filter 211 based on the impulse responses IR9'(Z) and IR10'(Z) acquired in the sixth implementation. In the present implementation, setting the filter coefficients for an FIR filter 303, an example of the digital filter 211, will be described. In the implementation, the same reference numerals denote the same parts as in the sixth implementation with description thereof being omitted.

Figure 28:
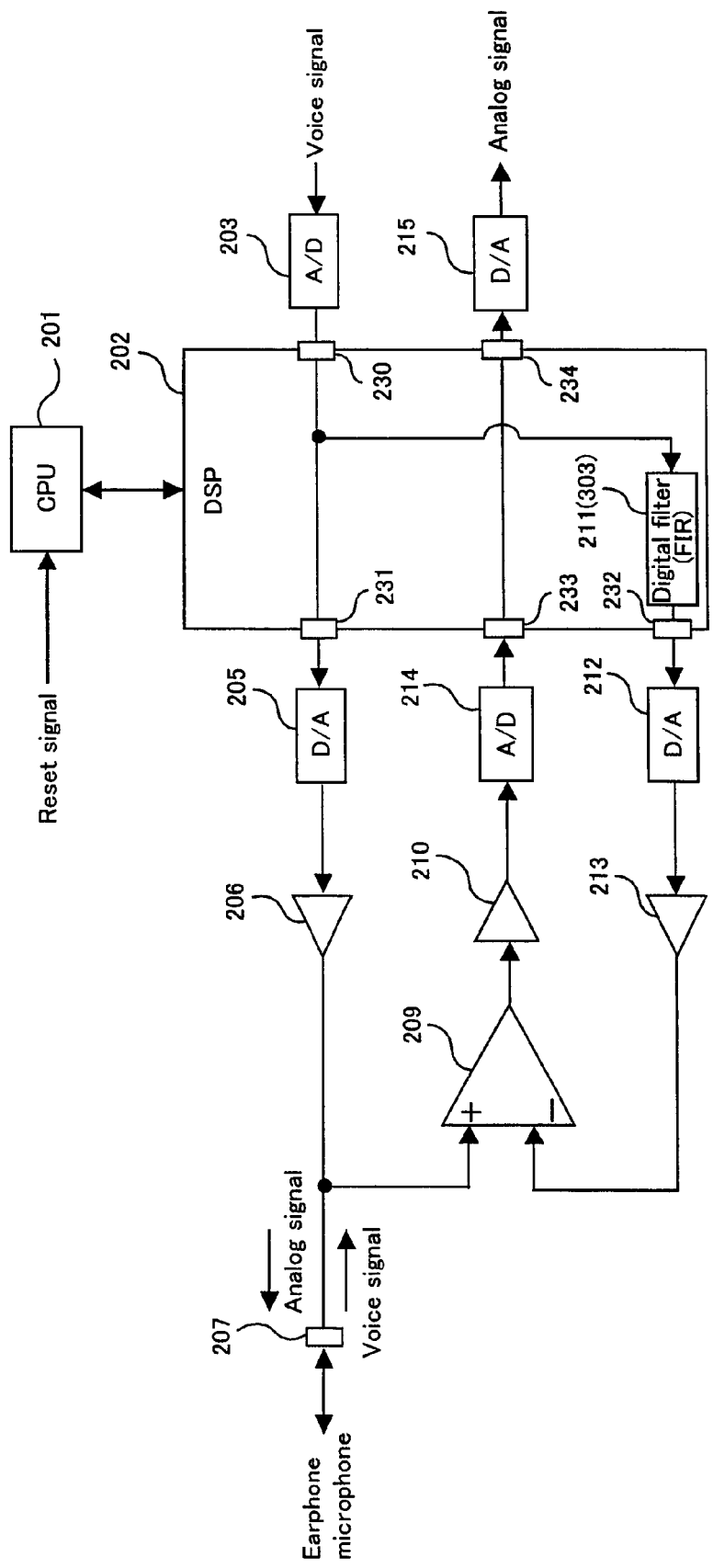
FIG. 28 is a block diagram illustrating an example of the echo prevention circuit and the digital signal processing circuit included therein using an FIR filter 303.
Figure 29:
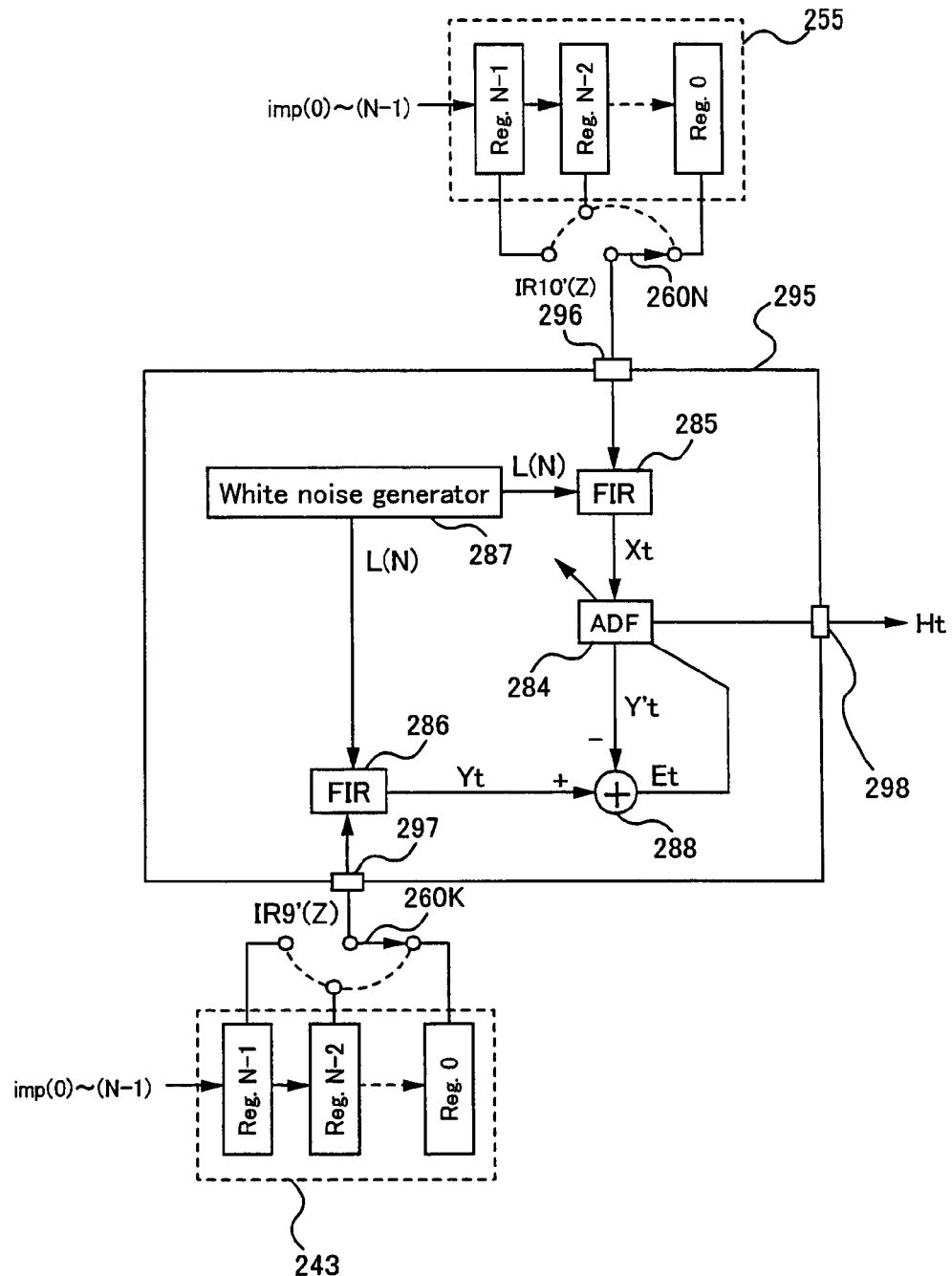
FIG. 29 is a block diagram illustrating a seventh implementation.
Figure 30:
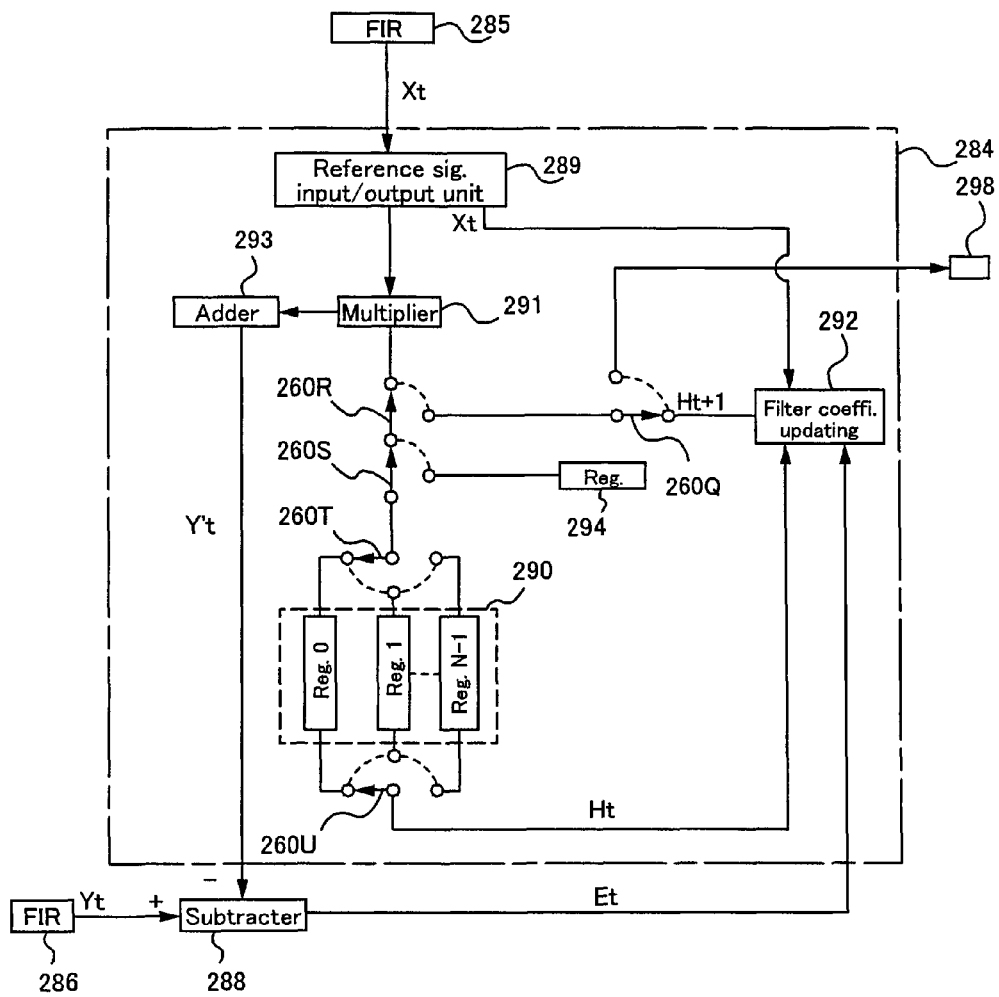
FIG. 30 is a detailed diagram of an ADF 284 of FIG. 24.
Figure 31:
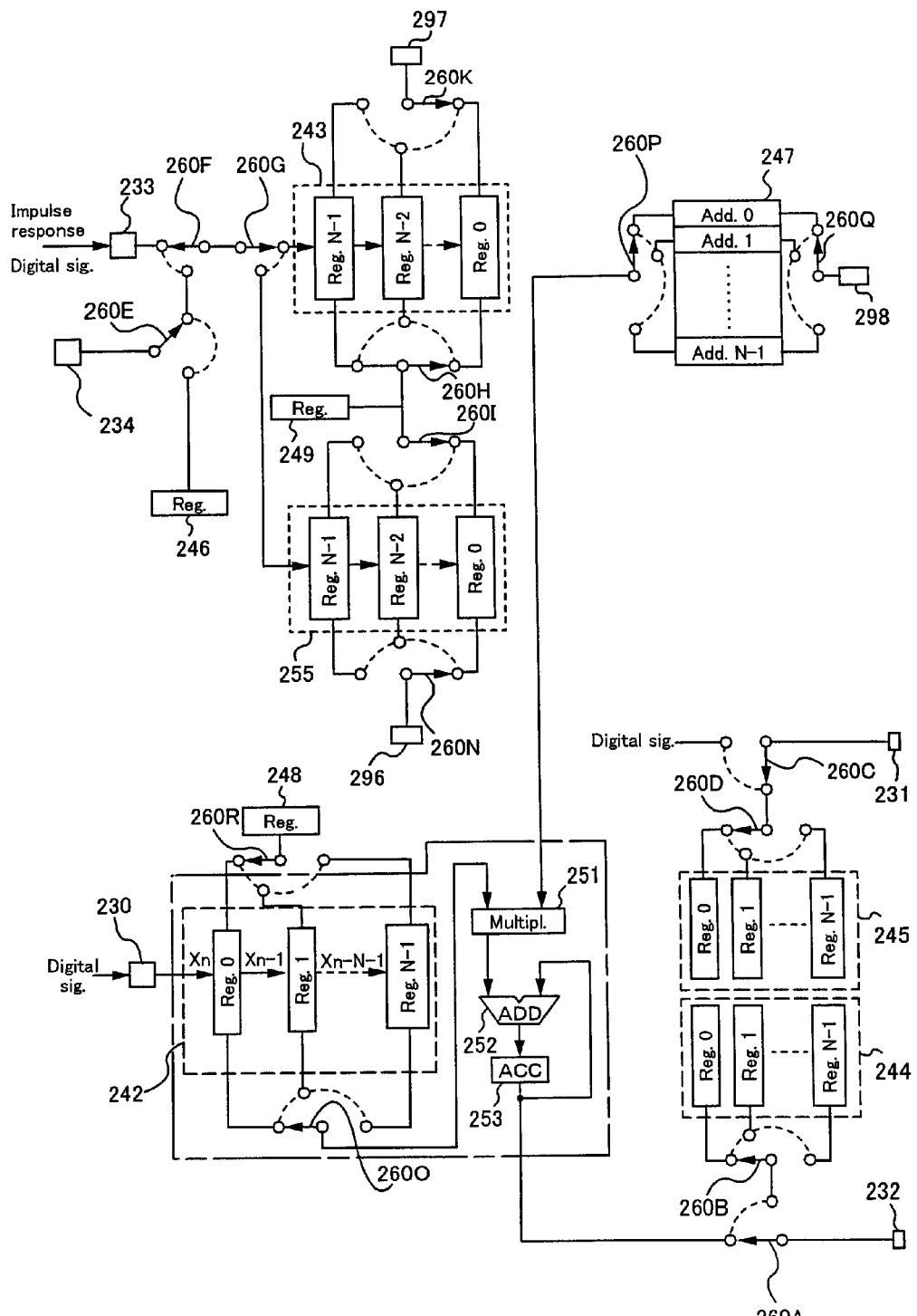
FIG. 31 is a diagram showing part of the configuration of a DSP 202.
Figure 32:
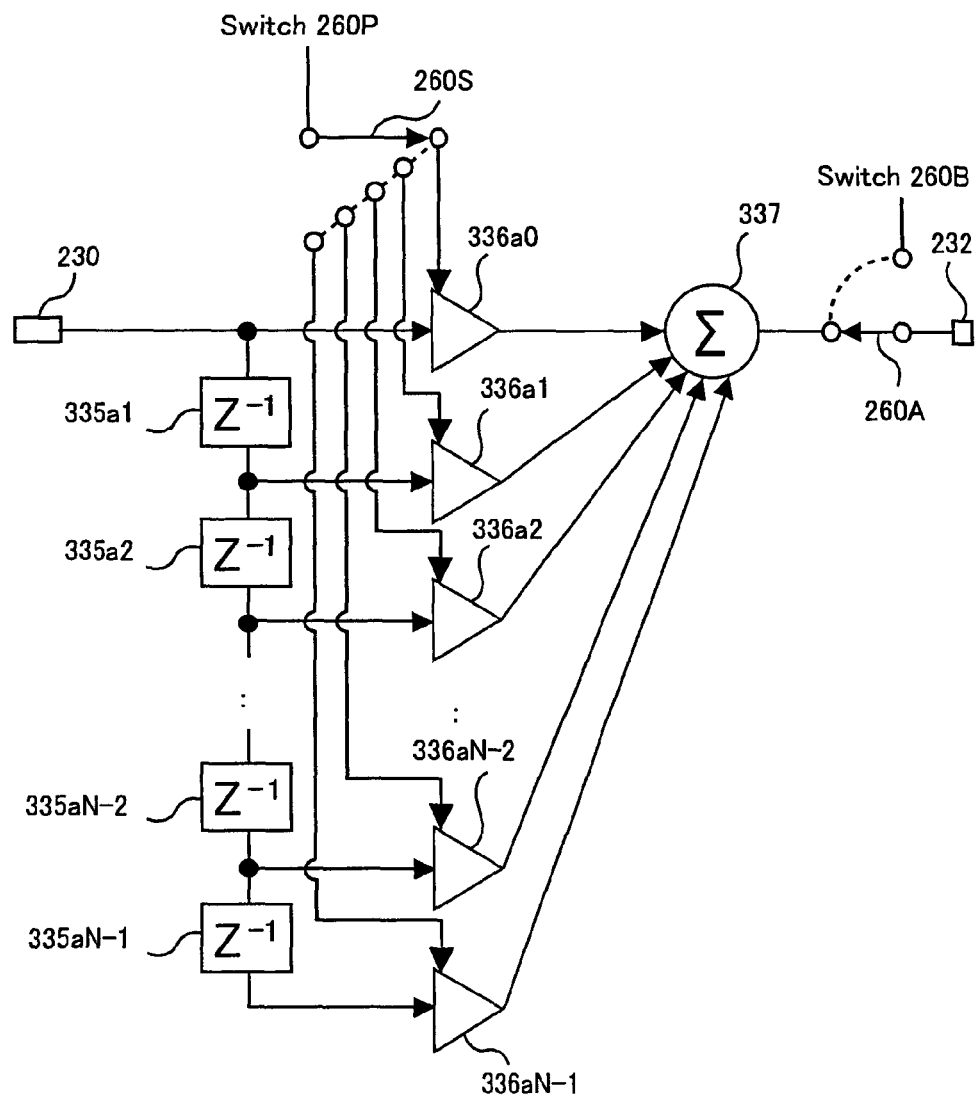
FIG. 32 is a diagram illustrating another example of the FIR filter 303.

FIG. 28 is a block diagram illustrating an example of an echo prevention circuit and a digital signal processing circuit (DSP 202) included therein. FIG. 29 is a block diagram illustrating an example of a DSP 295 for setting the filter coefficients of the FIR filter 303 based on the impulse responses IR9'(Z) and IR10'(Z). FIG. 30 is a detailed diagram of an ADF 284 of FIG. 29. FIG. 31 is a block diagram illustrating part of the configuration of the DSP 202. FIG. 32 is a block diagram illustrating another example of the FIR filter 303. Although in the implementation the DSP 295 and DSP 202 are provided separately to set the filter coefficients of the FIR filter 303, the invention is not limited to this. For example, the DSP 202 may be configured to perform the processes of the DSP 295 as described later.

The DSP 295 has a white noise generator 287, input terminals 296, 297, FIR filters 285, 286, a subtracter 288, an ADF 284, and an output terminal 298.

The white noise generator 287 generates white noise having an almost constant level over an entire frequency band, for example, M (the initial letter of Maximum Length sequence) series random numbers as white noise according to a linear feed-back register method. The conventional art disclosed in, for example, Japanese Patent Application Laid-Open Publication No. H05-241795 can be used to generate the M series random numbers. In this implementation, white noise is used, but not being limited to this, noise having no regularity, e.g., colored noise can be used. The white noise generator 287 outputs to the FIR filters 285, 286 the generated M series random numbers L(N), where N is the number of samples and equal to the number of taps of the FIR filter 285, 286.

By switching the switch 260N to the registers 0, . . . sequentially, the impulse responses imp(0) to imp(N−1) (=IR10'(Z)) of the path J stored in the registers 0 to N−1 are sequentially input into the FIR filter 285 through the input terminal 296. As a result, the impulse responses imp(0) to imp(N−1) of the path J are set as the filter coefficients of the FIR filter 285. The FIR filter 285 performs a convolution operation on the M series random numbers L(N) from the white noise generator 287 based on the set filter coefficients and outputs to the ADF 284. In the description below of this implementation, let the reference signals Xt (={Xt(0), . . . , Xt(N−1)}; Xt(i) referring to the i-th) refer to the output signals from the FIR filter 285.

By switching the switch 260K to the registers 0, . . . sequentially, the impulse responses imp(0) to imp(N−1) (=IR9'(Z)) of the path I stored in the registers 0 to N−1 of the impulse response storage memory 243 are sequentially input into the FIR filter 286 through the input terminal 297. As a result, the impulse responses imp(0) to imp(N−1) of the path I are set as the filter coefficients of the FIR filter 286. The FIR filter 286 performs a convolution operation on the M series random numbers L(N) from the white noise generator 287 based on the set filter coefficients and outputs to the subtracter 288. In the description below of this implementation, let Yt refer to the result of the convolution operation by the FIR filter 286. Note that the FIR filters 285, 286 can be known FIR filters.

Yt from the FIR filter 286 is input to the + input terminal of the subtracter 288, and Y't from the ADF 284, as described later, is input to the − input terminal of the subtracter 288. The subtracter 288 subtracts Yt from the FIR filter 286 and Y't from the ADF 284 and outputs. In the description below, let the error signal Et refer to the output signal from the subtracter 288.

The ADF 284, as shown inside a chain line of FIG. 30, has a reference signal input/output unit 289, a filter coefficient unit 290, a multiplier 291, a filter coefficient updating unit 292, an adder 293, a register 294, and switches 260Q to 260U.

The reference signal input/output unit 289 has the reference signals Xt from the FIR filter 285 input thereto and holds the reference signals Xt. The reference signal input/output unit 289 outputs the reference signals Xt to the multiplier 291 and the filter coefficient updating unit 292.

The filter coefficient unit 290 consists of N registers 0 to N−1. The filter coefficients from the filter coefficient updating unit 292 are sequentially input into and held in the registers 0 to N−1 of the filter coefficient unit 290 by switching the switches 260Q, 260R to the filter coefficient updating unit 292 side and the switch 260S to the multiplier 291 side and switching the switch 260T to the registers 0, . . . sequentially. And the filter coefficient unit 290 outputs the filter coefficients of the registers 0 to N-1 sequentially to the multiplier 291 by switching the switch 260R to the multiplier 291 side and switching the switch 260T to the registers 0, . . . sequentially. Also, the filter coefficient unit 290 outputs the filter coefficients of the registers 0 to N−1 sequentially to the filter coefficient updating unit 292 by switching the switch 260U to the registers 0, . . . sequentially. In the description below of this implementation, let Ht (={Ht(0), . . . , Ht(N−1)}; Ht(i) referring to the i-th) be the filter coefficients of the filter coefficient unit 290 with supposing the registers 0 to N−1 holding Ht(0), . . . , Ht(N−1).

The multiplier 291 outputs to the adder 293 results of multiplying sequentially the reference signals Xt from the reference signal input/output unit 289 and the filter coefficients Ht of the filter coefficient unit 290.

The adder 293 outputs to the subtracter 288 the result of adding sequentially the output signals from the multiplier 291. The output signal from the adder 293 is the Y't.

Error signals Et from the subtracter 288 are input into the filter coefficient updating unit 292. The filter coefficient updating unit 292 calculates filter coefficients Ht+1(={Ht+1(0), . . . , Ht+1(N−1)}; Ht+1(i) referring to the i-th) based on the error signals, the reference signals, and the filter coefficients Ht according to, e.g., the LMS algorithm or the NLMS algorithm, and outputs to the filter coefficient unit 290. The filter coefficient updating unit 292 calculates such filter coefficients that the average of the error signals Et from the subtracter 288 is at or below a predetermined value. This predetermined value is decided in such a way that an echo in a voice generated based on an analog signal that is output from the DA converter 215 (FIG. 22) when the average of the error signals is at or below it, has such a level that human beings can not hear.

The other logic value of 0 from the DSP 295, for example, is input into the register 294, which holds the other logic value of 0.

As shown in FIGS. 28, 31, the DSP 202 has an FIR filter 303, a filter coefficient storage memory 247, a register 248, and switches 260N, 260P to 260R as well as the constituents of the sixth implementation.

The FIR filter 303 has a for-digital-signals memory 242 (in a dashed line), a multiplier 251, an ADD 252, an ACC 253, and a switch 260O as shown inside a chain line of FIG. 31.

The other logic value of 0 from the CPU 201 is input into the register 248.

The filter coefficient storage memory 247 consists of N addresses 0 to N−1. The filter coefficients Ht(0), . . . , Ht(N−1) from the ADF 284 are sequentially stored into the addresses 0 to N−1 of the filter coefficient storage memory 247 by switching the switch 260Q to the addresses 0, . . . sequentially. To describe in detail, by switching the switch 260T of the ADF 284 to the registers 0, sequentially while switching the switch 260Q to the addresses 0, ... sequentially, the filter coefficients Ht(0), ..., Ht(N−1) are sequentially stored into the addresses 0 to N−1.

The for-digital-signals memory 242 consists of N registers 0 to N−1. The digital signals from the AD converter 203 (FIG. 22) are sequentially input into the registers 0 to N−1 of the for-digital-signals memory 242 through the input terminal 230. By the digital signals being input into the registers 0 to N−1 sequentially, the digital signals are delayed by units of one sampling cycle. Let Xn be a digital signal, then the register 0 outputs Xn−1 obtained by delaying Xn by one sampling cycle to the register 1. Also, the for-digital-signals memory 242 is cleared with use of the other logic value of 0 stored in the register 248 by the DSP 202 switching the switch 260R to the registers 0 to N−1 sequentially.

The digital signals Xn, ..., Xn−(N−1) from the for-digital-signals memory 242 and the filter coefficients Ht(0), ..., Ht(N−1) from the filter coefficient storage memory 247 are sequentially input to the multiplier 251 by the DSP 202 switching the switches 260O, 260P respectively to the registers 0, ... and to the addresses 0, ... sequentially. The multiplier 251 outputs to the ADD 252 results of multiplying sequentially the digital signals Xn, ..., Xn−(N−1) and the filter coefficients Ht(0), ..., Ht(N−1). For example, the multiplier 251 outputs to the ADD 252 the result of multiplying Xn from the for-digital-signals memory 242 and the filter coefficient Ht(0) from the filter coefficient storage memory 247. Next, the multiplier 251 outputs to the ADD 252 the result of multiplying Xn−1 from the for-digital-signals memory 242 and the filter coefficient Ht(1) from the filter coefficient storage memory 247. This process is repeated, thereby multiplying sequentially the digital signals Xn, ..., Xn−(N−1) and the filter coefficients Ht(0), ..., Ht(N−1).

The ACC 253 holds an adding result input from the ADD 252. The ADD 252 outputs to the ACC 253 the result of adding the multiplying result from the multiplier 251 and the previous adding result of the ADD 252 stored in the ACC 253. As a result, $Xn \cdot Ht(0) + \ldots + (Xn-(N-1)) \cdot (Ht(N-1))$ is stored in the ACC 253. In this way, the FIR filter 303 performs a convolution operation on the digital signals based on the filter coefficients stored in the filter coefficient storage memory 247. The FIR filter 303 outputs the convoluted digital signal to the output terminal 232.

By setting the filter coefficients of the FIR filter 303 in this way, the signal transmitting through the path I can be canceled in the differential amplifier 209 by the signal transmitting through the path J. As a result, when digital signals are input to the input terminal 230, the previously mentioned echo can be prevented.

In the present implementation, the FIR filter 303 has the above configuration, but not being limited to this, may have the configuration shown in FIG. 32. In this case, delay circuits 335a1 to 335aN−1 corresponding to the for-digital-signals memory 242, multipliers 336a0 to 336aN−1 corresponding to the multiplier 251, and an adder 337 corresponding to the ADD 252 and ACC 253 may be provided. The FIR filter 303 having the configuration shown in FIG. 26 will be described below. As shown in the Figure, the FIR filter 303 has N−1 number of delay circuits 335a1 to 335aN−1 connected in cascade, N number of multipliers 336a0 to 336aN−1 that each multiply an inputted digital signal, and an adder 337 that adds the outputs from the multipliers 336a0 to 336aN−1.

The delay circuits 335a1 to 335aN−1 delay the digital signal Xn input through the input terminal 230 by units of one sampling cycle and output. For example, the delay circuit 335a1 outputs a digital signal Xn−1 obtained by delaying the digital signal Xn by one sampling cycle, and the delay circuit 335aN−1 outputs a digital signal Xn−(N−1).

The filter coefficients Ht(0), ..., Ht(N−1) stored in the filter coefficient storage memory 247 are respectively set as multiplication coefficients in the multipliers 336a0 to 336aN−1 by switching the switches 60P, 60S sequentially. The multipliers 336a0 to 336aN−1 multiply inputted digital signals by the set multiplication coefficients respectively, and output the multiplying results.

The adder 337 adds the outputs from the multipliers 336a0 to 336aN−1. As a result, the same convolution operation as with the FIR filter 303 is completed.

==Setting Filter Coefficients of FIR Filter 303==

Figure 33:
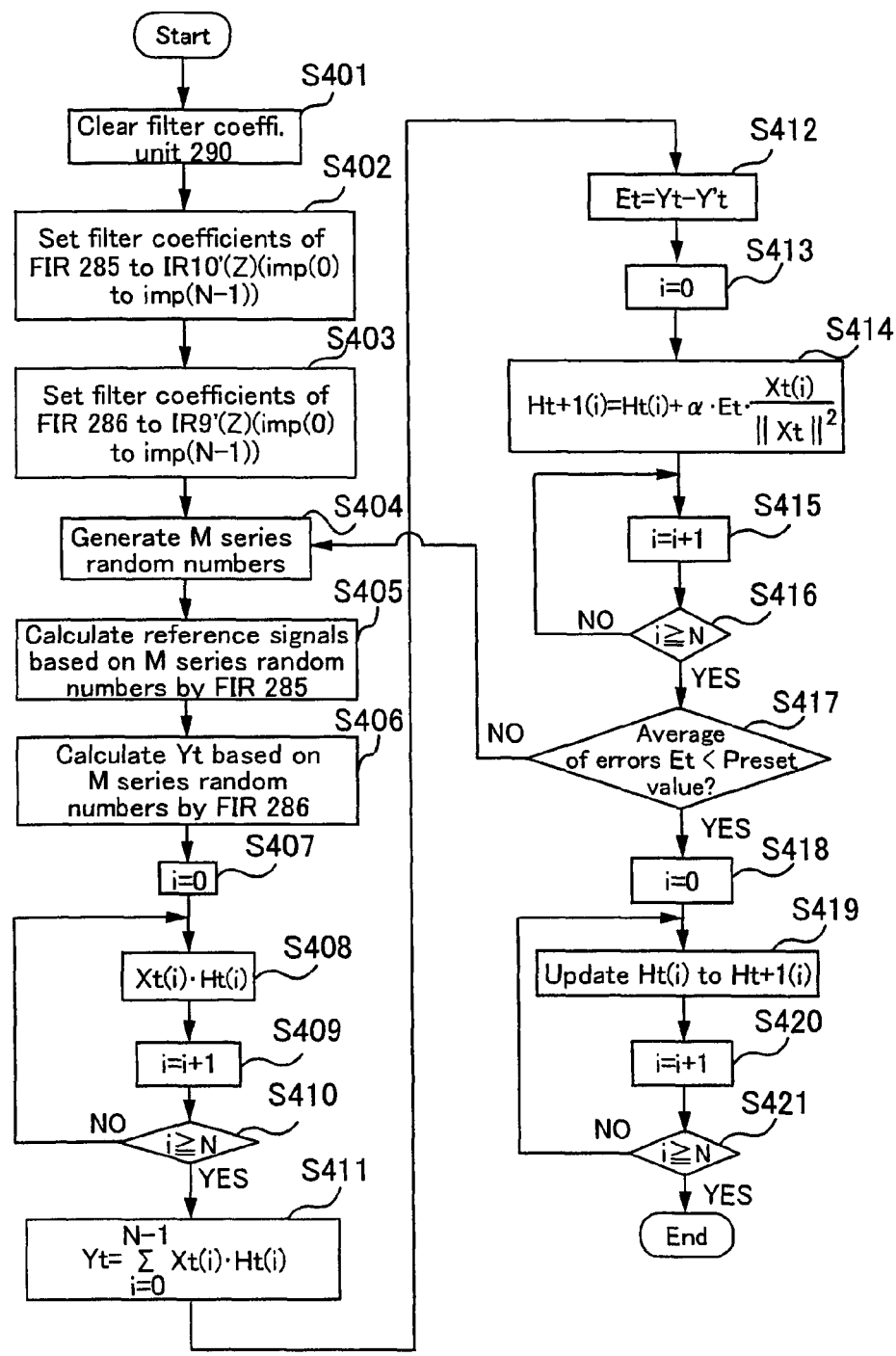
FIG. 33 is a flow chart illustrating the operation of the seventh implementation.

An example of the operation of setting the filter coefficients of the FIR filter 303 will be described with reference to FIGS. 28 to 33. FIG. 33 is a flow chart illustrating an example of the operation of setting the filter coefficients of the FIR filter 303.

According to an instruction signal from the CPU 201, the DSP 295 first inputs the other logic value of 0 into the register 294 to clear the filter coefficients of the filter coefficient unit 290. By the DSP 295 switching the switch 260S to the register 294 side and the switch 260T to the registers 0 ... sequentially, the registers 0 to N−1 of the filter coefficient unit 290 are cleared with use of the other logic value of 0 stored in the register 294 (S401).

The DSP 295 sets the impulse responses imp(0) to imp(N−1) (=IR10′(Z)) of the path J, input through the input terminal 296 from the impulse response storage memory 255, as the filter coefficients of the FIR filter 285 (S402). Also, the DSP 295 sets the impulse responses imp(0) to imp(N−1) (=IR9′(Z)) of the path I, input through the input terminal 297 from the impulse response storage memory 243, as the filter coefficients of the FIR filter 286 (S403).

The white noise generator 287 generates the M series random numbers L(N) as white noise according to, e.g., a linear feed-back register method and outputs to the FIR filters 285, 286 (S404).

The FIR filter 285 performs a convolution operation on the M series random numbers L(N) from the white noise generator 287 based on the set filter coefficients and outputs the operation results, the reference signals Xt (={Xt(0), ..., Xt(N−1)}), to the ADF 284 (S405).

The FIR filter 286 performs a convolution operation on the M series random numbers L(N) from the white noise generator 287 based on the set filter coefficients and outputs the operation results, Yt, to the + input terminal of the subtracter 288 (S406).

The DSP 295 performs the following processes to generate Y′t to be input to the − input terminal of the subtracter 288. First, the DSP 295 sets i to 0 (S407) and switches the switches 260R, 260S to the multiplier 291 side and the switch 260T to the register 0 side. Then, the DSP 295 has Xt(0) of the reference signal input/output unit 289 and Ht(0) of the filter coefficient unit 290 output to the multiplier 291. The multiplier 291 multiplies Xt(0) and Ht(0) (S408), and outputs the multiplying result Xt(0)·Ht(0) to the adder 293.

Next, the DSP 295 increments i by one, that is, i=i+1=1 (S409). The DSP 295 determines that i not ≧N (NO at S410) because the multiplying result of the multiplier 291 has not reached Xt(N−1)·Ht(N−1). Then, the DSP 295 switches the switch 260T to the register 1 side to have Ht(1) of the filter coefficient unit 290 output to the multiplier 291 and also has Xt(1) of the reference signal input/output unit 289 output to the multiplier 291. The multiplier 291 multiplies Xt(1) and Ht(1) (S408) and outputs the multiplying result, Xt(1)·Ht(1), to the adder 293. In this way, the processes of from S408 to S410 are repeated until i≧N (YES at S410), while the multiplying results of the multiplier 291, Xt(0)·Ht(0), . . . , Xt(N−1)·Ht(N−1), are output sequentially to the adder 293. The adder 293 adds sequentially the multiplying results from the multiplier 291 (S411), and the adding result of the adder 293 becomes Y't (=Xt(0)·Ht(0)+ . . . +Xt(N−1)·Ht(N−1)). Then, the adder 293 outputs Y't to the − input terminal of the subtracter 288.

The subtracter 288 subtracts Y't input to its + input terminal and Y't input to its − input terminal (S412) and outputs the subtracting result, an error signal Et, to the filter coefficient updating unit 292.

The filter coefficient updating unit 292 performs the following processes to calculate the filter coefficients based on the error signal Et. First, the filter coefficient updating unit 292 sets i to 0 to calculate Ht+1(0) (S413). Ht+1(0) is expressed as:

$$Ht+1(0)=Ht(0)+(\alpha \cdot Et \cdot Xt(0))/|Xt|^2,$$

where α is a step gain, a predetermined constant, and |Xt|² is a norm (or square sum) of the reference signals Xt. The filter coefficient updating unit 292 solves the above equation based on Xt(0) from the reference signal input/output unit 289, Ht(0) from the filter coefficient unit 290, and Et from the subtracter 288 thereby calculating Ht+1(0) (S414). Next, to calculate Ht+1(1), the filter coefficient updating unit 292 increments i by one, that is, i=i+1=1 (S415). The filter coefficient updating unit 292 determines that i not ≧N (NO at S416) because the filter coefficient calculated has not yet reached Ht+1(N−1). Like in the above, Ht+1(1) is calculated from:

$$Ht+1(1)=Ht(1)+(\alpha \cdot Et \cdot Xt(1))/|Xt|^2.$$

In this way, the processes of from S414 to S416 are repeated until i≧N (YES at S416), and thereby Ht+1(={Ht+1(0), . . . , Ht+1(N−1)}) is calculated. Next, the DSP 295 determines whether the average of error signals Et is less than a predetermined value (S417). If determining that the average of error signals Et is not less than the predetermined value (NO at S417), the DSP 295 repeats the above processes of S404 and later.

As such, if the average of error signals Et from the subtracter 288 is not less than the predetermined value, the filter coefficients Ht+1 are calculated based on the error signal Et. By repeating these processes, the filter coefficients of the FIR filter 285 are set to the impulse response of the path J, and the filter coefficients of the FIR filter 286 are set to the impulse response of the path I, in which state the error signal Et from the subtracter 288 can be made less than the predetermined value when the M series random numbers L(N) from the white noise generator 287 are input into the FIR filters 285, 286. As such, the filter coefficients Ht+1 which make the error signal Et less than the predetermined value are filter coefficients which enable the signal transmitting through the path I and the signal transmitting through the path J to cancel out each other. Thus, echoes can be prevented.

If determining that the average of error signals Et is less than the predetermined value (YES at S417), the DSP 295 performs the following processes to update the filter coefficients of the filter coefficient unit 290.

First, the DSP 295 sets i to 0 to update the filter coefficient of the register 0 of the filter coefficient unit 290 to Ht+1(0) (S418). Then, the DSP 295 switches the switch 260R to the filter coefficient updating unit 292 side and the switch 260T to the register 0 side.

Thus, the filter coefficient Ht(0) held in the register 0 of the filter coefficient unit 290 is updated to Ht+1(0) (S419). Next, the DSP 295 increments i by one, that is, i=i+1=1 to update Ht(1) to Ht+1(1) (S420). The DSP 295 determines that i not ≧N (NO at S421) because the filter coefficient Ht(N−1) of the register N−1 has not yet been updated to Ht+1(N−1), and then switches the switch 260T to the register 1 side to update the filter coefficient Ht(1) held in the register 1 to Ht+1(1) (S419). In this way, the processes of from S213 to S215 are repeated until i≧N (YES at S421), and thereby the filter coefficients Ht (={Ht(0), . . . , Ht(N−1)}) of the registers 0 to N−1 of the filter coefficient unit 290 are updated to Ht+1 (={Ht+1(0), . . . , Ht+1(N−1)}).

The DSP 295 switches the switch 260Q to the output terminal 298 side and the switch 260T to the registers 0, . . . sequentially, and thereby, the filter coefficients Ht (={Ht(0), . . . , Ht(N−1)}) of the filter coefficient unit 290 can be output to the filter coefficient storage memory 247 through the output terminal 298. Then, the DSP 295 switches the switch 260Q to the addresses 0, sequentially, and thereby the filter coefficients Ht (={Ht(0), . . . , Ht(N−1)}) of the filter coefficient unit 290 can be set as the filter coefficients of the FIR filter 303.

The algorithm for updating the filter coefficients H of the filter coefficient unit 290 is not limited to this. The existing estimation algorithm such as the LMS algorithm or the NLMS algorithm, mentioned above, can be used. Or, the filter coefficients H of the filter coefficient unit 290 can be updated by the process disclosed in, for example, Japanese Patent Application Laid-Open Publication No. 2002-246880.

According to the above implementation, the above processes have been described which use hardware (e.g., the subtracter 288 and the multiplier 291), but the invention is not limited to this. For example, a program for the above processes may be stored beforehand in a ROM or the like so that a processor of the DSP 202 reads out the program and executes.

<<Eighth Implementation>>
==Example Configuration of Echo Prevention Circuit and Digital Signal Processing Circuit==

Figure 34:
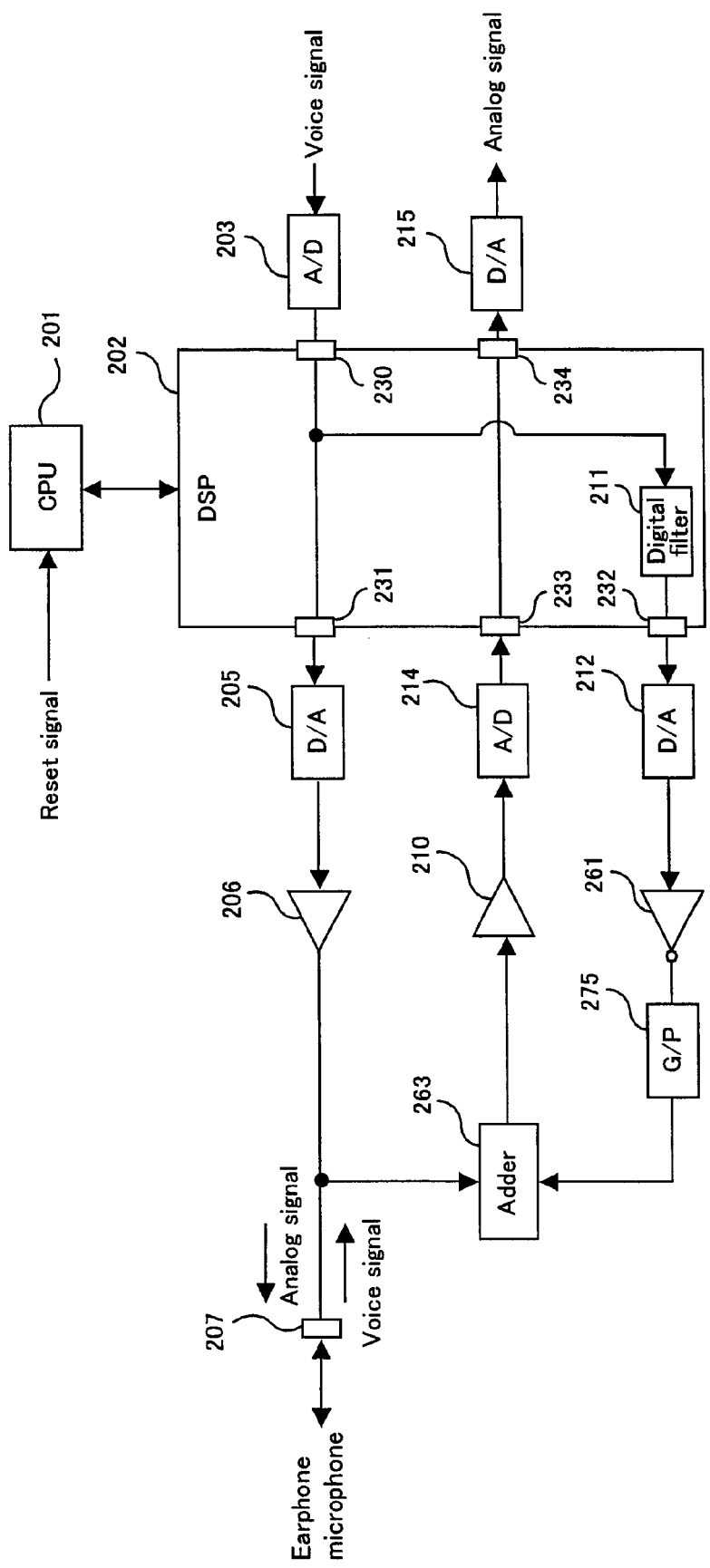
FIG. 34 is a block diagram illustrating an eighth implementation.

FIG. 34 is a diagram showing an eighth implementation. FIG. 34 is a block diagram illustrating an example of an echo prevention circuit and a digital signal processing circuit included therein. In the echo prevention circuit of FIG. 34, the same reference numerals denote the same parts as in the sixth and seventh implementations with description thereof being omitted.

The echo prevention circuit comprises a CPU 201, a DSP 202, an AD converter 203, a DA converter 205, an amplifier 206, an input/output terminal 207, an adder 263, an amplifier 210, an AD converter 214, a DA converter 215, a DA converter 212, an inverting amplifier 261 (an inverting circuit), and a gain phase adjusting circuit (G/P) 275.

This implementation differs from the sixth and seventh implementations in that the inverting amplifier 261, the gain phase adjusting circuit 275, and the adder 263 are provided instead of the differential amplifier 209 and the amplifier 213. Although also in this implementation the CPU 201 is included, it is possible that the CPU 201 is not included.

The DSP 202 has an input terminal 230, an output terminal 231, a digital filter 211, an output terminal 232, an input terminal 233, and an output terminal 234.

The inverting amplifier 261 inverts and amplifies an analog signal from the DA converter 212 with a predetermined amplification factor and outputs to the gain phase adjusting circuit 275.

The gain phase adjusting circuit 275 adjusts in gain and phase the analog signal from the inverting amplifier 261 and outputs to the adder 263. The gain and phase of the analog signal is adjusted by the gain phase adjusting circuit 275 in order to generate an analog signal that is the inverse in phase of an analog signal from the amplifier 206 so as to cause the output of the adder 263 to be zero when digital signals are input to the input terminal 30.

The analog signal from the amplifier 206 is input into the adder 263, which outputs the result of adding the analog signal from the amplifier 206 and the analog signal from the gain phase adjusting circuit 275 to the amplifier 210. Also, the adder 263 outputs a voice signal from the input/output terminal 207 to the amplifier 210.

==Filter Coefficients of FIR filter 211==

Figure 35:
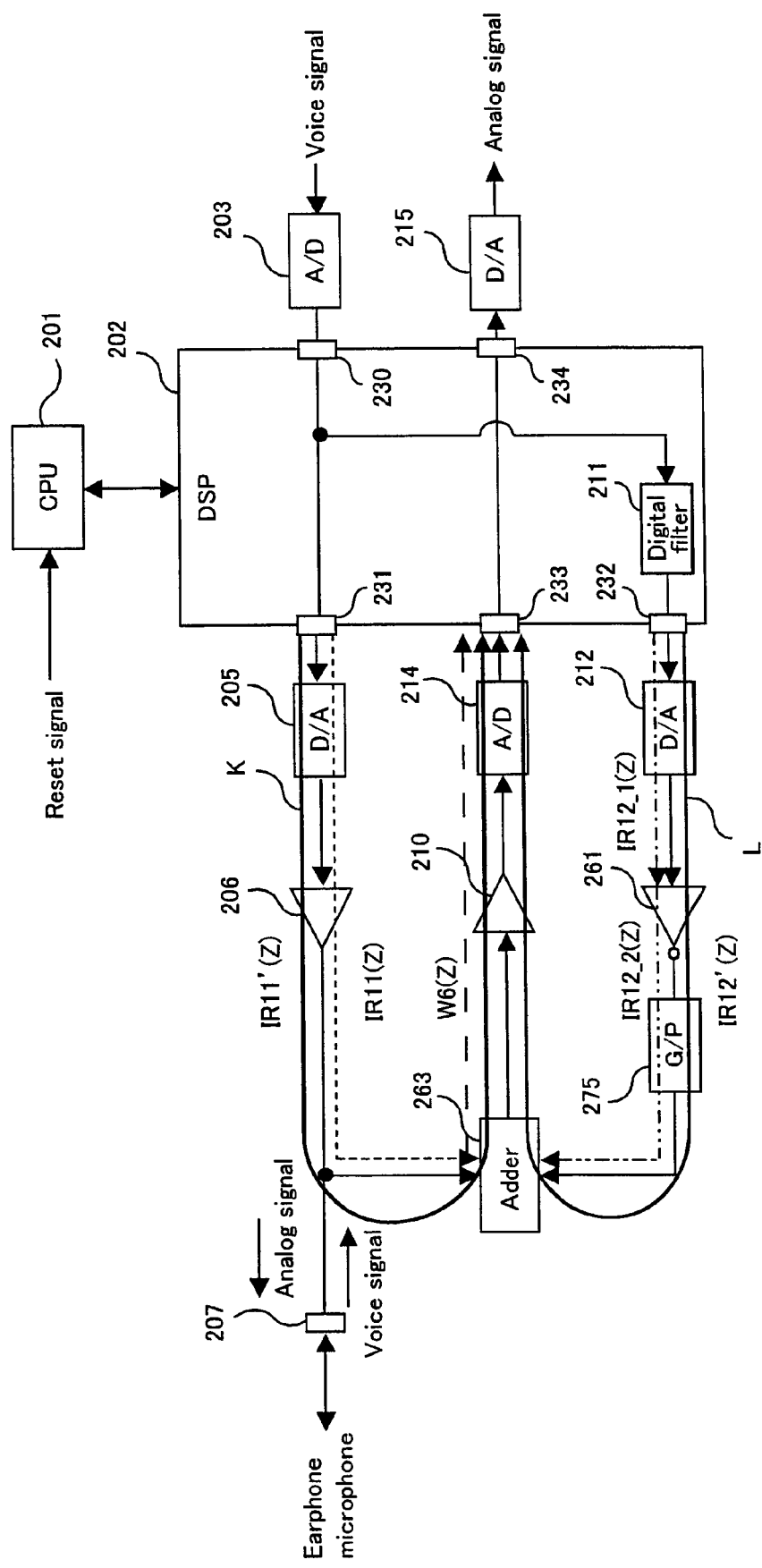
FIG. 35 is a diagram showing paths K, L in the eighth implementation of FIG. 34.
Figure 36:
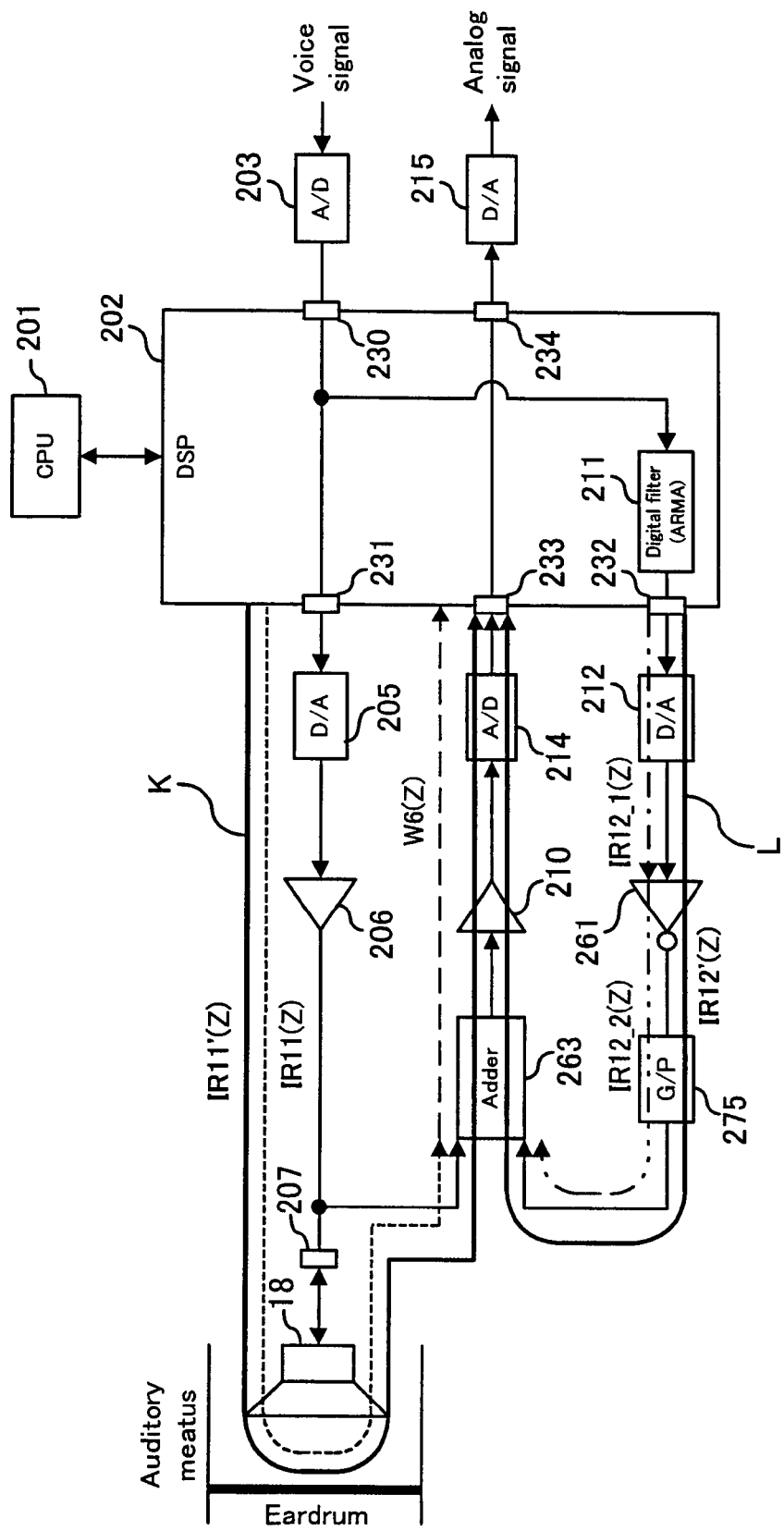
FIG. 36 is a diagram showing the case where the earphone microphone 18 is included in the path K of FIG. 35.

The filter coefficients of the FIR filter 211 will be described in detail with reference to FIGS. 35, 36. FIG. 35 shows the paths K, L of the echo prevention circuit of FIG. 34. FIG. 36 shows a case where the earphone microphone 18 is included in the path K.

The analog signal from the amplifier 206 is possibly input into the adder 263 as well as being output through the input/output terminal 207. In this case, an echo of the analog signal occurs, or the analog signal from the amplifier 206 is superimposed on a voice signal input through the input/output terminal 207 and input to the adder 263, thus generating an echo. Accordingly, the filter coefficients of the FIR filter 211 are set so as to prevent this echo.

Let IR11(Z) be impulse response (a transfer function) of from the output terminal 231 to an input terminal of the adder 263 indicated by a dashed line in FIG. 35 or 36, IR12_1(Z) be impulse response (a transfer function) of from the output terminal 232 to the input of the inverting amplifier 261 indicated by a chain line in FIG. 35 or 36, and IR12_2(Z) be impulse response (a transfer function) of from the input of the inverting amplifier 261 to an input terminal of the adder 263 indicated by a two-dot chain line in FIG. 35 or 36. Suppose that $IR12(Z)=-IR12\_1(Z) \cdot IR12\_2(Z)$. Furthermore, let W6(Z) be impulse response (a transfer function) of from the stage following each input terminal of the adder 263 to the input terminal 233 indicated by a long dashed line in FIG. 35 or 36.

Here, let Q(Z) be the filter coefficients of the digital filter 211. Then, in order to cause the signal from the gain phase adjusting circuit 275 to cancel out the signal from the amplifier 206 in the adder 263, Q(Z) is set such that the following equation is satisfied:

$$IR11(Z)=IR12(Z) \cdot Q(Z).$$

That is, Q(Z) is set as follows:

$$Q(Z)=IR11(Z)/IR12(Z).$$

However, the impulse responses obtainable by the DSP 202 are the impulse response (transfer function) IR11'(Z) (=IR11(Z)·W6(Z)) of the path K and the impulse response (transfer function) IR12'(Z) (=−IR12_1(Z)·IR12_2(Z)·W6(Z)) of the path L, indicated by solid lines in FIG. 35 or 36. Here, IR12_1(Z) is inverted in phase because of being inverted by the inverting amplifier 261.

In this case, the equation that allows the signal transmitting through the path K and the signal transmitting through the path L to cancel out each other, is as follows:

$$-IR11'(Z)=IR12'(Z) \cdot Q(Z).$$

That is, Q(Z) is set as follows:

$$Q(Z)=-IR11'(Z)/IR12'(Z).$$

That is, the characteristic of the digital filter 211 is achieved by taking the product of the inverse of the transfer characteristic IR11'(Z) and the characteristic of the inverse filter of IR12'(Z). By setting the filter coefficients of the digital filter 211 in this way, the signal transmitting through the path K can be canceled in the adder 263 by the signal transmitting through the path L. As a result, when digital signals are input to the input terminal 230, the previously mentioned echo can be prevented.

As shown in FIG. 36, by acquiring the impulse response IR11'(Z) in a state of the earphone microphone 18 being connected and setting the product of the phase-inverse of this IR11'(Z) and the characteristic of the inverse filter of IR12'(Z) as the filter coefficients in the digital filter 211, effective echo prevention that is according to the transfer characteristic of the earphone microphone 18 becomes possible.

Furthermore, by acquiring the impulse response IR11'(Z) in a state where the connected earphone microphone 18 is attached to an ear by inserting into its auditory meatus or covering its ear auricle and setting the product of the phase-inverse of this IR11'(Z) and the characteristic of the inverse filter of IR12'(Z) as the filter coefficients in the digital filter 211, effective echo prevention that is according to the transfer characteristics of the earphone microphone 18 and of the user's auditory meatus becomes possible.

The process of setting the product of the phase-inverse of the transfer characteristic IR11'(Z) and the characteristic of the inverse filter of IR12'(Z) as the characteristic of the digital filter 211 can be achieved by performing the same processes as in the sixth implementation.

Alternatively, having set the filter coefficients of the FIR filter 286 (FIG. 29) to impulse response IR11'(Z) of the path K and the filter coefficients of the FIR filter 285 (FIG. 29) to impulse response IR12'(Z) of the path L, the filter coefficients of the digital filter 211 can be set by performing the same processes as in the seventh implementation.

<<Ninth Implementation>>

==Example Configuration of Echo Prevention Circuit and Digital Signal Processing Circuit==

Figure 37:
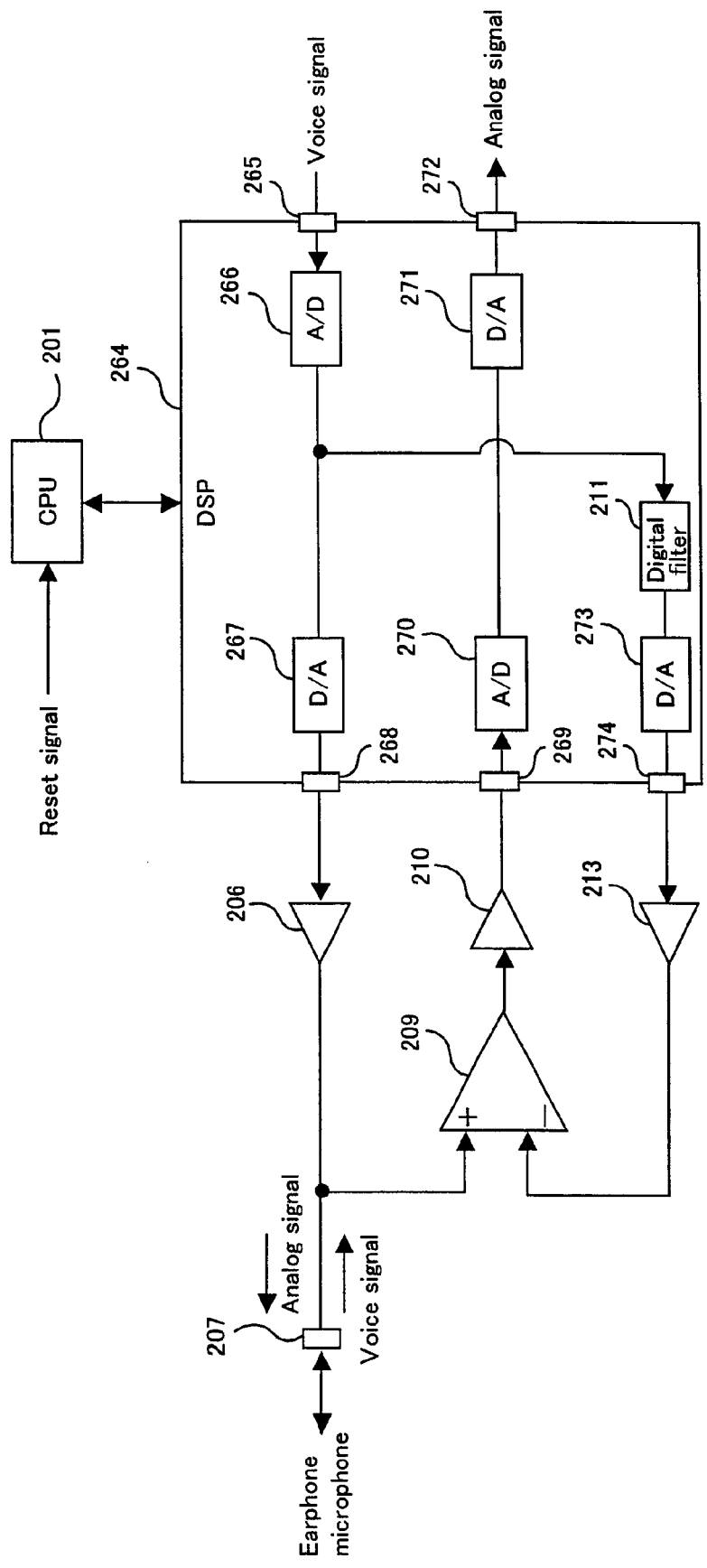
FIG. 37 is a block diagram illustrating a ninth implementation.

FIG. 37 is a diagram showing a ninth implementation. FIG. 37 is a block diagram illustrating an example of an echo prevention circuit and a digital signal processing circuit (DSP 264) included therein. In the echo prevention circuit of FIG. 37, the same reference numerals denote the same parts as in the sixth and seventh implementations with description thereof being omitted.

The echo prevention circuit comprises a CPU 201, a DSP 264, an amplifier 206, an input/output terminal 207, a differential amplifier 209, an amplifier 210, and an amplifier 213. Although also in this implementation the CPU 201 is included, it is possible that the CPU 201 is not included.

The DSP 264 has an input terminal 265, an AD converter 266, a DA converter 267, an output terminal 268, an input terminal 269, an AD converter 270, a DA converter 271, an output terminal 272, a digital filter 211, DA converter 273, and an output terminal 274.

This implementation has a configuration where the AD converters 203, 214, and the DA converters 205, 212, 215 of the sixth and seventh implementations are provided inside the DSP 264.

For example, a voice signal is input through the input terminal 265 to the AD converter 266, which inputs digital signals into which the voice signal has been analog-to-digital converted to the DA converter 267 and the digital filter 211.

The digital filter 211 performs a filtering process on the digital signals based on the filter coefficients of the digital filter 211 and outputs to the DA converters 273.

The DA converter 267 outputs an analog signal into which the digital signals have been digital-to-analog converted through the output terminal 268, thereby inputting the analog signal from the DA converter 267 to the amplifier 206.

The DA converter 273 outputs an analog signal into which the digital signals from the digital filter 211 have been digital-to-analog converted through the output terminal 274, thereby inputting the analog signal from the DA converter 273 to the amplifier 213.

A voice signal from the amplifier 210 is input through the input terminal 269 to the AD converter 270, which outputs digital signals into which the voice signal has been analog-to-digital converted to the DA converter 271.

The DA converter 271 outputs an analog signal into which the digital signals have been digital-to-analog converted through the output terminal 272.

==Filter Coefficients of FIR filter 211==

Figure 38:
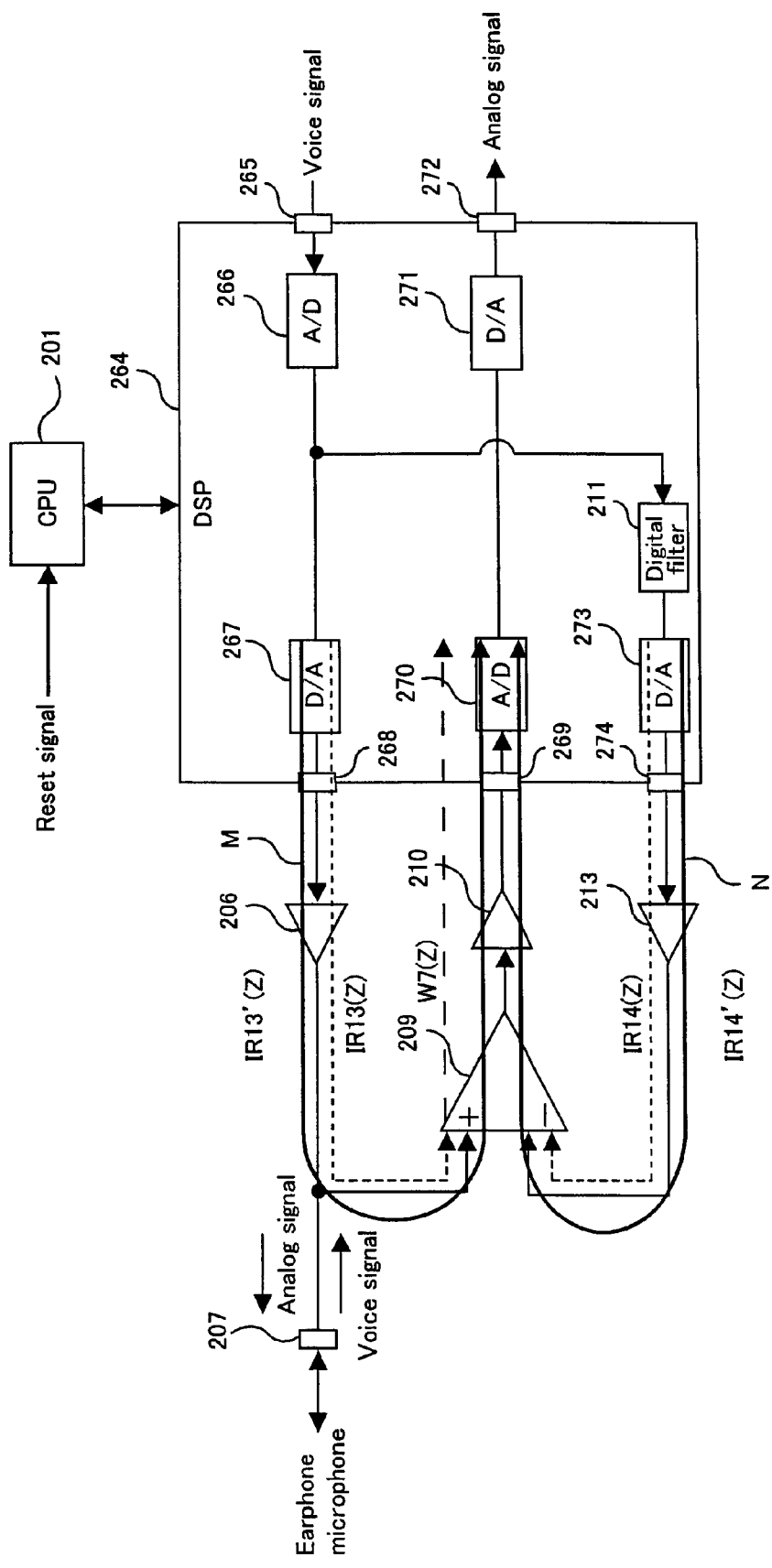
FIG. 38 is a diagram showing paths M, N in the ninth implementation of FIG. 37.
Figure 39:
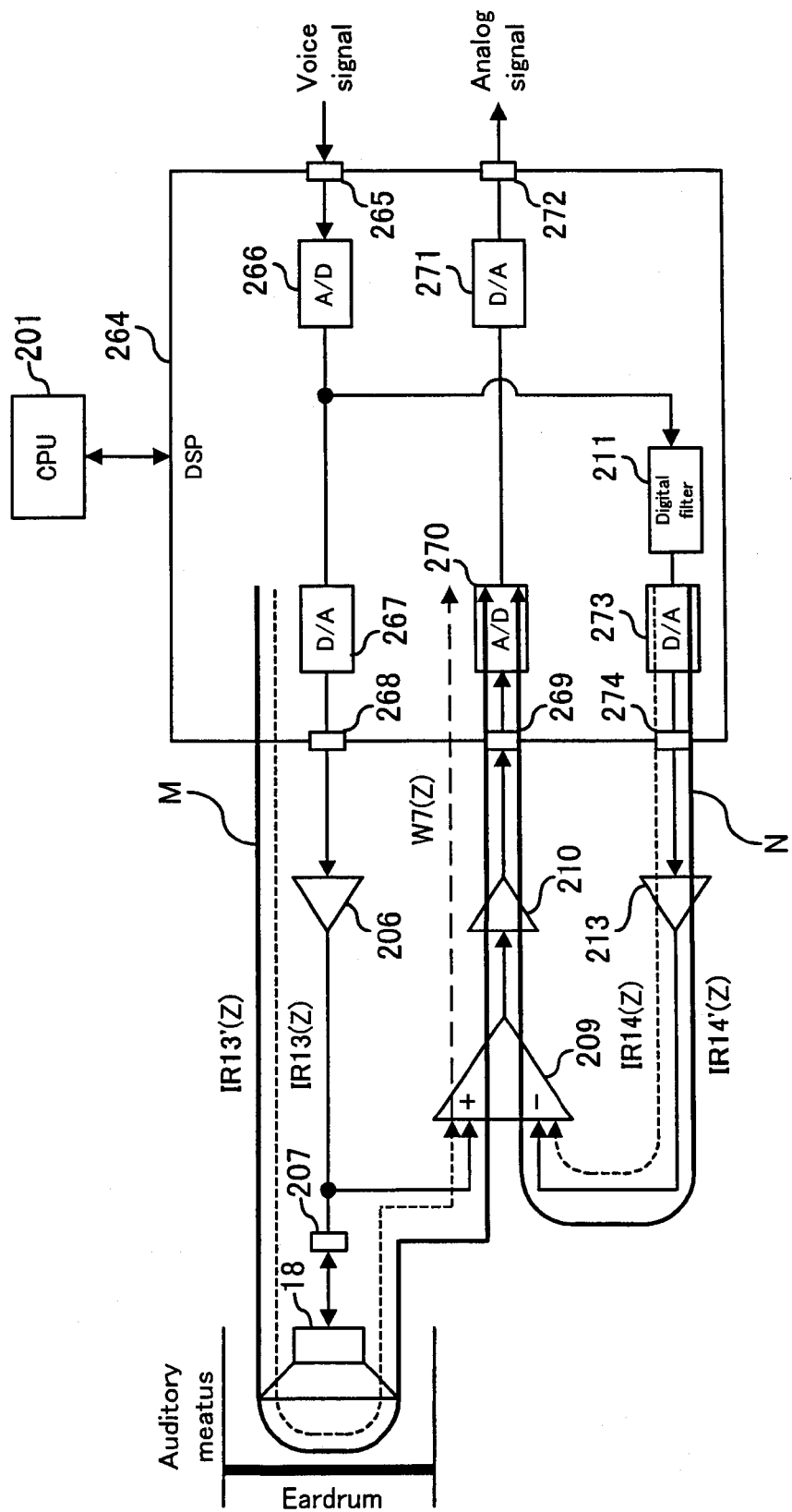
FIG. 39 is a diagram showing the case where the earphone microphone 18 is included in the path M of FIG. 38.

The filter coefficients of the FIR filter 211 will be described in detail with reference to FIGS. 38, 39. FIG. 38 shows the paths M, N of the echo prevention circuit of FIG. 37. FIG. 39 shows a case where the earphone microphone 18 is included in the path M.

The analog signal from the amplifier 206 is possibly input into through the + input terminal of the differential amplifier 209 as well as being output through the input/output terminal 207. In this case, an echo of the analog signal occurs, or the analog signal from the amplifier 206 is superimposed on a voice signal input through the input/output terminal 207 and input to the + input terminal of the differential amplifier 209, thus generating an echo. Accordingly, the filter coefficients of the FIR filter 211 are set so as to prevent this echo.

Let IR13(Z) be impulse response (a transfer function) of from the input of the DA converter 267 to the + input terminal of the differential amplifier 209 indicated by a dashed line in FIG. 38 or 39, IR14(Z) be impulse response (a transfer function) of from the input of the DA converter 273 to the − input terminal of the differential amplifier 209 indicated by a dashed line in FIG. 38 or 39, and W7(Z) be impulse response (a transfer function) of from the stage following the ± input terminal of the differential amplifier 209 to the output of the AD converter 270 indicated by a long dashed line in FIG. 38 or 39.

Here, let Q(Z) be the filter coefficients of the digital filter 211. Then, in order to cause the signal from the amplifier 213 to cancel out the signal from the amplifier 206 in the differential amplifier 209, Q(Z) is set such that the following equation is satisfied:

$IR13(Z) = IR14(Z) \cdot Q(Z).$

That is, Q(Z) is set as follows:

$Q(Z) = IR13(Z)/IR14(Z).$

However, the impulse responses obtainable by the DSP 264 are the impulse response (transfer function) IR13'(Z) (=IR13(Z)·W7(Z)) of the path M and the impulse response (transfer function) IR14'(Z) (=−IR14(Z)·W7(Z)) of the path N, indicated by solid lines in FIG. 38 or 39. Here, the reason why IR14(Z) is inverted in phase is that the path N goes through the − input terminal of the differential amplifier 209.

In this case, the equation that allows the signal transmitting through the path M and the signal transmitting through the path N to cancel out each other, is as follows:

$-IR13'(Z) = IR14'(Z) \cdot Q(Z).$

That is, Q(Z) is set as follows:

$Q(Z) = -IR13'(Z)/IR14'(Z).$

That is, the characteristic of the digital filter 211 is achieved by taking the product of the inverse of the transfer characteristic IR13'(Z) and the characteristic of the inverse filter of IR14'(Z). By setting the filter coefficients of the digital filter 211 in this way, the signal transmitting through the path M can be canceled in the differential amplifier 209 by the signal transmitting through the path N. As a result, when a voice signal is input to the input terminal 265, the previously mentioned echo can be prevented.

As shown in FIG. 39, by acquiring the impulse response IR13'(Z) in a state of the earphone microphone 18 being connected and setting the product of the phase-inverse of this IR13'(Z) and the characteristic of the inverse filter of IR14'(Z) as the filter coefficients in the digital filter 211, effective echo prevention that is according to the transfer characteristic of the earphone microphone 18 becomes possible.

Furthermore, by acquiring the impulse response IR13'(Z) in a state where the connected earphone microphone 18 is attached to an ear by inserting into its auditory meatus or covering its ear auricle and setting the product of the phase-inverse of this IR13'(Z) and the characteristic of the inverse filter of IR14'(Z) as the filter coefficients in the digital filter 211, effective echo prevention that is according to the transfer characteristics of the earphone microphone 18 and of the user's auditory meatus becomes possible.

The process of setting the product of the phase-inverse of the transfer characteristic IR13'(Z) and the characteristic of the inverse filter of IR14'(Z) as the characteristic of the digital filter 211 can be achieved by performing the same processes as in the sixth implementation.

Alternatively, having set the filter coefficients of the FIR filter 286 (FIG. 29) to impulse response IR13'(Z) of the path M and the filter coefficients of the FIR filter 285 (FIG. 29) to impulse response IR14'(Z) of the path N, the filter coefficients of the digital filter 211 can be set by performing the same processes as in the seventh implementation.

<<Tenth Implementation>>

==Example Configuration of Echo Prevention Circuit and Digital Signal Processing Circuit==

Figure 40:
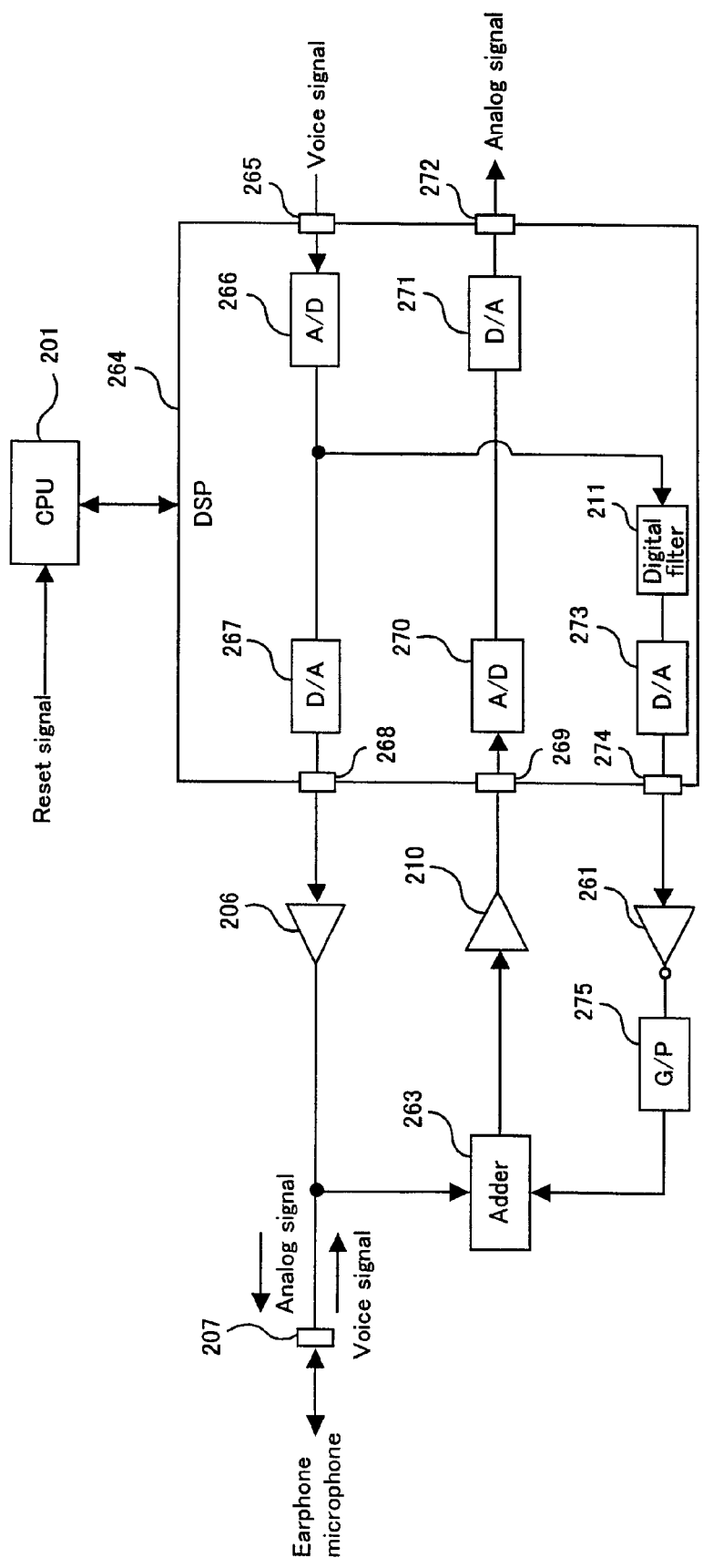
FIG. 40 is a block diagram illustrating a tenth implementation.

FIG. 40 is a diagram showing a tenth implementation. FIG. 40 is a block diagram illustrating an example of an echo prevention circuit and a digital signal processing circuit (DSP 264) included therein.

As shown in FIG. 40, the echo prevention circuit of the tenth implementation has a configuration where the eighth implementation (FIG. 34) and the ninth implementation (FIG. 37) are combined, and the same reference numerals denote the same parts with description thereof being omitted.

==Filter Coefficients of FIR filter 211 (part 1)==

Figure 41:
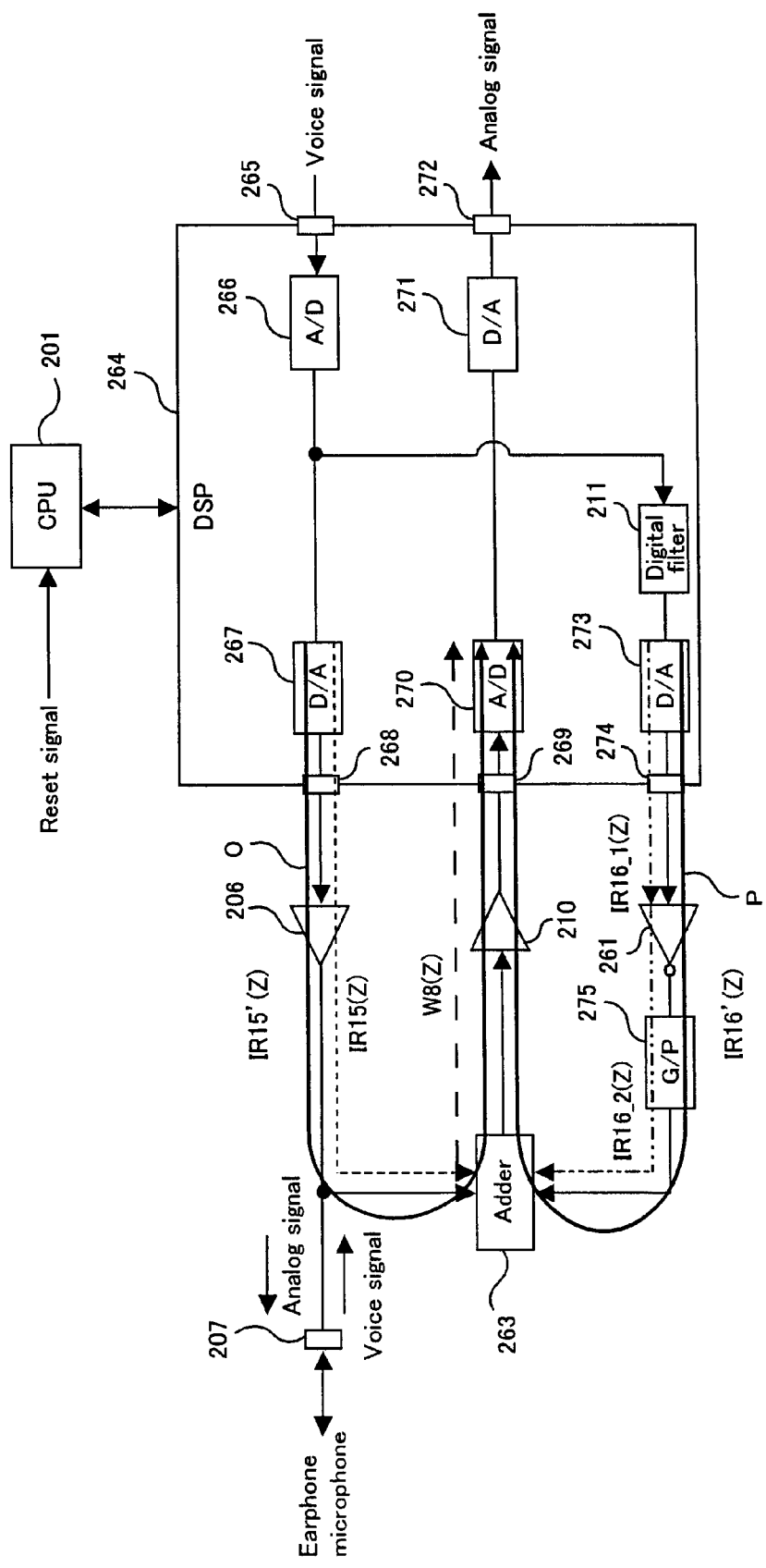
FIG. 41 is a diagram showing paths O, P in the tenth implementation of FIG. 40.
Figure 42:
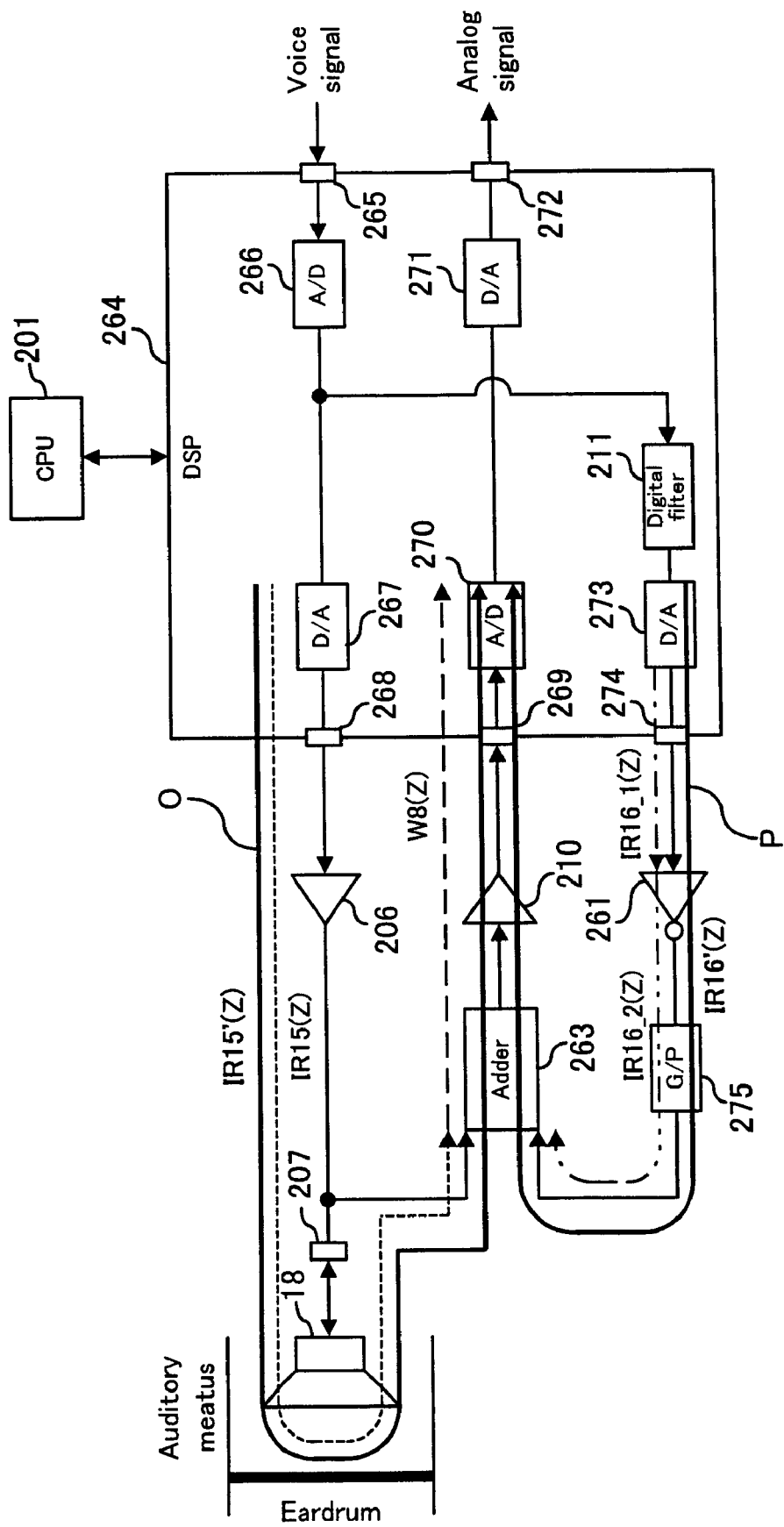
FIG. 42 is a diagram showing the case where the earphone microphone 18 is included in the path O of FIG. 41.

The filter coefficients of the FIR filter 211 will be described in detail with reference to FIGS. 41, 42. FIG. 41 shows the paths O, P of the echo prevention circuit of FIG. 40. FIG. 42 shows a case where the earphone microphone 18 is included in the path O.

The analog signal from the amplifier 206 is possibly input into the adder 263 as well as being output through the input/output terminal 207. In this case, an echo of the analog signal occurs, or the analog signal from the amplifier 206 is superimposed on a voice signal input through the input/output terminal 207 and input to the adder 263, thus generating an echo. Accordingly, the filter coefficients of the FIR filter 211 are set so as to prevent this echo.

Let IR15(Z) be impulse response (a transfer function) of from the input of the DA converter 267 to the input terminal of the adder 263 indicated by a dashed line in FIG. 41 or 42, IR16_1(Z) be impulse response (a transfer function) of from the input of the DA converter 273 to the input of the inverting amplifier 261 indicated by a chain line in FIG. 41 or 42, and IR16_2(Z) be impulse response (a transfer function) of from the input of the inverting amplifier 261 to an input terminal of the adder 263 indicated by a two-dot chain line in FIG. 41 or

42. Suppose that $IR16(Z)=-IR16\_1(Z)\cdot IR16\_2(Z)$. Furthermore, let $W8(Z)$ be impulse response (a transfer function) of from the stage following each input terminal of the adder 263 to the output of the AD converter 270 indicated by a long dashed line in FIG. 41 or 42.

Here, let $Q(Z)$ be the filter coefficients of the digital filter 211. Then, in order to cause the signal from the gain phase adjusting circuit 275 to cancel out the signal from the amplifier 206 in the adder 263, $Q(Z)$ is set such that the following equation is satisfied:

$$IR15(Z)=IR16(Z)\cdot Q(Z).$$

That is, $Q(Z)$ is set as follows:

$$Q(Z)=IR15(Z)/IR16(Z).$$

However, the impulse responses obtainable by the DSP 264 are the impulse response (transfer function) $IR15'(Z)$ ($=IR15(Z)\cdot W8(Z)$) of the path O and the impulse response (transfer function) $IR16'(Z)$ ($=-IR16\_1(Z)\cdot IR16\_2(Z)\cdot W8(Z)$) of the path P, indicated by solid lines in FIG. 41 or 42. Here, $IR16\_1(Z)$ is inverted in phase because of being inverted by the inverting amplifier 261.

In this case, the equation that allows the signal transmitting through the path O and the signal transmitting through the path P to cancel out each other, is as follows:

$$-IR15'(Z)=IR16'(Z)\cdot Q(Z).$$

That is, $Q(Z)$ is set as follows:

$$Q(Z)=-IR15'(Z)/IR16'(Z).$$

That is, the characteristic of the digital filter 211 is achieved by taking the product of the inverse of the transfer characteristic $IR15'(Z)$ and the characteristic of the inverse filter of $IR16'(Z)$. By setting the filter coefficients of the digital filter 211 in this way, the signal transmitting through the path O can be canceled in the adder 263 by the signal transmitting through the path P. As a result, when a voice signal is input to the input terminal 265, the previously mentioned echo can be prevented.

As shown in FIG. 42, by acquiring the impulse response $IR15'(Z)$ in a state of the earphone microphone 18 being connected and setting the product of the phase-inverse of this $IR15'(Z)$ and the characteristic of the inverse filter of $IR16'(Z)$ as the filter coefficients in the digital filter 211, effective echo prevention that is according to the transfer characteristic of the earphone microphone 18 becomes possible.

Furthermore, by acquiring the impulse response $IR15'(Z)$ in a state where the connected earphone microphone 18 is attached to an ear by inserting into its auditory meatus or covering its ear auricle and setting the product of the phase-inverse of this $IR15'(Z)$ and the characteristic of the inverse filter of $IR16'(Z)$ as the filter coefficients in the digital filter 211, effective echo prevention that is according to the transfer characteristics of the earphone microphone 18 and of the user's auditory meatus becomes possible.

The process of setting the product of the phase-inverse of the transfer characteristic $IR15'(Z)$ and the characteristic of the inverse filter of $IR16'(Z)$ as the characteristic of the digital filter 211 can be achieved by performing the same processes as in the sixth implementation.

Alternatively, having set the filter coefficients of the FIR filter 286 (FIG. 29) to impulse response $IR15'(Z)$ of the path O and the filter coefficients of the FIR filter 285 (FIG. 29) to impulse response $IR16'(Z)$ of the path P, the filter coefficients of the digital filter 211 can be set by performing the same processes as in the seventh implementation.

<<Eleventh Implementation>>
==Example Configuration of Echo Prevention Circuit and Digital Signal Processing Circuit==

Figure 43:
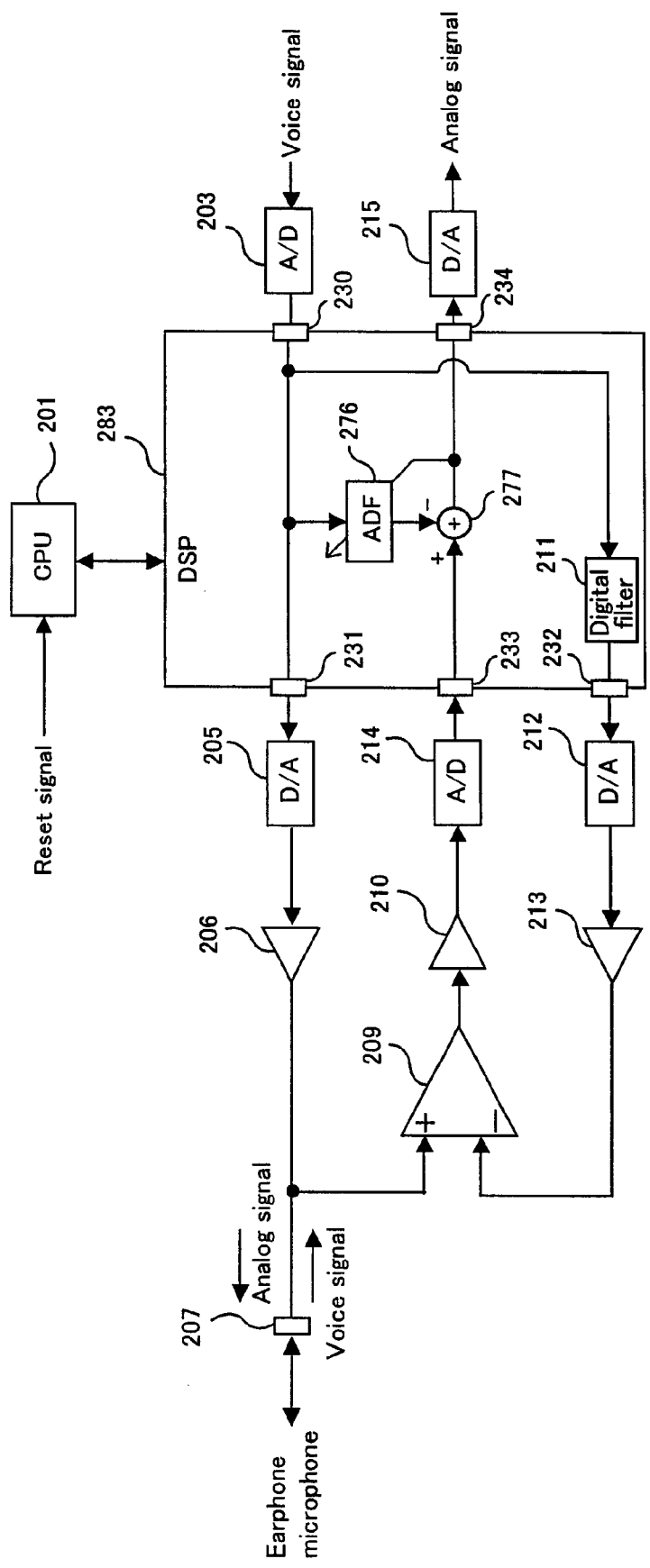
FIG. 43 is a block diagram illustrating an eleventh implementation of the echo prevention circuit and the digital signal processing circuit included therein.
Figure 44:
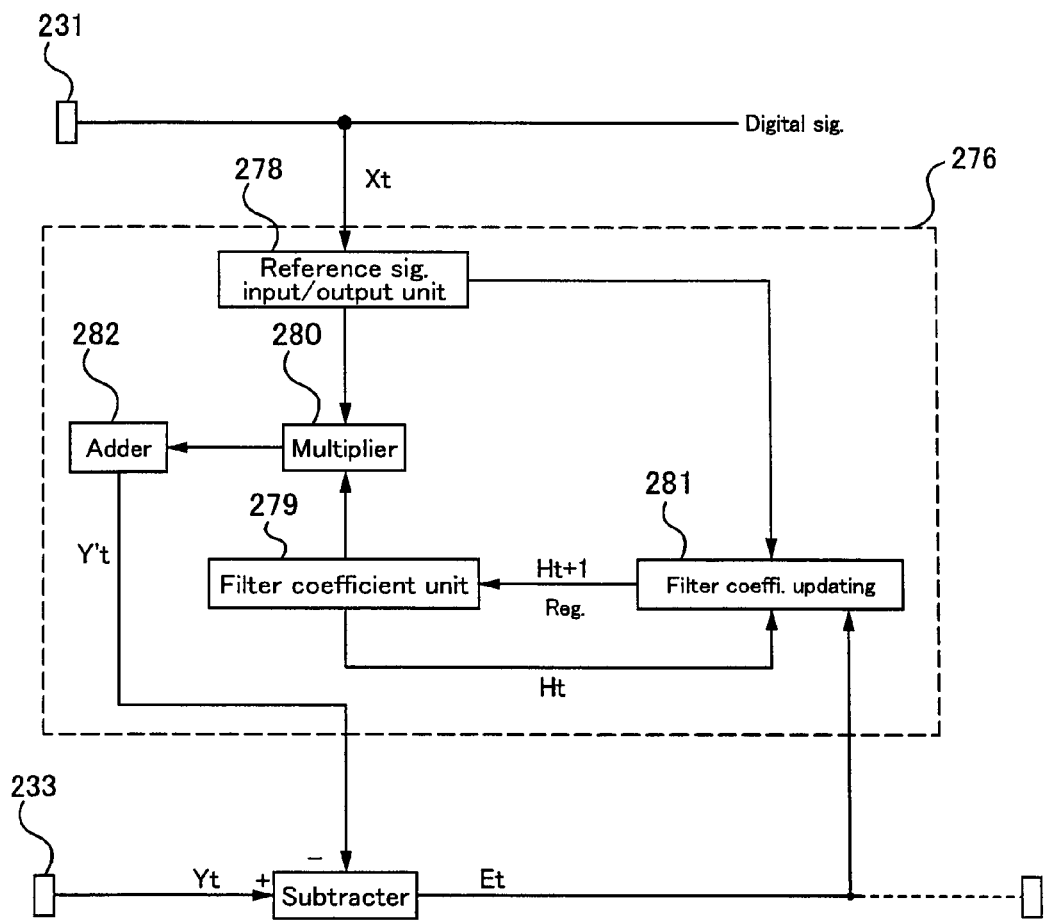
FIG. 44 is a detailed diagram of an ADF 276 of FIG. 43.

FIG. 43 is a diagram showing an eleventh implementation. FIG. 43 is a block diagram illustrating an example of an echo prevention circuit and a digital signal processing circuit (DSP 283) included therein. In the echo prevention circuit of FIG. 43, the same reference numerals denote the same parts as in the sixth implementation with description thereof being omitted. FIG. 44 is a detailed diagram of the ADF 276 of FIG. 43.

The DSP 283 has an input terminal 230, the ADF 276, an output terminal 231, a digital filter 211, an output terminal 232, an input terminal 233, a subtracter 277, and an output terminal 234.

A digital signal from the AD converter 214 is input through the input terminal 233 to the + input terminal of the subtracter 277. The output signal from the ADF 276 is input to the − input terminal of the subtracter 277. The subtracter 277 subtracts the digital signal from the AD converter 214 and the output signal from the ADF 276. Hereinafter, the output signal from the subtracter 277 is called an error signal.

As enclosed by a dashed line in FIG. 44, the ADF 76 has a reference signal input/output unit 278, a filter coefficient unit 279, a multiplier 280, a filter coefficient updating unit 281, and an adder 282.

The reference signal input/output unit 278 has a digital signal from the AD converter 203 inputted through the input terminal 230 thereto, which digital signal is hereinafter called a reference signal, and holds and outputs the reference signal to the multiplier 280 and the filter coefficient updating unit 281.

The filter coefficient unit 279 has inputted thereto filter coefficients from the filter coefficient updating unit 281 and holds the filter coefficients. The filter coefficient unit 279 outputs the filter coefficients to the multiplier 280, while the reference signal input/output unit 278 outputs the reference signals to the multiplier 280, and outputs the filter coefficients to the filter coefficient updating unit 281.

The multiplier 280 outputs the results of multiplying the reference signals and the filter coefficients sequentially to the adder 282.

The adder 282 outputs the results of adding the output signals from the multiplier 280 sequentially to the subtracter 77.

The error signals from the subtracter 277 are input into the filter coefficient updating unit 281. The filter coefficient updating unit 281 calculates filter coefficients based on the error signals, the reference signals, and the filter coefficients according to an estimation algorithm such as the LMS or the NLMS, and outputs to the filter coefficient unit 279. The filter coefficient updating unit 281 calculates such filter coefficients that the average of the error signals from the subtracter 277 is at or below a predetermined value when digital signals are input to the input terminal 230. This predetermined value is decided in such a way that an echo in a voice generated based on an analog signal that is output from the DA converter 215 when the average of the error signals is at or below it, has such a level that human beings can not hear.

Digital signals from the subtracter 277 are input through the output terminal 234 to the DA converter 215, which outputs an analog signal into which the digital signals have been digital-to-analog converted.

==Updating Filter Coefficients of Filter Coefficient Unit 279==

Figure 45:
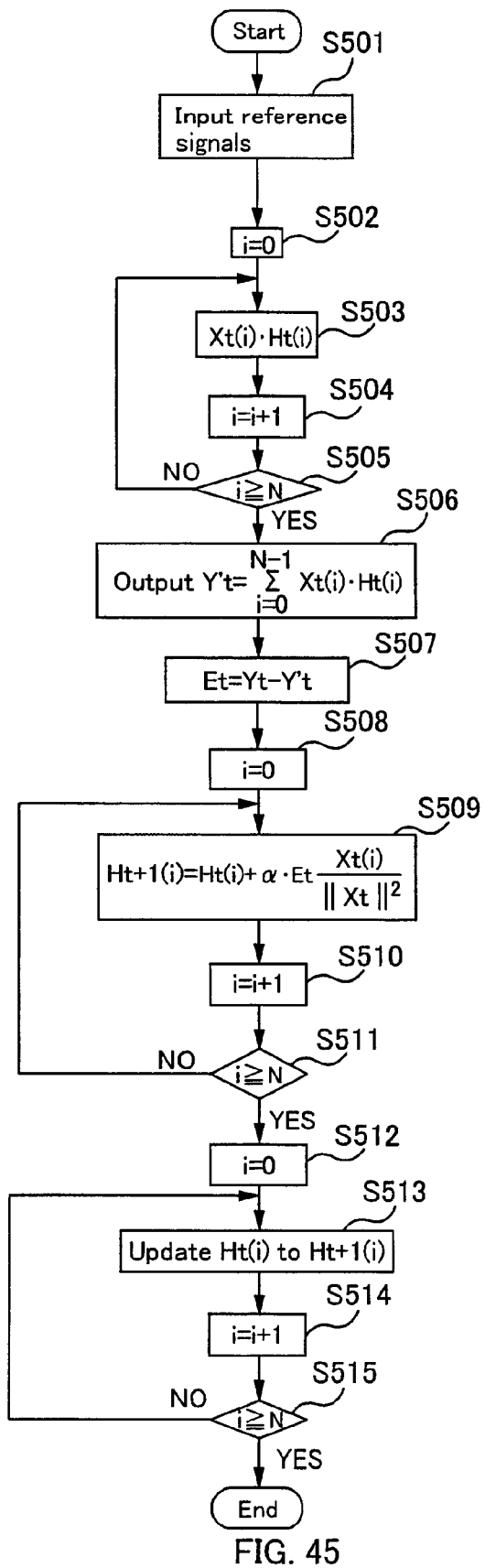
FIG. 45 is a flow chart illustrating the operation of the echo prevention circuit and the digital signal processing circuit included therein.

An example of the operation for updating the filter coefficients of the filter coefficient unit 279 will be described with reference to FIGS. 44, 45. FIG. 45 is a flow chart showing an example of the operation of the echo prevention circuit and digital signal processing circuit included therein. In the description below, let Yt be a digital signal that is input to the + input terminal of the subtracter 277 at time t when a digital signal is input to the input terminal 230, and Xt (={Xt(0), Xt(1), ..., Xt(N−1)}) be reference signals that are input into the reference signal input/output unit 278. Moreover, Let Ht (={Ht(0), Ht(1), ..., Ht(N−1)}) be filter coefficients of the filter coefficient unit 279, and Ht+1(={Ht+1(0), Ht+1(1), ..., Ht+1(N−1)}) be filter coefficients that are calculated by the filter coefficient updating unit 281. Xt(i), Ht(i), Ht+1(i) refer to the i-th reference signal and filter coefficients respectively.

When inputting the reference signals Xt to the reference signal input/output unit 278 (S501), the DSP 283 performs the following processes to generate a signal Y't to be input to the − input terminal of the subtracter 277. First, the DSP 283 sets i to 0 (S502) and has Xt(0) of the reference signal input/output unit 278 and Ht(0) of the filter coefficient unit 279 output to the multiplier 280. The multiplier 280 multiplies Xt(0) and Ht(0) (S503), and outputs the multiplying result to the adder 282, which adds Xt(0)·Ht(0) from the multiplier 280 and a zero.

Next, the DSP 283 increments i by one, that is, i=i+1=1 (S504). The DSP 283 determines that i not ≧N (NO at S505) because the multiplying result of the multiplier 280 has not reached Xt(N−1)·Ht(N−1), and has Xt(1) of the reference signal input/output unit 278 and Ht(1) of the filter coefficient unit 279 output to the multiplier 280. The multiplier 280 outputs the result of multiplying Xt(1) and Ht(1) (S503) to the adder 282, which adds Xt(1)·Ht(1) output from the multiplier 280 and Xt(0)·Ht(0). In this way, the processes of from S503 to S505 are repeated until i≧N (YES at S505), and the adding result of the adder 282 becomes Y't (=Xt(0)·Ht(0)+ ... +Xt(N−1)·Ht(N−1)). Then, the adder 282 outputs Y't to the − input terminal of the subtracter 277 (S506).

The subtracter 277 subtracts Yt input to its + input terminal of and Y't input to its − input terminal and outputs (S507). An error signal from the subtracter 277 is input into the filter coefficient updating unit 281. Letting Et (=Yt−Y't) be the error signal from the subtracter 277, description will be made below.

The filter coefficient updating unit 281 performs the following processes to update the filter coefficients of the filter coefficient unit 279. First, the filter coefficient updating unit 281 sets i to 0 to calculate Ht+1(0) (S508). Ht+1(0) is expressed as:

$$Ht+1(0)=Ht(0)+(\alpha \cdot Et \cdot Xt(0))/|Xt|^2,$$

where α is a step gain, a predetermined constant, and $|Xt|^2$ is a norm (square sum) of the reference signals Xt. The filter coefficient updating unit 281 solves the above equation based on Xt(0) from the reference signal input/output unit 278, Ht(0) from the filter coefficient unit 279, and Et from the subtracter 277 thereby calculating Ht+1(0) (S509). Next, to calculate Ht+1(1), the filter coefficient updating unit 281 increments i by one, that is, i=i+1=1 (S510). The filter coefficient updating unit 281 determines that i not ≧N (NO at S511) because the filter coefficient calculated has not yet reached Ht+1(N−1). Like in the above, Ht+1(1) is calculated from:

$$Ht+1(1)=Ht(1)+(\alpha \cdot Et \cdot Xt(1))/|Xt|^2.$$

In this way, the processes of from S509 to S511 are repeated until i≧N (YES at S511), and thereby Ht+1(={Ht+1(0), ..., Ht+1(N−1)}) is calculated. To update Ht (={Ht(0), ..., Ht(N−1)}) to Ht+1(={Ht+1(0), ..., Ht+1(N−1)}) in the filter coefficient unit 279, the filter coefficient updating unit 281 outputs the Ht+1 to the filter coefficient unit 279.

First, the DSP 283 sets i to 0 to update Ht(0) of the filter coefficient unit 279 to Ht+1(0) (S512). As a result, Ht(0) of the filter coefficient unit 279 is updated to Ht+1(0) (S513). Next, the DSP 283 increments i by one, that is, i=i+1=1 to update Ht(1) to Ht+1(1) (S514). The DSP 283 determines that i not ≧N (NO at S515) because Ht(N−1) has not yet been updated to Ht+1(N−1), and updates Ht(1) to Ht+1(1) (S513). In this way, the processes of from S513 to S515 are repeated until i≧N (YES at S515), and thereby Ht (={Ht(0), ..., Ht(N−1)}) of the filter coefficient unit 279 is updated to Ht+1(={Ht+1(0), ..., Ht+1(N−1)}).

Then, the processes of from S502 to S505 are performed again. As a result, an output signal Y't based on Ht+1(={Ht+1(0), ..., Ht+1(N−1)}) is input from the adder 282 to the − input terminal of the subtracter 277.

In this way, the filter coefficients of the filter coefficient unit 279 can be updated to the filter coefficients reflecting the error signal from the subtracter 277 on the basis of the error signal. By repeating these processes, the average of the error signals from the subtracter 277 can be made at or below the predetermined value when digital signals are input to the input terminal 230. That is, echoes can be prevented. The algorithm for updating the filter coefficients of the filter coefficient unit 279 is not limited to this. The existing estimation algorithm such as the LMS algorithm or the NLMS algorithm, mentioned above, can be used. Alternatively, the filter coefficients of the filter coefficient unit 279 can be updated by the process disclosed in, for example, Japanese Patent Application Laid-Open Publication No. 2002-246880.

According to the above implementation, the above processes have been described which use hardware (e.g., the subtracter 277 and the multiplier 280), but the invention is not limited to this. For example, a program for the above processes may be stored beforehand in a ROM or the like so that a processor of the DSP 283 reads out the program and executes.

In this implementation, the filter coefficients of the digital filter 211 can be set through the same processes as in the sixth to tenth implementations. By setting the filter coefficients of the FIR filter 211 to the impulse response acquired in a state of the earphone microphone 18 being connected, effective echo removal that is according to the transfer characteristic of the earphone microphone 18 becomes possible in the differential amplifier 209. As a result, the error signals from the subtracter 277 become small, thereby reducing the number of times to repeat updating the filter coefficients of the filter coefficient unit 279. That is, the time until an echo is cancelled can be shortened. Furthermore, by setting the filter coefficients of the FIR filter 211 based on the impulse response acquired in a state where the connected earphone microphone 18 is attached to an ear by inserting into its auditory meatus or covering its ear auricle, effective echo removal that is according to the transfer characteristics of the earphone microphone 18 and of the user's auditory meatus becomes possible in the differential amplifier 209. That is, the time until an echo is cancelled can be further shortened.

The present implementation differs from the sixth implementation in that the ADF 276 and the subtracter 277 are provided, but the invention is not limited to this. The ADF 276 and the subtracter 277 may be provided in the seventh to tenth implementations likewise. To describe in detail, the ADF 276 and the subtracter 277 may be provided in the seventh and eighth implementations like in this implementation. In the ninth and tenth implementations, the subtracter 277 is provided in between the AD converter 270 and the DA converter 271. Then, the error signal transmitting on the line between the subtracter 277 and the DA converter 271 is input into the ADF 276 and the digital signal from the AD converter 266 is input as the reference signal into the ADF 276.

Due to errors in measuring impulse responses and the like, an echo may not be sufficiently prevented from being in the resulting signal of the signal transmitting through the path I being cancelled in the differential amplifier 209 (adder 263) by the signal transmitting through the path J. In this case, according to the eleventh implementation, the output from the differential amplifier 209 (adder 263) can be cancelled by the output signal Y't from the adder 282 in the subtracter 277. Thus, the echo when digital signals (a voice signal) are input to the input terminal 230 (265) can be more reliably prevented.

<<Example Applications of Echo Prevention Circuit and Digital Signal Processing Circuit>>

Figure 46:
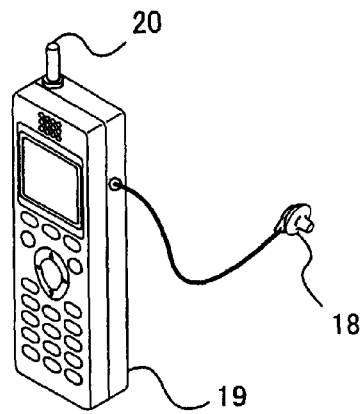
FIG. 46 is a schematic diagram of a cellular phone 19 to which the echo prevention circuit and the digital signal processing circuit included therein according to the invention is applied.
Figure 47:
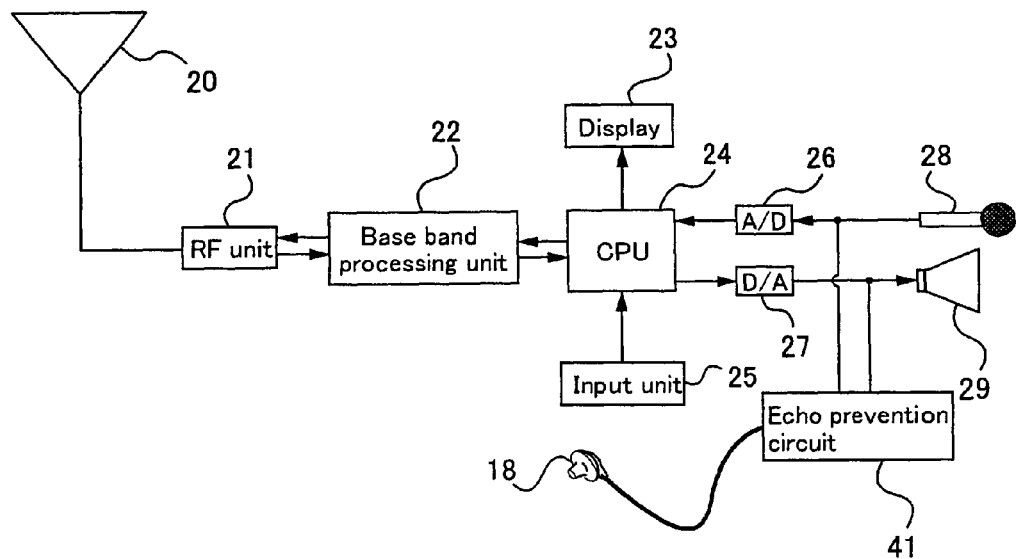
FIG. 47 is a block diagram showing an example of the configuration of the cellular phone 19 shown in FIG. 46.
Figure 48:
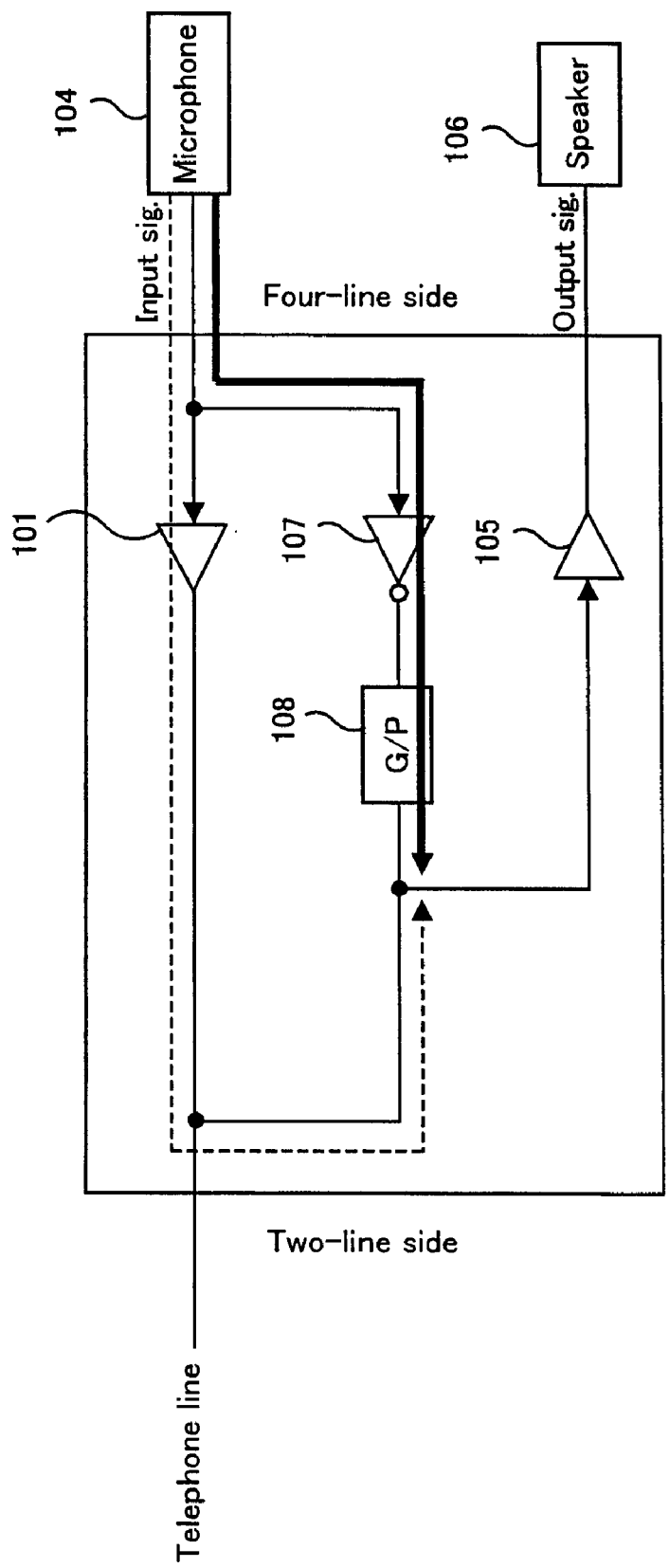
FIG. 48 is a diagram showing a conventional echo prevention circuit.

An example application of the echo prevention circuit and the digital signal processing circuit included therein according to the present invention will be described with reference to FIGS. 1, 2, 5, 6, 46, and 47. In this implementation, for example, for the case where the echo prevention circuit and digital signal processing circuit (DSP 2) included therein of the first implementation are applied to, e.g., a cellular phone 19 of FIG. 46, the configuration and operation will be described. FIG. 46 is a schematic diagram of the cellular phone 19 to which the echo prevention circuit 41 according to the invention is applied. FIG. 47 is a block diagram showing an example of the configuration of the cellular phone 19 shown in FIG. 46. The earphone microphone 18 is connected to the cellular phone 19 as shown in FIGS. 46, 47. The earphone microphone 18 has a speaker function in which to let a diaphragm vibrate (not shown) according to a voice signal received by the cellular phone 19 thereby outputting voice. Furthermore, the earphone microphone 18 has a microphone function in which to convert vibration of his eardrum into vibration of the diaphragm when a person wearing the earphone microphone 18 in his ear makes a voice, thereby generating and outputting a voice signal. The earphone microphone 18 is known technology and disclosed in, e.g., Japanese Patent Application Laid-Open Publication No. 2003-9272. Although the earphone microphone 18 and the cellular phone 19 are connected so as to perform wired communication, they may be configured to perform wireless communication (at HomeRF (Radio Frequency), etc.).

The cellular phone 19 has an antenna 20, an RF (Radio Frequency) unit 21, a base band processing unit 22, a CPU 24, a display 23, an input unit 25, an AD converter 26, a DA convert 27, a microphone 28, a speaker 29, and an echo prevention circuit 41. Note that the configuration of the cellular phone 19 shown in FIG. 47 is an example and the echo prevention circuit 41 and digital signal processing circuit (DSP 2) can be applied to other cellular phones as well as one having this configuration.

The antenna 20 receives a voice signal transmitted to the cellular phone 19 and transmits a voice signal from the RF unit 21.

The RF unit 21 performs decoding such as demodulation on part in a predetermined frequency band of a voice signal received by the antenna 20. Also, the RF unit 21 performs modulation such as encoding according to, e.g., a TDMA (Time Division Multiplex Access) scheme on a voice signal from the base band processing unit 22.

The base band processing unit 22 performs predetermined signal processing on a base band signal into which the received signal has been demodulated by the RF unit 21 and outputs to the CPU 24. Also, the base band processing unit 22 performs predetermined signal processing on a voice signal from the CPU 24 and outputs to the RF unit 21.

The CPU 24 controls the cellular phone 19 overall, and outputs a voice signal from the base band processing unit 22 to the DA convert 27 so as to reproduce voice according to the voice signal with the speaker 29 or the earphone microphone 18. Also, the CPU 24 outputs voice signals from the AD convert 26 and the microphone 28 or the earphone microphone 18 to the base band processing unit 22. Furthermore, the CPU 24 outputs signals to the display 23 so as to display an image based on received packet data when the cellular phone 19 is performing packet communication. Also, the CPU 24 displays input data inputted via the input unit 25 on the display 23 and performs predetermined processing on the input data and outputs to the base band processing unit 22 to transmit via packet communication.

The AD convert 26 outputs digital signals into which a voice signal from the microphone 28 or the earphone microphone 18 has been analog-to-digital converted to the CPU 24. The DA convert 27 outputs an analog signal into which digital signals from the CPU 24 have been digital-to-analog converted to the speaker 29 or the echo prevention circuit 41. In the description below of this implementation, suppose that in a state where the earphone microphone 18 is connected to the cellular phone 19, the analog signal from the DA convert 27 is input into the echo prevention circuit 41.

Next, the operation of the echo prevention circuit 41 will be described. In this example application, assuming that the filter coefficients of the FIR filters 4, 11 have been already set in the way described in the first implementation, description will be made.

Components of the cellular phone 19 perform the above processes on a voice signal received by the antenna 20 and the processed signal is output from the DA converter 27 to the AD converter 3 of the echo prevention circuit 41.

A voice signal input into the AD converter 3 is analog-to-digital converted by the AD converter 3 into digital signals, which are input through the input terminal 30 into the FIR filters 4, 11. Then, the digital signals from the AD converter 3 are input into the for-digital-signals memories 42, 54 of the FIR filters 4, 11.

The digital signals input into the FIR filter 4 will be described below. A digital signal input into the for-digital-signals memory 54 (denoted by Xn) is input into the registers 0 to N−1 sequentially, thereby being delayed by units of one sampling cycle. And digital signals Xn, . . . , Xn−(N−1) from the for-digital-signals memory 54 are sequentially input into the multiplier 51 by the DSP 2 switching the switches 60O to the registers 0, . . . sequentially. The phase-inverted impulse responses imp(0) to imp(N−1) (=−IR2'(Z)) stored in the filter coefficient storage memory 56 are sequentially input into the multiplier 51 by the DSP 2 switching the switches 60P to the addresses 0, . . . sequentially. The multiplier 51 outputs results of multiplying sequentially the digital signals Xn, . . . , Xn−(N−1) and the phase-inverted impulse responses imp(0) to imp(N−1) to the ADD 52.

The multiplying result of the multiplier 51 input into the ADD 52 is added to the previous adding result of the ADD 52 stored in the ACC 53 and output to the ACC 53. In this way, the FIR filter 4 performs a convolution operation between the phase-inverted impulse responses imp(0) to imp(N−1) from the filter coefficient storage memory 56 and the digital signals Xn, . . . , Xn−(N−1). That is, the FIR filter 4 outputs a signal to cancel out the output signal from the FIR filter 11 in the differential amplifier 9.

The output signals from the FIR filter 4 are input through the output terminal 31 into the DA converter 5, which digitalto-analog converts the output signals into an analog signal, which is input into the amplifier 6. The analog signal input into the amplifier 6 is amplified with a predetermined amplification factor and outputted. The analog signal from the amplifier 6 is output through the input/output terminal 7 to the earphone microphone 18. Thus, with a speaker function of the earphone microphone 18, its diaphragm vibrates thereby generating voice. However, the analog signal from the amplifier 6 is possibly input to the + input terminal of the differential amplifier 9. In order to cancel this analog signal input to the + input terminal of the differential amplifier 9, the following processes are performed.

Digital signals input into the for-digital-signals memory 42 of the FIR filter 11 are input into the registers 0 to N−1 sequentially, thereby being delayed by units of one sampling cycle as with the FIR filter 4. And digital signals Xn, . . . , Xn−(N−1) from the for-digital-signals memory 42 are sequentially input into the multiplier 51 by the DSP 2 switching the switches 60M to the registers 0, . . . sequentially. The phase-inverted impulse responses imp(0) to imp(N−1) (=−IR1'(Z)) stored in the filter coefficient storage memory 47 are sequentially input into the multiplier 51 by the DSP 2 switching the switches 60N to the addresses 0, . . . sequentially. The multiplier 51 outputs results of multiplying sequentially the digital signals Xn, . . . , Xn−(N−1) and the phase-inverted impulse responses imp(0) to imp(N−1), which are sequentially input into the ADD 52.

The multiplying result of the multiplier 51 input into the ADD 52 is added to the previous adding result of the ADD 52 stored in the ACC 53 and output to the ACC 53. In this way, the FIR filter 11 performs a convolution operation between the phase-inverted impulse responses imp(0) to imp(N−1) from the filter coefficient storage memory 47 and the digital signals Xn, . . . , Xn−(N−1). That is, the FIR filter 11 outputs a signal to cancel out the output signal from the FIR filter 4 in the differential amplifier 9.

The output signals from the FIR filter 11 are input through the output terminal 32 into the DA converter 12, which digital-to-analog converts the output signals into an analog signal, which is input into the amplifier 13. The analog signal input into the amplifier 13 is amplified with a predetermined amplification factor and outputted to the − input terminal of the differential amplifier 9.

Therefore, in the differential amplifier 9, the analog signal from the amplifier 6 input to the + input terminal can be cancelled out by the analog signal from the amplifier 13 input to the − input terminal and thus inverted. Thus, it is possible to prevent echoes when digital signals are input to the input terminal 30. Furthermore, even if a voice signal produced by a microphone function of the earphone microphone 18 has the analog signal from the amplifier 6 superimposed thereon and is input to the + input terminal of the differential amplifier 9, only its part to cause an echo, i.e. the analog signal from the amplifier 6, can be removed from the superimposed signal by inputting the signal from the FIR filter 11 to the − input terminal.

In the above example application, the case where the echo prevention circuit and digital signal processing circuit included therein of the first implementation are applied has been described, but the invention is not limited to this. With the echo prevention circuit and digital signal processing circuit included therein of the second to eleventh implementation being applied, echoes can be prevented likewise.

In the above example application, the case where the echo prevention circuit and digital signal processing circuit included therein are applied to the cellular phone 19 has been described, but the invention is not limited to this. The echo prevention circuit and digital signal processing circuit according to the invention can be applied to apparatuses with which the above echo may occur such as IT (Information Technology) communication apparatuses (PCs (Personal Computers)) and call apparatuses (telephones, transceiver, and mobile phones).

According to the above implementations, when digital signals (a voice signal) are input to the input terminal 30 (65), the combined signal of the output signal of the FIR filter 4 and a signal input to the input/output terminal 7 can be cancelled in the differential amplifier 9 (or the adder 63) by the output signal of the FIR filter 11. That is, when the user of the earphone microphone is not making a voice, cancellation can be achieved by setting the filter coefficients of the FIR filters 4, 11 such that the output signal of the differential amplifier 9 (or the adder 63) becomes zero. The output signal output through the output terminal 34 (72) of the DSP 2 (64, 83) can be taken as a signal having the output signal from the FIR filter 4 removed or reduced. Therefore, when digital signals (a voice signal) are input to the input terminal 30 (65), echoes can be prevented.

Furthermore, when digital signals (a voice signal) are input to the input terminal 30 (65), the output signal of the differential amplifier 9 (or the adder 63) can be made to have only the output signal from the first FIR filter 4 removed or reduced.

As an example of the filter coefficients of the FIR filters 4, 11, the filter coefficients of the FIR filter 4 can be set to the phase-inverse of the impulse response of from the output of the FIR filter 11 to the output of the differential amplifier 9 (or the adder 63), and the filter coefficients of the FIR filter 11 can be set to the impulse response of from the output of the FIR filter 4 to the output of the differential amplifier 9 (or the adder 63). Alternatively, as another example of the filter coefficients of the FIR filters 4, 11, the filter coefficients of the FIR filter 4 can be set to the impulse response of from the output of the FIR filter 11 to the output of the differential amplifier 9 (or the adder 63), and the filter coefficients of the FIR filter 11 can be set to the phase-inverse of the impulse response of from the output of the FIR filter 4 to the output of the differential amplifier 9 (or the adder 63). Therefore, when digital signals (a voice signal) are input to the input terminal 30 (65), echoes can be reliably prevented.

The filter coefficients of the FIR filter 4 can be set to the phase-inverse of the impulse response of from the input of the DA converter 12 (73) to the output of the AD converter 14 (70), and the filter coefficients of the FIR filter 11 can be set to the impulse response of from the input of the DA converter 5 (67) to the output of the AD converter 14 (70). Alternatively, the filter coefficients of the FIR filter 4 can be set to the impulse response of from the input of the DA converter 12 (73) to the output of the AD converter 14 (70), and the filter coefficients of the FIR filter 11 can be set to the phase-inverse of the impulse response of from the input of the DA converter 5 (67) to the output of the AD converter 14 (70). Therefore, when digital signals (a voice signal) are input to the input terminal 30 (65), echoes can be reliably prevented.

The filter coefficients of the FIR filter 4 can be set to the phase-inverse of the product of the impulse response of from the input of the DA converter 12 (73) to the input of the differential amplifier 9 (or the adder 63) and the impulse response of from the input of the differential amplifier 9 (or the adder 63) to the output of the AD converter 14 (70), and the filter coefficients of the FIR filter 11 can be set to the product of the impulse response of from the input of the DA converter 5 (67) to the input of the differential amplifier 9 (or the adder 63) and the impulse response of from the input of the differential amplifier 9 (or the adder 63) to the output of the AD converter 14 (70). Alternatively, the filter coefficients of the FIR filter 4 can be set to the product of the impulse response of from the input of the DA converter 12 (73) to the input of the differential amplifier 9 (or the adder 63) and the impulse response of from the input of the differential amplifier 9 (or the adder 63) to the output of the AD converter 14 (70), and the filter coefficients of the FIR filter 11 can be set to the phase-inverse of the product of the impulse response of from the input of the DA converter 5 (67) to the input of the differential amplifier 9 (or the adder 63) and the impulse response of from the input of the differential amplifier 9 (or the adder 63) to the output of the AD converter 14 (70). As a result, filter coefficients including the characteristic of the amplifier 10 provided in between the differential amplifier 9 (or the adder 63) and the AD converter 14 (70) can be set in the FIR filters 4, 11. Therefore, when digital signals (a voice signal) are input to the input terminal 30 (65), echoes can be reliably prevented.

By setting the filter coefficients of the digital filter 11 based on the impulse response acquired in a state of the earphone microphone 18 being connected, effective echo prevention that is according to the transfer characteristic of the earphone microphone 18 becomes possible.

Furthermore, by setting the filter coefficients of the digital filter 11 based on the impulse response acquired for a state where the connected earphone microphone 18 is attached to an ear by inserting into its auditory meatus or covering its ear auricle, effective echo prevention that is according to the transfer characteristics of the earphone microphone 18 and of the user's auditory meatus becomes possible.

Moreover, with the impulse response storage memories 43, 55, the registers 50, 57, the switches 60G to 60L, and the multiplier 58 forming the echo prevention circuit, the filter coefficients of the FIR filters 4, 11 can be reliably set.

Yet further, when digital signals (a voice signal) are input to the input terminal 30 (65), the subtraction of the analog signal from the amplifier 6 and the output signal from the FIR filter 11 can be reliably performed in the differential amplifier 9.

Still further, when digital signals (a voice signal) are input to the input terminal 30 (65), the subtraction of the analog signal from the amplifier 6 and the output signal from the FIR filter 11 through the inverting amplifier 61 and the gain phase adjusting circuit 75 can be reliably performed in the adder 63.

A program for controlling the operation of the echo prevention circuit and digital signal processing circuit (DSP 2, 64, 83) can be stored in a memory and provided.

In the above implementations, the signal transmitting through the path A (C, E, G) and the signal transmitting through the path B (D, F, H) are arranged to cancel out with use of the differential amplifier 9 or the adder 63, but the invention is not limited to this. Any analog circuit can be used which allows the impulse response IR1'(Z) (IR3'(Z), IR5'(Z), IR7'(Z)) of the path A (C, E, G) and the impulse response IR2'(Z) (IR4'(Z), IR6'(Z), IR8'(Z)) of the path B (D, F, H) to cancel out.

Although the implementations have been described, the above implementations are provided to facilitate the understanding of the present invention and not intended to limit the present invention. It should be understood that various changes and alterations can be made therein without departing from spirit and scope of the invention.

What is claimed is:
1. An echo prevention circuit for an earphone microphone comprising:
an input terminal into which a first input signal corresponding to voice output from an external communication device is received;
a first FIR filter into which the first input signal is input through the input terminal;
a second FIR filter into which the first input signal is input at the same time as into the first FIR filter;
an input/output terminal to which an output signal of the first FIR filter is output and a second input signal output from the earphone microphone is input;
a first subtracter that subtracts an output signal of the second FIR filter from a combined signal of the output signal of the first FIR filter and the second input signal;
an adaptive digital filter into which the output signal of the first FIR filter is input;
a second subtracter that subtracts an output signal of the adaptive digital filter from an output signal of the first subtracter; and
an output terminal to which an output signal of the second subtracter is output,
wherein
the earphone microphone is connected to the input/output terminal, and converts voice into the second input signal,
the first FIR filter performs a convolution operation on the first input signal based upon first FIR filter coefficients,
the second FIR filter performs a convolution operation on the first input signal based upon second FIR filter coefficients, the second FIR filter coefficients differing from the first FIR filter coefficients,
the adaptive digital filter adaptively updates filter coefficients based on the output signal from the first FIR filter while the first FIR filter is receiving as input the first input signal from the external communication device and the output signal from the second subtracter, such that the output signal from the output terminal is the output signal from the first subtracter that has had the other than the second input signal removed or reduced; and
the first subtracter includes a differential amplifier having the combined signal of the output signal of the first FIR filter and the second input and the output signal of the second FIR filter inputted thereto.

2. The echo prevention circuit according to claim 1, wherein
the first FIR filter coefficients and the second FIR filter coefficients are set such that the output signal from the first subtracter has only the output signal from the first FIR filter removed or reduced when the first input signal is received at the input terminal.

3. The echo prevention circuit according to claim 2, wherein
the second FIR filter coefficients are first impulse response from the output of the first FIR filter to the output of the first subtracter, and
the first FIR filter coefficients are the inverse in phase of second impulse response from the output of the second FIR filter to the output of the first subtracter.

4. The echo prevention circuit according to claim 3,
wherein the output signal of the first FIR filter, output through the input/output terminal, can be reflected by the earphone microphone that converts the output signal into voice and outputs and that converts received voice into the second input signal and outputs, and be input to the input/output terminal, and
wherein the first impulse response is impulse response from the output of the first FIR filter through the earphone microphone to the output of the first subtracter for a state where the earphone microphone is connected to the input/output terminal.

5. The echo prevention circuit according to claim 4, wherein the first impulse response is one for a state where the earphone microphone is attached to an ear.

6. The echo prevention circuit according to claim 3, further comprising:
a first DA converter that digital-to-analog converts the output signal of the first FIR filter;
a second DA converter that digital-to-analog converts the output signal of the second FIR filter; and
an AD converter that analog-to-digital converts the output signal of the first subtracter,
wherein the first impulse response is impulse response from the first DA converter to the AD converter, and the second impulse response is impulse response from the second DA converter to the AD converter.

7. The echo prevention circuit according to claim 6, wherein the first impulse response is impulse response from the first DA converter through the earphone microphone to the AD converter for a state where the earphone microphone that converts an output signal of the first DA converter into voice and outputs and that converts received voice into the second input signal and outputs is connected to the input/output terminal.

8. The echo prevention circuit according to claim 6, further comprising:
an amplifier in between the output of the first subtracter and the input of the AD converter that amplifies an output signal of the first subtracter,
wherein the first impulse response is a product of impulse response from the first DA converter to the first subtracter and impulse response from the first subtracter to the AD converter, and
the second impulse response is a product of impulse response from the second DA converter to the first subtracter and impulse response from the first subtracter to the AD converter.

9. The echo prevention circuit according to claim 8, wherein the first impulse response is a product of impulse response from the first DA converter through the earphone microphone to the first subtracter and impulse response from the first subtracter to the AD converter for a state where the earphone microphone that converts an output signal of the first DA converter into voice and outputs and that converts received voice into the second input signal and outputs is connected to the input/output terminal.

10. The echo prevention circuit according to claim 6, further comprising:
a filter coefficient setting unit that sets the second FIR filter coefficients based on the first impulse response and sets the first FIR filter coefficients based on the second impulse response.

11. The echo prevention circuit according to claim 2, wherein
the second FIR filter coefficients are the inverse in phase of first impulse response from the output of the first FIR filter to the output of the first subtracter, and
the first FIR filter coefficients are second impulse response from the output of the second FIR filter to the output of the first subtracter.

12. The echo prevention circuit according to claim 1, wherein the first subtracter has:
an inverting circuit that inverts the output signal of the second FIR filter;
a gain phase adjusting circuit that adjusts gain and phase of an output signal of the inverting circuit; and
an adder that adds the combined signal of the output signal of the first FIR filter and the second input signal, and an output signal of the gain phase adjusting circuit.

13. A digital signal processing circuit for an earphone microphone comprising:
a first input terminal into which a first input signal corresponding to voice output from an external communication device is received;
a first FIR filter into which the first input signal is input through the first input terminal;
a second FIR filter into which the first input signal is input at the same time as into the first FIR filter;
a first output terminal to which an output signal of the first FIR filter is output;
a second output terminal to which an output signal of the second FIR filter is output;
a second input terminal to which is input a subtracted signal produced by subtracting the output signal through the second output terminal from a combined signal of the output signal through the first output terminal and a second input signal output from the earphone microphone on an input/output signal common line;
an adaptive digital filter into which the output signal of the first FIR filter is input;
a subtracter that subtracts an output signal of the adaptive digital filter from the signal through the second input terminal; and
a third output terminal to which an output signal of the subtracter is output, wherein
the earphone microphone is connected to the input/output signal common line, and converts voice into the second input signal,
the first FIR filter performs a convolution operation on the first input signal based upon first FIR filter coefficients,
the second FIR filter performs a convolution operation on the first input signal based upon second FIR filter coefficients, the second FIR filter coefficients differing from the first FIR filter coefficients,
the adaptive digital filter adaptively updates filter coefficients based on the output signal from the first FIR filter while the first FIR filter is receiving as input the first input signal from the external communication device and the output signal from the subtracter, such that the output signal from the third output terminal is the subtracted signal that has had the other than the second input signal removed or reduced, and
the first subtracter includes a differential amplifier having the combined signal of the output signal of the first FIR filter and the second input signal, and the output signal of the second FIR filter inputted thereto.

14. The digital signal processing circuit according to claim 13, wherein
the first FIR filter coefficients and the second FIR filter coefficients are set such that the subtracted signal has only the output signal from the first FIR filter removed or reduced when the first input signal is received at the first input terminal.

15. The digital signal processing circuit according to claim 14, wherein
the second FIR filter coefficients are first impulse response from a first DA converter that digital-to-analog converts the signal output through the first output terminal, to an AD converter that analog-to-digital converts the signal that is input to the second input terminal, and
the first FIR filter coefficients are the inverse in phase of second impulse response from a second DA converter that digital-to-analog converts the signal output through the second output terminal, to the AD converter.

16. The digital signal processing circuit according to claim 15, wherein the first impulse response is impulse response from the first DA converter that digital-to-analog converts the signal output through the first output terminal, through the earphone microphone that converts an output signal of the first DA converter into voice and outputs and that converts received voice into the second input signal and outputs, to the AD converter.

17. The digital signal processing circuit according to claim 16, wherein the first impulse response is one for a state where the earphone microphone is attached to an ear.

18. The digital signal processing circuit according to claim 15, further comprising:
- a first DA converter that digital-to-analog converts the output signal of the first FIR filter;
- a second DA converter that digital-to-analog converts the output signal of the second FIR filter; and
- an AD converter that analog-to-digital converts the subtracted signal, wherein the first impulse response is impulse response from the first DA converter to the AD converter, and the second impulse response is impulse response from the second DA converter to the AD converter.

19. The digital signal processing circuit according to claim 18, wherein the first impulse response is impulse response from the first DA converter through the earphone microphone that converts an output signal of the first DA converter into voice and outputs and that converts received voice into the second input signal and outputs, to the AD converter.

20. The digital signal processing circuit according to claim 15, further comprising:
- a filter coefficient setting unit that sets the second FIR filter coefficients based on the first impulse response and sets the first FIR filter coefficients based on the second impulse response.

21. The digital signal processing circuit according to claim 14, wherein
- the second FIR filter coefficients are the inverse in phase of first impulse response from a first DA converter that digital-to-analog converts the signal output through the first output terminal, to an AD converter that analog-to-digital converts the signal that is input to the second input terminal, and
- the first FIR filter coefficients are second impulse response from a second DA converter that digital-to-analog converts the signal output through the second output terminal, to the AD converter.

22. A method of setting filter coefficients of an echo prevention circuit for an earphone microphone comprising:
- an input terminal into which a first input signal corresponding to voice output from an external communication device is received;
- a first FIR filter into which the first input signal is input through the input terminal;
- a second FIR filter into which the first input signal is input at the same time as into the first FIR filter;
- an input/output terminal to which an output signal of the first FIR filter is output or a second input signal output from the earphone microphone is input;
- a first subtracter that subtracts an output signal of the second FIR filter from a combined signal of the output signal of the first FIR filter and the second input signal;
- an adaptive digital filter into which the output signal of the first FIR filter is input;
- a second subtracter that subtracts an output signal of the adaptive digital filter from an output signal of the first subtracter; and
- an output terminal to which an output signal of the second subtracter is output, wherein
  - the earphone microphone is connected to the input/output terminal, and converts voice into the second input signal,
  - the first FIR filter performs a convolution operation on the first input signal based upon first FIR filter coefficients,
  - the second FIR filter performs a convolution operation on the first input signal based upon second FIR filter coefficients, the second FIR filter coefficients differing from the first FIR filter coefficients,
  - the setting method which sets the adaptive digital filter to adaptively update filter coefficients based on the output signal from the first FIR filter while the first FIR filter is receiving as input the first input signal from the external communication device and the output signal from the second subtracter, such that the output signal from the output terminal is the output signal from the first subtracter that has had the other than the second input signal removed or reduced, and
  - the first subtracter includes a differential amplifier having the combined signal of the output signal of the first FIR filter and the second input signal, and the output signal of the second FIR filter inputted thereto.

23. The method of setting filter coefficients of the echo prevention circuit according to claim 22, which sets the first FIR filter coefficients and the second FIR filter coefficients that the output signal from the first subtracter has only the output signal from the first FIR filter removed or reduced when the first input signal is received at the input terminal.

24. A method of setting filter coefficients of a digital signal processing circuit for an earphone microphone comprising:
- a first input terminal into which a first input signal corresponding to voice output from an external communication device is received;
- a first FIR filter into which the first input signal is input through the first input terminal;
- a second FIR filter into which the first input signal is input at the same time as into the first FIR filter;
- a first output terminal to which an output signal of the first FIR filter is output;
- a second output terminal to which an output signal of the second FIR filter is output;
- a second input terminal to which is input a subtracted signal produced by subtracting the output signal through the second output terminal from a combined signal of the output signal through the first output terminal and a second input signal output from the earphone microphone on an input/output signal common line;
- an adaptive digital filter into which the output signal of the first FIR filter is input;
- a subtracter that subtracts an output signal of the adaptive digital filter from the signal through the second input terminal; and
- a third output terminal to which an output signal of the subtracter is output, wherein
  - the earphone microphone is connected to the input/output signal common line, and converts voice into the second input signal,
  - the first FIR filter performs a convolution operation on the first input signal based upon first FIR filter coefficients,
  - the second FIR filter performs a convolution operation on the first input signal based upon second FIR filter coefficients, the second FIR filter coefficients differing from the first FIR filter coefficients,
  - the setting method which sets the adaptive digital filter to adaptively update filter coefficients based on the output signal from the first FIR filter while the first FIR filter is receiving as input the first input signal from the external communication device and the output signal from the subtracter, such that the output signal from the third output terminal is the subtracted signal that has had the other than the second input signal removed or reduced, and
  - the first subtracter includes a differential amplifier having the combined signal of the output signal of the first FIR filter and the second input signal, and the output signal of the second FIR filter inputted thereto.

25. The method of setting filter coefficients of the digital signal processing circuit according to claim 24, which sets the first FIR filter coefficients and the second FIR filter coefficients such that the subtracted signal has only the output signal from the first FIR filter removed or reduced when the first input signal is received at the first input terminal.

26. A recording medium storing a program for setting filter coefficients of an echo prevention circuit for an earphone microphone comprising:
a processor;
an input terminal into which a first input signal corresponding to voice output from an external communication device is received;
a first FIR filter into which the first input signal is input through the input terminal;
a second FIR filter into which the first input signal is input at the same time as into the first FIR filter;
an input/output terminal to which an output signal of the first FIR filter is output or a second input signal output from the earphone microphone is input;
a first subtracter that subtracts an output signal of the second FIR filter from a combined signal of the output signal of the first FIR filter and the second input signal;
an adaptive digital filter into which the output signal of the first FIR filter is input;
a second subtracter that subtracts an output signal of the adaptive digital filter from an output signal of the first subtracter; and
an output terminal to which an output signal of the second subtracter is output, wherein
the earphone microphone is connected to the input/output terminal, and converts voice into the second input signal,
the first FIR filter performs a convolution operation on the first input signal based upon first FIR filter coefficients,
the second FIR filter performs a convolution operation on the first input signal based upon second FIR filter coefficients, the second FIR filter coefficients differing from the first FIR filter coefficients,
the program which causes the processor to implement a function to set the adaptive digital filter to adaptively update filter coefficients based on the output signal from the first FIR filter while the first FIR filter is receiving as input the first input signal from the external communication device and the output signal from the second subtracter, such that the output signal from the output terminal is the output signal from the first subtracter that has had the other than the second input signal removed or reduced, and
the first subtracter includes a differential amplifier having the combined signal of the output signal of the first FIR filter and the second input signal, and the output signal of the second FIR filter inputted thereto.

27. A recording medium storing a program for setting filter coefficients of a digital signal processing circuit for an earphone microphone comprising:
a processor;
a first input terminal into which a first input signal corresponding to voice output from an external communication device is received;
a first FIR filter into which the first input signal is input through the first input terminal;
a second FIR filter into which the first input signal is input at the same time as into the first FIR filter;
a first output terminal to which an output signal of the first FIR filter is output;
a second output terminal to which an output signal of the second FIR filter is output;
a second input terminal to which is input a subtracted signal produced by subtracting the output signal through the second output terminal from a combined signal of the output signal through the first output terminal and a second input signal output from the earphone microphone on an input/output signal common line;
an adaptive digital filter into which the output signal of the first FIR filter is input;
a subtracter that subtracts an output signal of the adaptive digital filter from the signal through the second input terminal; and
a third output terminal to which an output signal of the subtracter is output, wherein
the earphone microphone is connected to the input/output signal common line, and converts voice into the second input signal,
the first FIR filter performs a convolution operation on the first input signal based upon first FIR filter coefficients,
the second FIR filter performs a convolution operation on the first input signal based upon second FIR filter coefficients, the second FIR filter coefficients differing from the first FIR filter coefficients,
the program which causes the processor to implement a function to set the adaptive digital filter to adaptively update filter coefficients based on the output signal from the first FIR filter while the first FIR filter is receiving as input the first input signal from the external communication device and the output signal from the subtracter, such that the output signal from the third output terminal is the subtracted signal that has had the other than the second input signal removed or reduced, and
the first subtracter includes a differential amplifier having the combined signal of the output signal of the first FIR filter and the second input signal, and the output signal of the second FIR filter inputted thereto.

* * * * *